US012588026B2

(12) United States Patent
Khoshkholgh Dashtaki et al.

(10) Patent No.: US 12,588,026 B2
(45) Date of Patent: Mar. 24, 2026

(54) SCHEDULING REQUEST IN NON-TERRESTRIAL NETWORKS

(71) Applicant: Ofinno, LLC, Reston, VA (US)

(72) Inventors: Mohammad Ghadir Khoshkholgh Dashtaki, Burnaby (CA); Ali Cagatay Cirik, Chantilly, VA (US); Esmael Hejazi Dinan, McLean, VA (US); Hua Zhou, Vienna, VA (US); Yunjung Yi, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 519 days.

(21) Appl. No.: 17/748,510

(22) Filed: May 19, 2022

(65) Prior Publication Data

US 2022/0377780 A1 Nov. 24, 2022

Related U.S. Application Data

(60) Provisional application No. 63/191,015, filed on May 20, 2021.

(51) Int. Cl.
*H04W 72/21* (2023.01)
*H04L 1/1812* (2023.01)

(52) U.S. Cl.
CPC ........... *H04W 72/21* (2023.01); *H04L 1/1812* (2013.01)

(58) Field of Classification Search
CPC ..... H04W 72/21; H04W 72/12; H04W 72/20; H04W 72/04; H04L 1/18
USPC ........................................................ 370/329
See application file for complete search history.

(56) References Cited

U.S. PATENT DOCUMENTS

| | | | | |
|---|---|---|---|---|
| 11,089,596 B2 * | 8/2021 | You | ..................... | H04W 74/002 |
| 11,206,639 B2 * | 12/2021 | Byun et al. | ........... | H04W 72/04 |
| 2019/0082493 A1 * | 3/2019 | Lee | ...................... | H04L 1/1874 |
| 2019/0313462 A1 | 10/2019 | Lin | | |

(Continued)

FOREIGN PATENT DOCUMENTS

| | | | | |
|---|---|---|---|---|
| EP | 3700283 A1 * | 8/2020 | ............ | H04W 72/21 |
| JP | 6382333 B2 | 8/2018 | | |

(Continued)

OTHER PUBLICATIONS

R2-2106523, 3GPP RAN WG2 Meeting #114e, eMeeting May 19-May 27, 2021, Agenda Item: 8. 10.2.2, Source: Inter Digital (summary rapporteur), Title: Report of [AT114-e][NTN] Other MAC aspects, Document for: Discussion, Decision (Year: 2021).*

(Continued)

*Primary Examiner* — Christopher M Crutchfield
*Assistant Examiner* — Syed Ahmed
(74) *Attorney, Agent, or Firm* — Xin Gao; Kavon Nasabzadeh; Jacob L. Mangan

(57) ABSTRACT

A media access control (MAC) layer of a wireless device sends a first indication indicating transmission of a scheduling request (SR) to a physical layer of the wireless device. The MAC layer receives from the physical layer a second indication indicating the SR is being dropped. In some cases, the MAC layer may receive one or more SR configuration parameters indicating at least one of: an SR prohibit timer; a maximum SR transmission counter; or one or more physical uplink control channel (PUCCH) resources. Based on the receiving the second indication, the MAC layer stops the SR prohibit timer and decrements an SR counter.

20 Claims, 32 Drawing Sheets

(56)                  References Cited

U.S. PATENT DOCUMENTS

| | | | |
|---|---|---|---|
| 2021/0100018 A1 | 4/2021 | Wu | |
| 2021/0266934 A1* | 8/2021 | Deghel | H04W 72/20 |
| 2021/0307108 A1* | 9/2021 | Babaei | H04W 76/18 |
| 2022/0039016 A1 | 2/2022 | Terry et al. | |
| 2022/0095334 A1* | 3/2022 | Takeda | H04W 52/325 |
| 2022/0104280 A1 | 3/2022 | Yang et al. | |
| 2023/0292320 A1* | 9/2023 | Yang | H04L 1/1812 |

FOREIGN PATENT DOCUMENTS

| | | | |
|---|---|---|---|
| WO | 2020/065469 A1 | 4/2020 | |
| WO | 2020/153209 A1 | 7/2020 | |
| WO | WO2021198723 A1 * | 10/2021 | H04W 72/00 |

OTHER PUBLICATIONS

R2-1909122, 3GPP TSG-RAN WG2 Meeting #107, Prague, Czech Republic, Aug. 26-30, 2019, Source: CATT Title: MAC upgrade for SR dropping in PHY Agenda Item: 11.20.2 Document for: Discussion and Decision (Year: 2019).*

R2-2106523, 3GPP RAN WG2 Meeting #114e, eMeeting May 19-May 27, 2021, Agenda Item: 8.10.2.2, Source: Inter Digital (summary rapporteur), Title: Report of [AT114-e][NTN] Other MAC aspects, Document for: Discussion, Decision (Year: 2021) (Year: 2021).*

R2-1909122, 3GPP TSG-RAN WG2 Meeting #107, Prague, Czech Republic, Aug. 26-30, 2019, Source: CATT Title: MAC upgrade for SR dropping in PHY Agenda Item: 11.20.2 Document for: Discussion and Decision (Year: 2019) (Year: 2019).*

3GPP TS 38.211 V16.4.0 (Dec. 2020); Technical Specification; 3rd Generation Partnership Project; Technical Specification Group Radio Access Network; NR; Physical channels and modulation; (Release 16).

3GPP TS 38.212 V16.4.0 (Dec. 2020); Technical Specification; 3rd Generation Partnership Project; Technical Specification Group Radio Access Network; NR; Multiplexing and channel coding; (Release 16).

3GPP TS 38.213 V16.4.0 (Dec. 2020); Technical Specification; 3rd Generation Partnership Project; Technical Specification Group Radio Access Network; NR; Physical layer procedures for control (Release 16).

3GPP TS 38.214 V16.4.0 (Dec. 2020); Technical Specification; 3rd Generation Partnership Project; Technical Specification Group Radio Access Network; NR; Physical layer procedures for data; (Release 16).

3GPP TS 38.300 V16.4.0 (Dec. 2020); Technical Specification; 3rd Generation Partnership Project; Technical Specification Group Radio Access Network; NR; NR and NG-RAN Overall Description; Stage 2; (Release 16).

3GPP TS 38.321 V16.3.0 (Dec. 2020); Technical Specification; 3rd Generation Partnership Project; Technical Specification Group Radio Access Network; NR; Medium Access Control (MAC) protocol specification; (Release 16).

3GPP TS 38.331 V16.3.1 (Jan. 2021); Technical Specification; 3rd Generation Partnership Project; Technical Specification Group Radio Access Network; NR; Radio Resource Control (RRC) protocol specification; (Release 16).

3GPP TR 38.821 V16.0.0 (Dec. 2019); Technical Report; 3rd Generation Partnership Project; Technical Specification Group Radio Access Network; Solutions for NR to support non-terrestrial networks (NTN); (Release 16).

R2-2006702; 3GPP TSG-RAN WG2 #111-e; e-Meeting, Aug. 17-28, 2020; Title: Enhancements for NTN on MAC Layer—Impact Analysis on TS; Source: Nomor Research GmbH, Thales; Type: Discussion; Document for: Agreement.

R2-2006974; 3GPP TSG-RAN WG2 Meeting #111e; E-Meeting: Aug. 17-28, 2020; Agenda item: 8.10.2.1; Source: Qualcomm Inc.; Title: UP aspects including Random Access procedure enhancements; Document for: Discussion and Decision.

R2-2007056; 3GPP TSG-RAN WG2 Meeting #111-e; Online, Aug. 17-28, 2020; Agenda item: 8.10.2.1; Source: Spreadtrum Communications; Title: Introducing offsets in MAC; Document for: Discussion and Decision.

R2-2007176; 3GPP TSG RAN WG2 #111; e-Meeting, Aug. 17-28, 2020; Agenda Item: 8.10.2.1; Source: Xiaomi; Title: Discussion on UL scheduling enhancement; Document for: Discussion and Decision.

R2-2007186; 3GPP TSG-RAN WG2 Meeting #111 electronic; Online, Aug. 17-28, 2020; Agenda Item: 3.10.2.1; Source: Sony; Title: MAC enhancements in NTN; Document for: Discussion.

R2-2007714; 3GPP TSG-RAN WG2 Meeting #111; E-meeting, Aug. 17-28, 2020; Agenda Item: 8.10.2.1; Source: Ericsson; Title: On scheduling, HARQ, DRX, RLC, and PDCP for NTN; Document for: Discussion, Decision.

R2-2007888; 3GPP TSG-RAN WG2 #111-e; E-meeting, Aug. 17-Aug. 28, 2020; Agenda Item: 8.10.2.1 (NR_NTN_solutions-Core); Source: LG Electronics Inc.; Title: Discussion on MAC aspects for NTN; Document for: Discussion and Decision.

R2-2008188; 3GPP RAN WG2 Meeting #111e; Aug. 17-28, 2020; Agenda Item: 8.10.2.1; Source: InterDigital (email discussion Rapporteur); Title: Summary of [AT111][107][NTN] Pre-compensation and other MAC issues; Document for: Discussion, Decision.

R2-2008214; 3GPP RAN WG2 Meeting #111e; Aug. 17-28, 2020; Agenda Item: 8.10.2.1; Source: InterDigital (email discussion Rapporteur); Title: Summary of [AT111][107][NTN] Pre-compensation and other MAC issues Phase 2; Document for: Discussion, Decision.

R2-2009063; 3GPP TSG-RAN WG2 #112-e; e-Meeting, Nov. 2-13, 2020; Revision of R2-2006702; Title: Enhancements for NTN on MAC Layer; Source: Nomor Research GmbH, Thales; Type: Discussion; Document for: Agreement.

R2-2009064; 3GPP TSG-RAN WG2 #112-e; e-Meeting, Nov. 2-13, 2020; Title: Enhancements on UL scheduling for NTN; Source: Nomor Research GmbH, Thales; Type: Discussion; Document for: Agreement.

R2-2009895; 3GPP TSG-RAN WG2 Meeting #112 electronic; Online, Nov. 2-13, 2020; Agenda Item: 3.10.2.2; Source: Sony; Title: Other MAC enhancements in NTN; Document for: Discussion.

R2-2010168; 3GPP TSG-RAN WG2 #112; E-Meeting, Nov. 2-13, 2020; Revision of R2-2007714; Agenda Item: 8.10.2.2; Source: Ericsson; Title: On scheduling, HARQ, and DRX for NTN; Document for: Discussion, Decision.

R2-2010335; 3GPP TSG-RAN WG2 #112-e; E-meeting, Nov. 2-Nov. 13, 2020; Agenda Item: 8.2.10.2 (NR_NTN_solutions-Core); Source: LG Electronics Inc.; Title: Discussion on scheduling enhancement; Document for: Discussion and Decision.

R2-2010455; e3GPP RAN WG2 Meeting #112e; Nov. 2-13, 2020; Agenda Item: 8.10.2.1; Source: InterDigital (email discussion Rapporteur); Title: Summary of [Post111-e][908][NTN] RACH and HARQ feedback aspects; Document for: Discussion, Decision.

R2-2100161; 3GPP TSG-RAN WG2 Meeting #113-e; Electronic, Jan 25-Feb. 5, 2021; Agenda Item: 8.10.2.2; Source: OPPO; Title: Report of [Post112-e][152][NTN] UL scheduling enhancements; WID/SID: NR_NTN_solutions- Core—Release 17; Document for: Discussion, Decision.

R2-2100251; 3GPP TSG RAN WG2 Meeting #113; e-Meeting, Jan. 25-Feb. 5, 2021; Agenda item: 8.10.2.1; Source: Samsung; Title: RACH Aspects for an NTN—Observations and Proposals; Document for: Discussion & Decision.

R2-2100334; 3GPP TSG-RAN WG2 Meeting #113-e; Electronic meeting, Jan. 25-Feb. 5, 2021; Source: CATT; Title: Discussion on UL Scheduling Enhancements in NR NTN; Agenda Item: 8.10.2.2; Document for: Discussion and Decision.

R2-2100415; TSG-RAN WG2 Meeting #113 electronic; Online, Jan. 25-Feb. 5, 2021; Source: CAICT; Title: Considerations on RACH procedure enhancements in NTN; Agenda Item: 8.10.2.1; Document for: Discussion and decision.

R2-2100663; 3GPP TSG-RAN WG2 Meeting #113-e; Online, Jan. 25-Feb. 5, 2021; Agenda item: 8.10.2.1; Source: Spreadtrum Communications; Title: Discussion on Random Access in NTN; Document for: Discussion and Decision.

(56) References Cited

OTHER PUBLICATIONS

R2-2100740; 3GPP TSG-RAN WG2 Meeting #113e; E-Meeting: Jan. 25-Feb. 5, 2021; Agenda item: 8.10.2.1; Source: Qualcomm Incorporated; Title: Details of the start offset in Random Access procedure; Document for: Discussion and Decision.
R2-2101063; 3GPP TSG-RAN WG2 Meeting #113 Electronic; Elbonia, Jan. 25-Feb. 5, 2021; Agenda item: 8.10.2.2; Source: Nokia, Nokia Shanghai Bell; Title: On UL scheduling enhancements and UE-calculated TA report in NTN; WID/SID: NR_NTN_solutions—Core—Release 17; Document for: Discussion and Decision.
R2-2101254; 3GPP TSG-RAN WG2 #113-e; e-Meeting, Jan. 25-Feb. 5, 2021; Revision of R2-2009064; Title: Enhancements on UL scheduling for NTN; Source: Thales; Type: Discussion; Document for: Agreement.
R2-2101493; 3GPP TSG-RAN WG2 #113-e; E-Meeting, Jan. 25, 2021-Feb. 5, 2021; Revision of R2-2010168; Agenda Item: 8.10.2.2; Source: Ericsson; Title: On scheduling, HARQ, and DRX for NTNs; Document for: Discussion, Decision.
R2-2101494; 3GPP TSG-RAN WG2 #113e; E-Meeting, Jan. 25, 2021-Feb. 5, 2021; Revision of R2-2010980; Agenda Item: 8.10.2.1; Source: Ericsson; Title: On Random Access in NTNs; Document for: Discussion, Decision.
R2-2101580; 3GPP TSG-RAN WG2 #113-e; E-meeting, Jun. 25-Feb. 5, 2021; Agenda Item: 8.10.2.2 (NR_NTN_solutions-Core); Source:

LG Electronics Inc.; Title: Discussion on scheduling enhancement; Document for: Discussion and Decision.
R2-2102626; 3GPP TSG RAN WG2#113bis-e; e-Meeting, Apr. 12-20, 2021; 3GPP TSG RAN WG1 #104-e; e-Meeting, Jan. 25-Feb. 5, 2021; R1-2102244; Title: Reply LS on overlapped data and SR are of equal L1 priority; Response to: R1-2100026; Release: Rel-16; Work Item: NR_IIOT-Core; Source: RAN1; To: RAN2.
R2-2102724; 3GPP TSG-RAN WG2 Meeting #113bis-e ; Online, Apr. 12-Apr. 20, 2021; Source: CATT; Title: Analysis of RAN1 reply LS on overlapped SR and data; Agenda Item: 6.1.3.1; Document for: Discussion and Decision.
R2-2102754; 3GPP TSG-RAN WG2 Meeting #113-bis-electronic; Online, Apr. 12-Apr. 20, 2021; Title: [Draft] Reply LS to RAN1 on overlapped data and SR are of equal L1 priority; Response to: R1-2102244 (R2-2102626); Release: Release 16; Work Item: NR_IIOT-Core; Source: vivo [to be RAN2]; To: RAN1.
R2-2102775; 3GPP TSG RAN WG2 Meeting #113bis-e; e-Meeting, Apr. 12-20, 2021; Agenda item: 6.1.3.1; Source: Samsung; Title: Discussion on overlapped data and SR with equal PHY priority; Document for: Discussion and Decision.
R2-2103481; 3GPP TSG-RAN WG2 Meeting #113bis-e; Online, Apr. 12-20, 2021; Agenda item: 6.1; Source: Huawei, HiSilicon; Title: MAC behaviour for overlapped UCI(s), SR and PUSCH with equal L1 priority; Document for: Discussion and Decision.

* cited by examiner

FIG. 5B

Uplink

FIG. 5A

Downlink

Logical
Channels

Transport
Channels

Physical
Channels

Physical
Signals

FIG. 7

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Time

Frequency

Intraband, contiguous 1002

Component Carrier

Freq. Band A    Freq. Band B

Intraband, non-contiguous 1004

Freq. Band A    Freq. Band B

Interband 1006

Freq. Band A    Freq. Band B

PUCCH Group 1010    PUCCH Group 1050

Downlink Component Carriers

PCell 1011    SCell 1012    SCell 1013    PSCell 1051    SCell 1052    SCell 1053

UCI 1031    UCI 1032    UCI 1033    UCI 1071    UCI 1072    UCI 1073

Uplink Component Carriers

PCell 1021    SCell 1022    SCell 1023    PSCell 1061    SCell 1062    SCell 1063

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 3_0 | Scheduling of NR sidelink in one cell |
| 3_1 | Scheduling of LTE sidelink in one cell |

FIG. 20

Non-terrestrial network architecture with transparent satellite

Non-terrestrial network architecture with regenerative satellite

| RAT type/ Platform type | Altitude range | Orbit | Typical beam footprint size |
|---|---|---|---|
| LEO satellite | 250 – 1500 km | Circular around the earth | 100 – 500 km |
| MEO satellite | 5000 – 25000 km | | 100 – 500 km |
| GEO satellite | 35,786 km | Notional station keeping position fixed in terms of elevation/azimuth with respect to a given earth point | 200 – 1000 km |
| UAS platform | 8-50 km (20km for HAPS) | | 5 – 200 km |
| HEO platform | 400 – 50000km | Elliptical around the earth | 200 – 1000km |

Types of non-terrestrial network platforms

FIG. 26

| Class of Orbit | Altitude (km) | Elevation angle (degrees) | |
|---|---|---|---|
| | | 0 | 10 | 90 |
| LEO satellite | | Propagation delay – satellite to UE (millisec) | | |
| | 800 | 11.0 | 7.9 | 2.7 |
| | 1400 | 14.8 | 11.6 | 4.7 |
| MEO satellite | | Propagation delay – satellite to UE (millisec) | | |
| | 8000 | 43.0 | 39.4 | 26.7 |
| GEO satellite | | Propagation delay – satellite to UE (millisec) | | |
| | 35,786 | 138.9 | 135.3 | 119.3 |

Types of non-terrestrial network platforms

FIG. 27

SCHEDULING REQUEST IN NON-TERRESTRIAL NETWORKS

CROSS-REFERENCE TO RELATED APPLICATIONS

This application claims the benefit of U.S. Provisional Application No. 63/191,015, filed May 20, 2021, which is hereby incorporated by reference in its entirety.

BRIEF DESCRIPTION OF THE DRAWINGS

Examples of several of the various embodiments of the present disclosure are described herein with reference to the drawings.

FIG. 5A and FIG. 5B respectively illustrate a mapping between logical channels, transport channels, and physical channels for the downlink and uplink.

FIG. 7 illustrates an example configuration of an NR frame into which OFDM symbols are grouped.

FIG. 20 shows examples of DCI formats.

FIG. 26 is an example figure of different types of non-terrestrial network platforms.

FIG. 27 examples of propagation delay corresponding to NTNs of different altitudes.

DETAILED DESCRIPTION

Figures 1A, 1B:
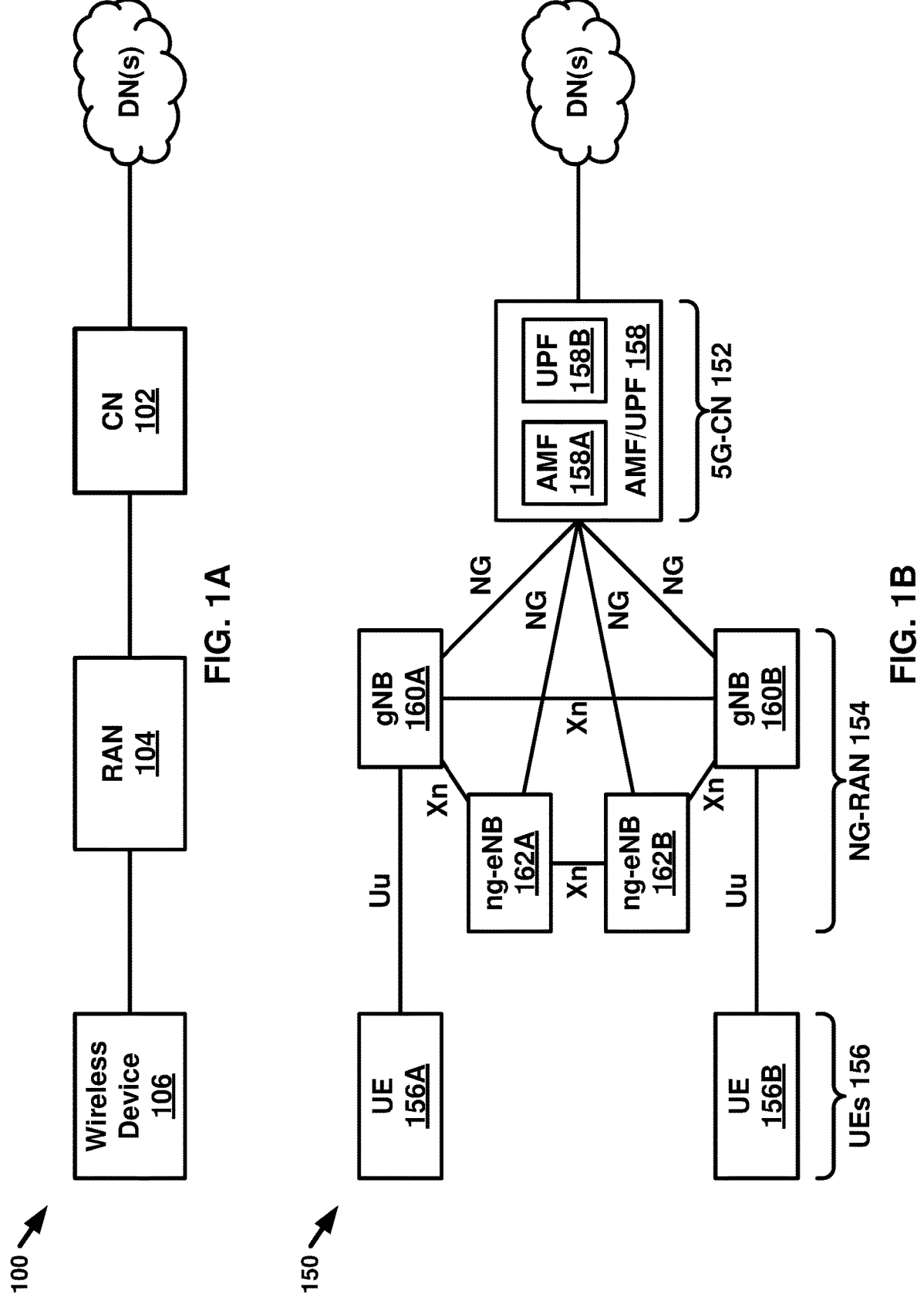
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
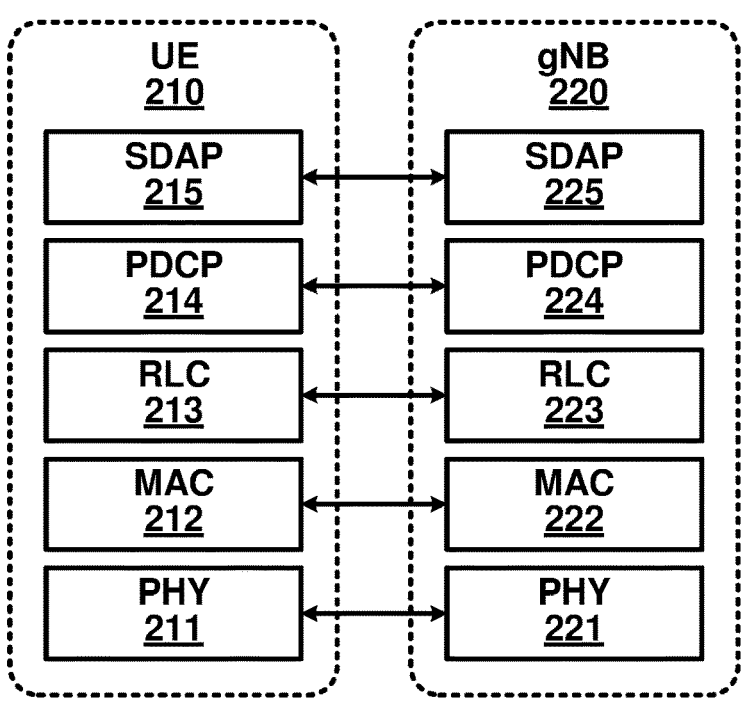
FIG. 2A and FIG. 2B respectively illustrate a New Radio (NR) user plane and control plane protocol stack.
Figure 2B:
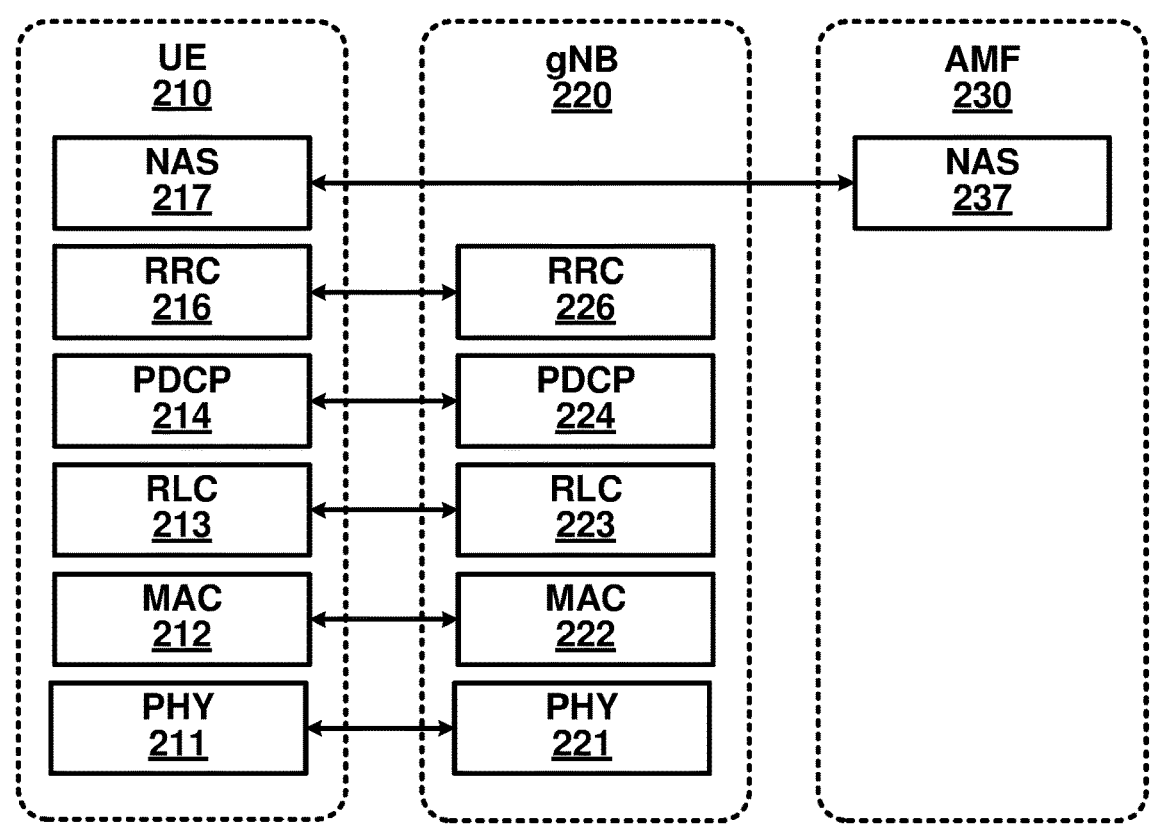

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
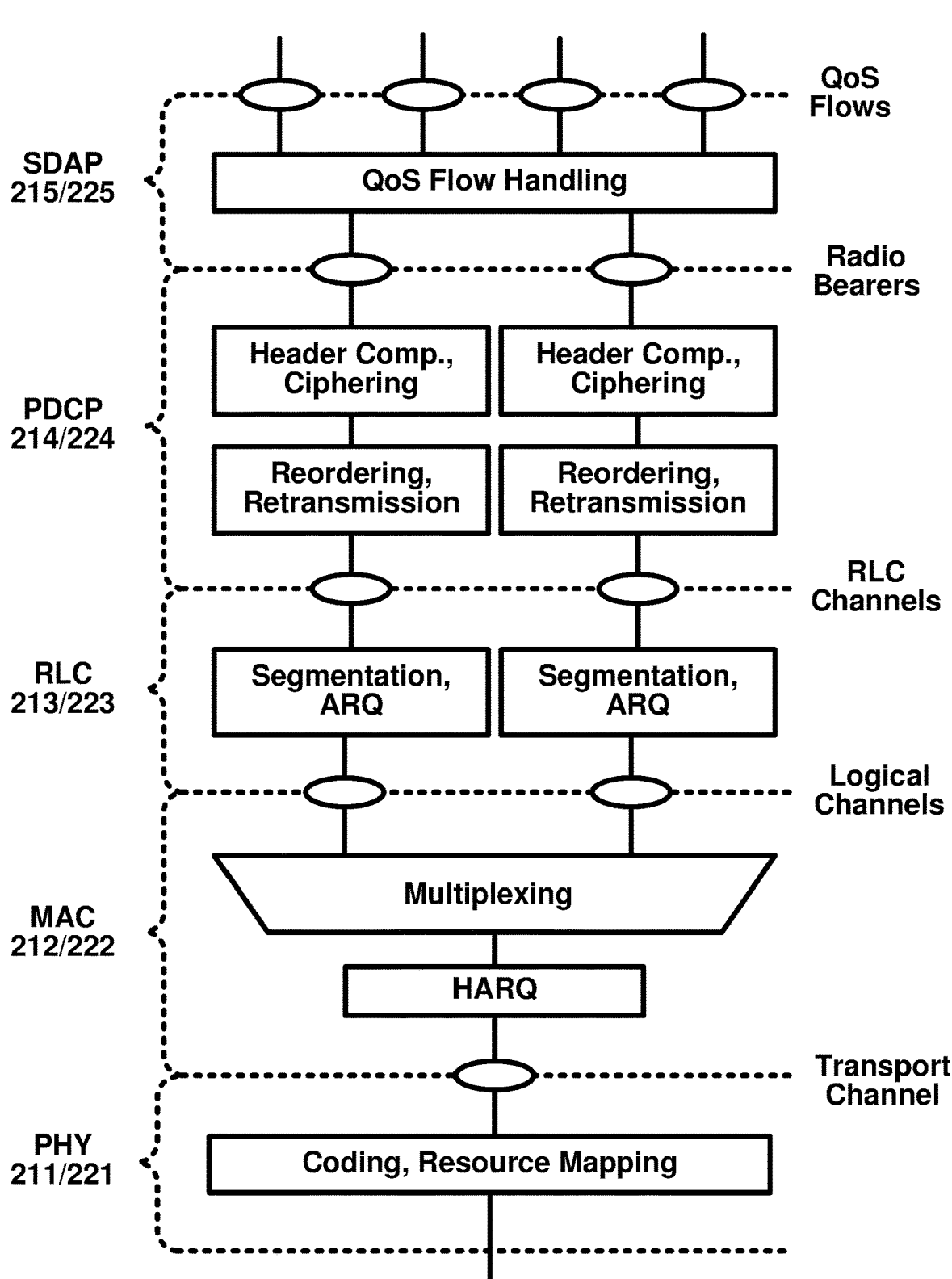
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
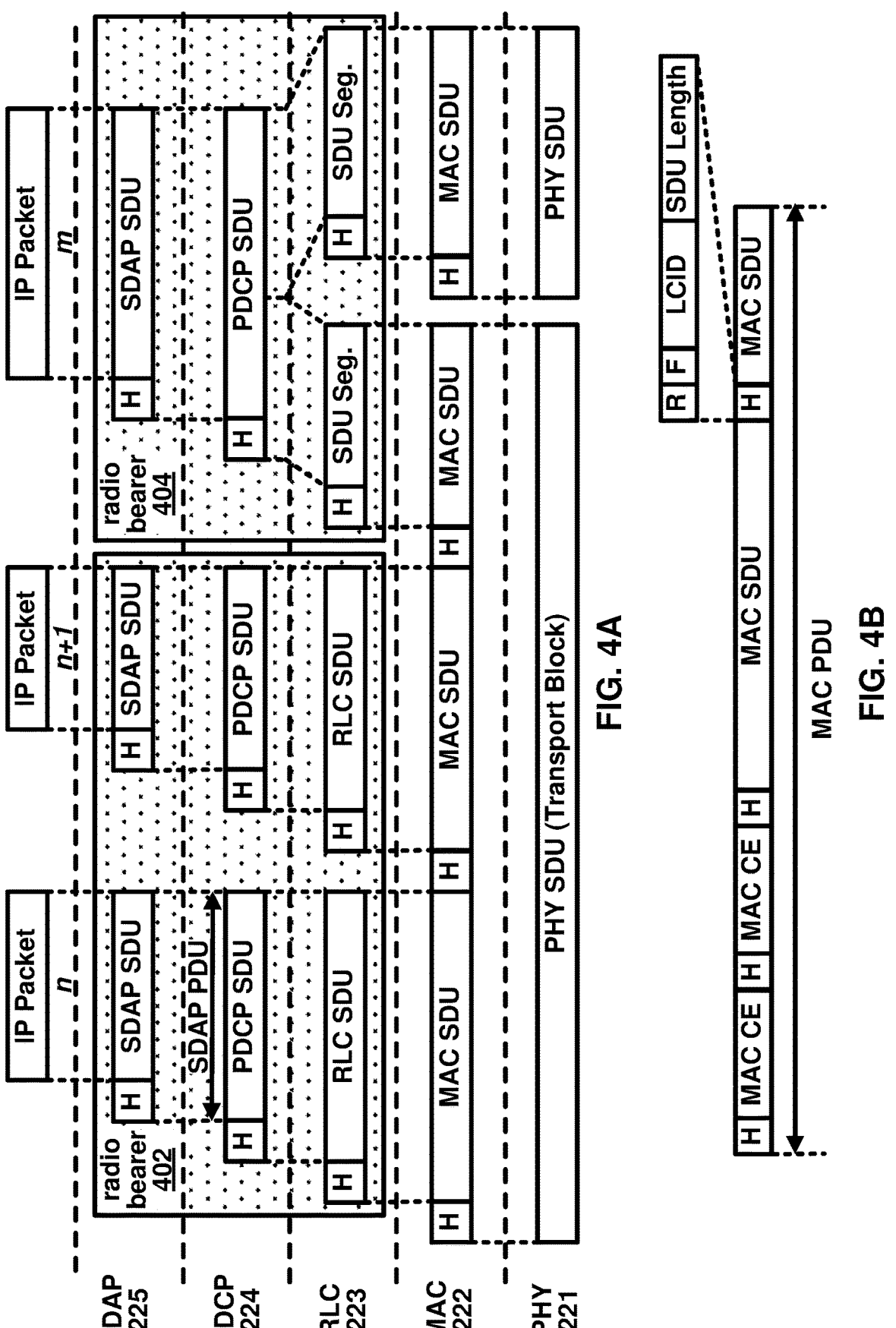
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC sub-header in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
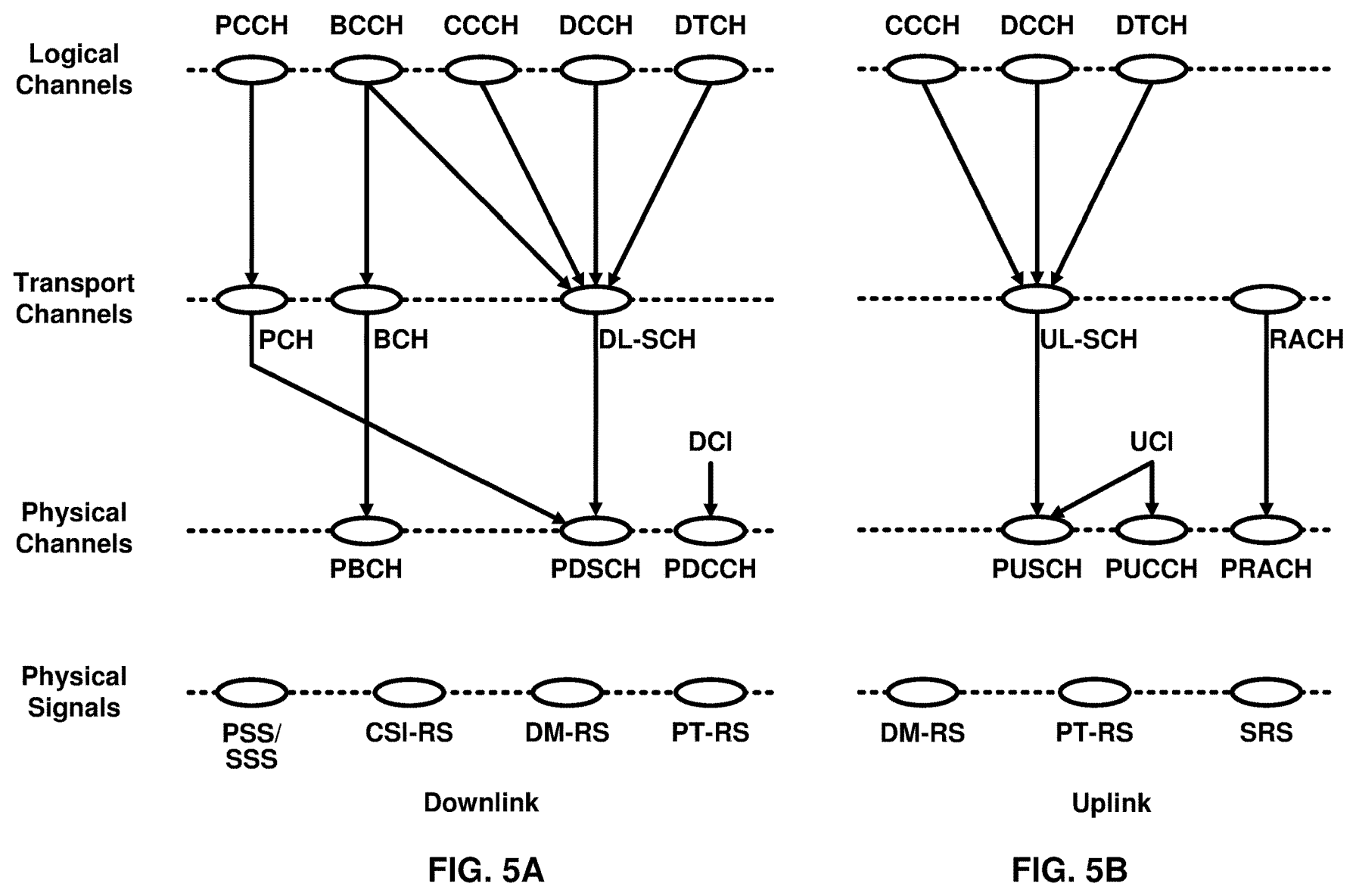

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
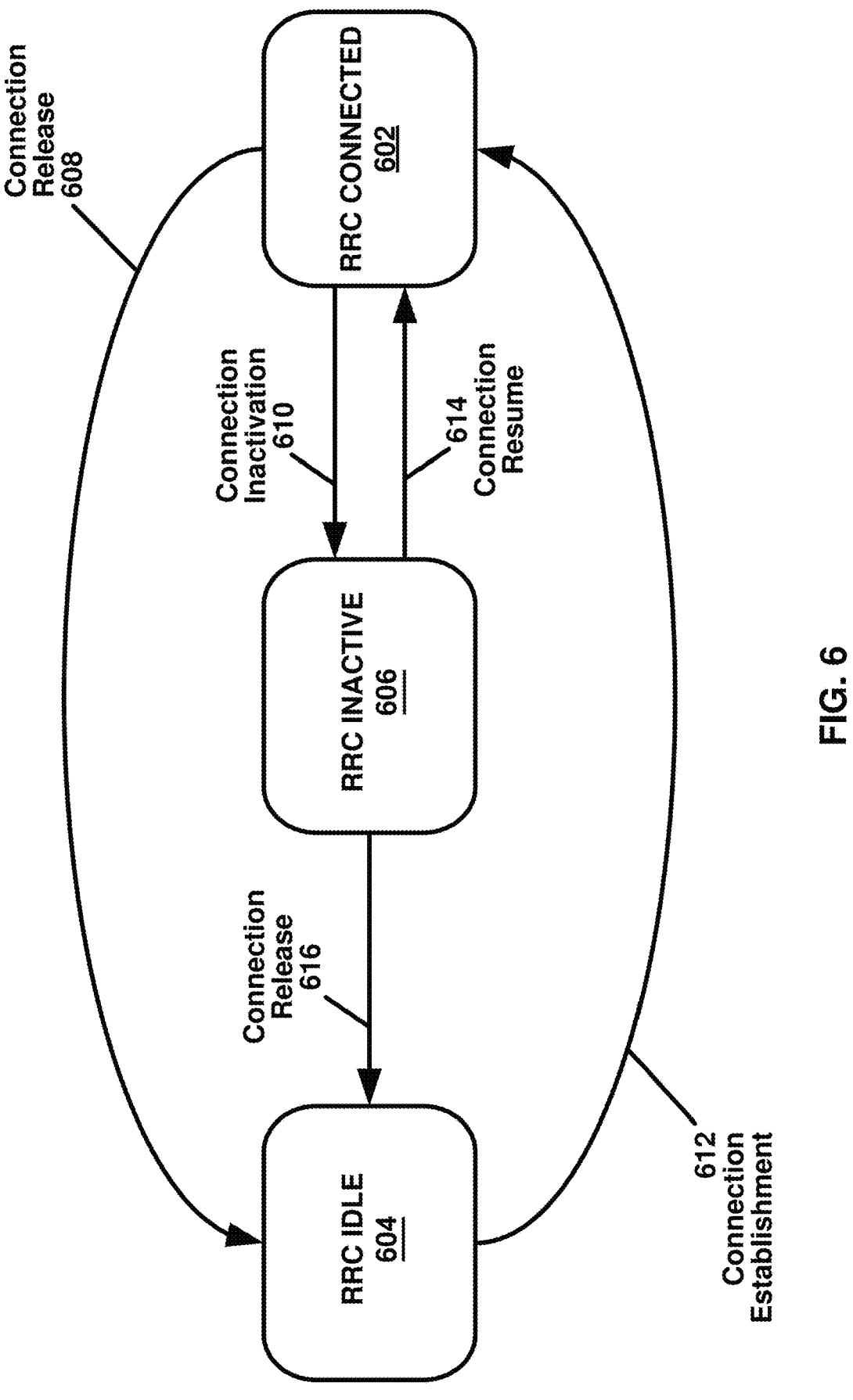
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
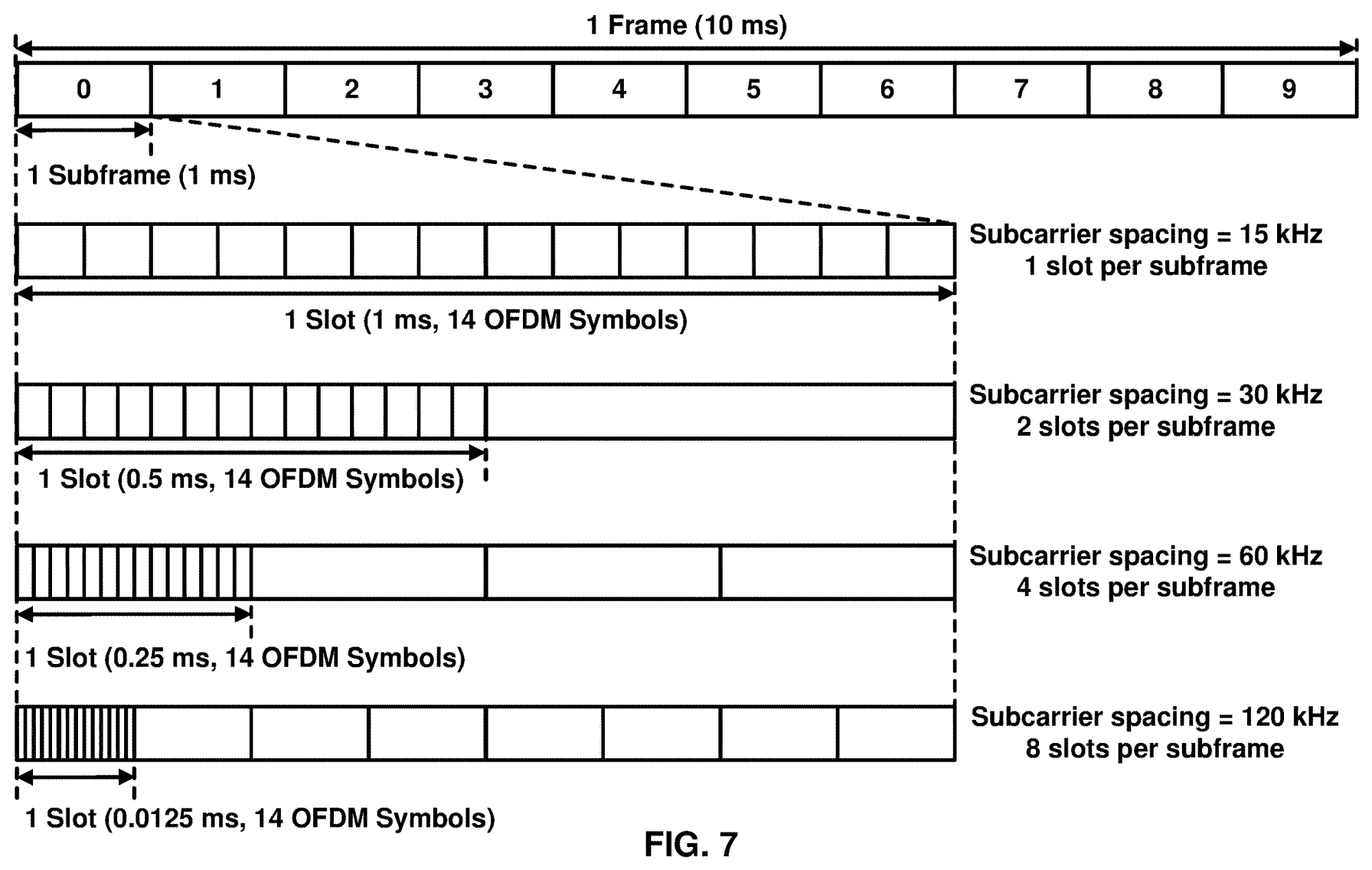

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
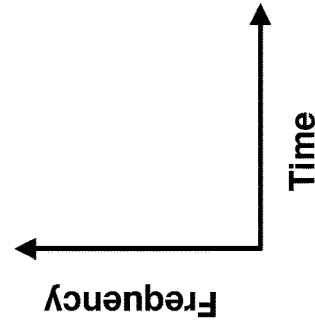
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORE-SETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
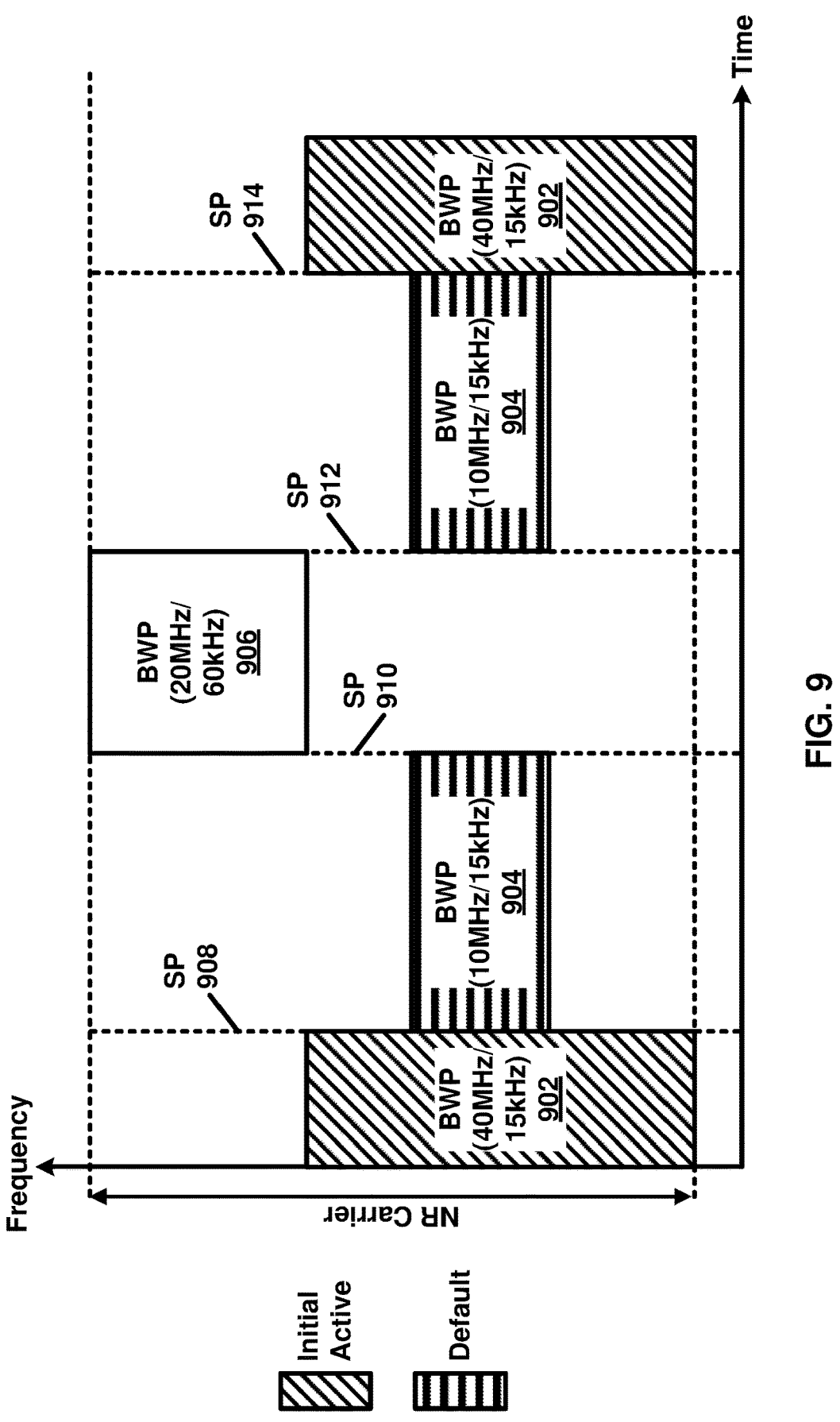
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
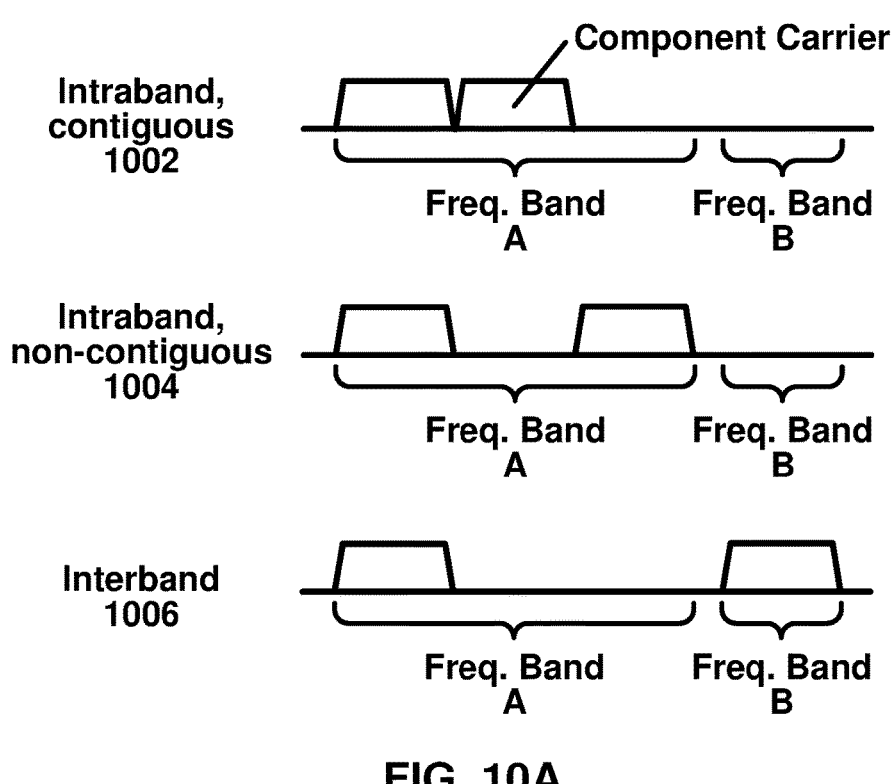
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
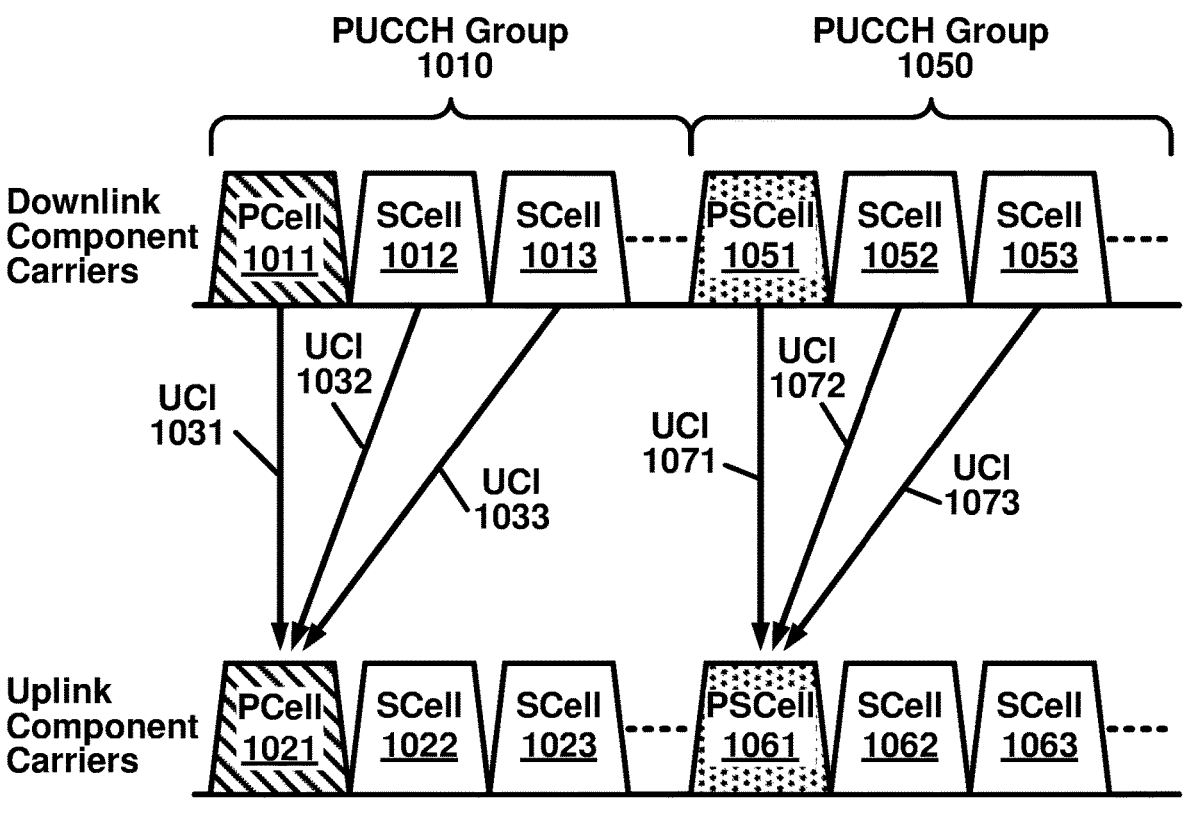
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary secondary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
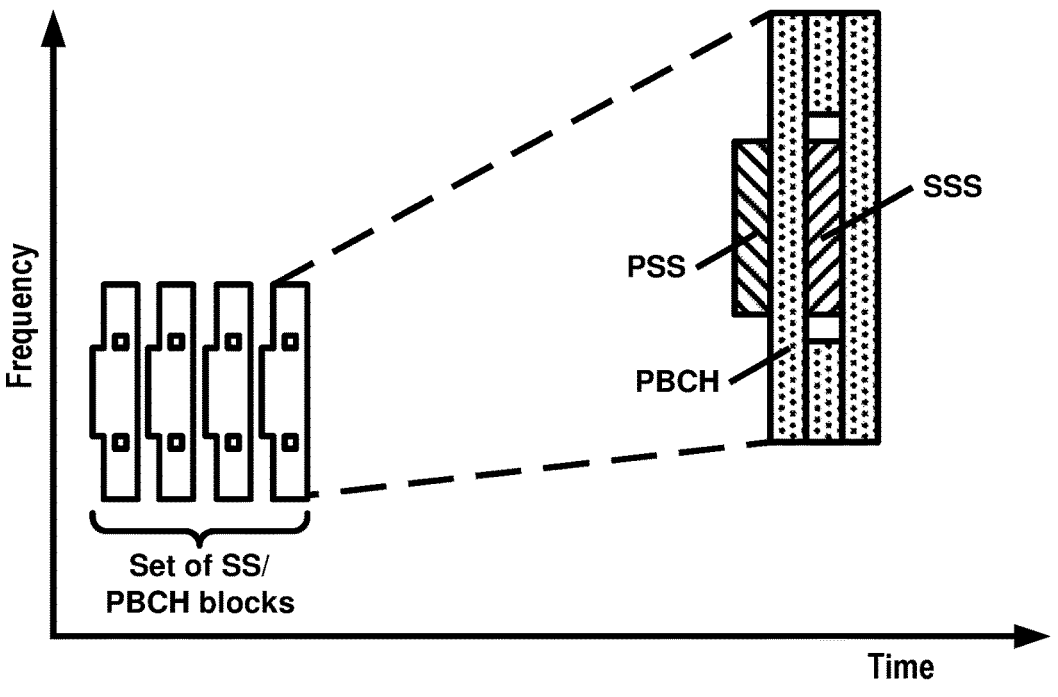
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
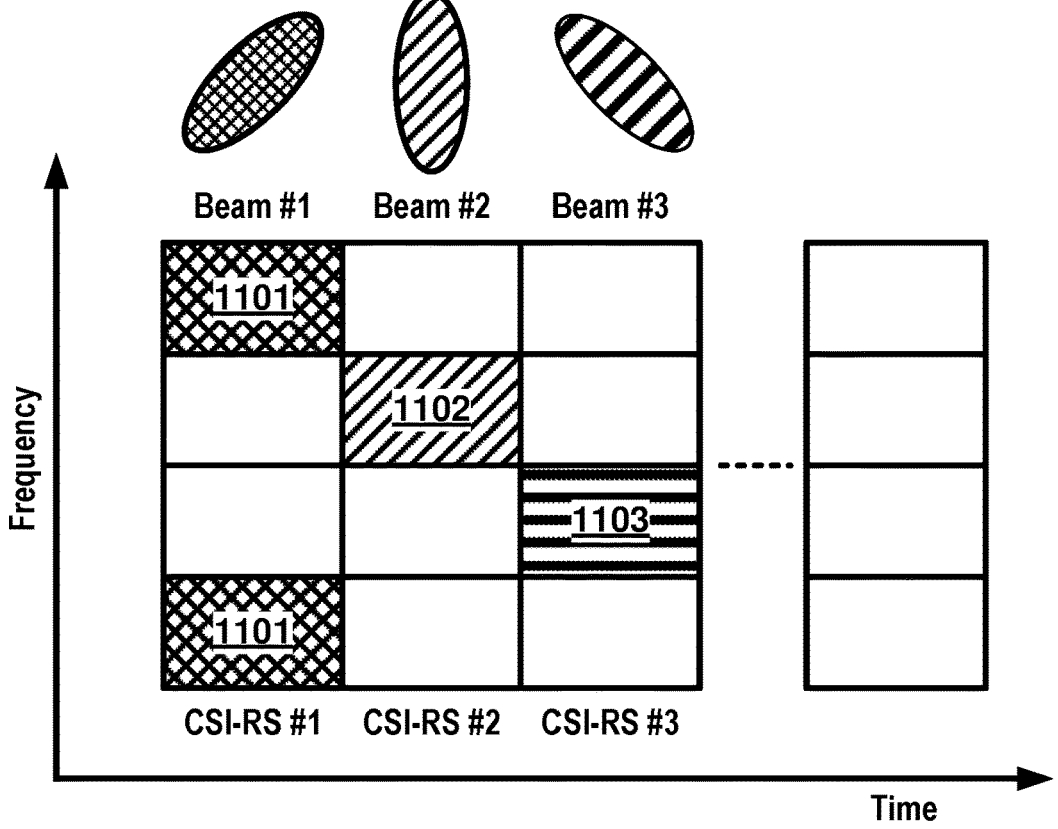
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figures 12A, 12B:
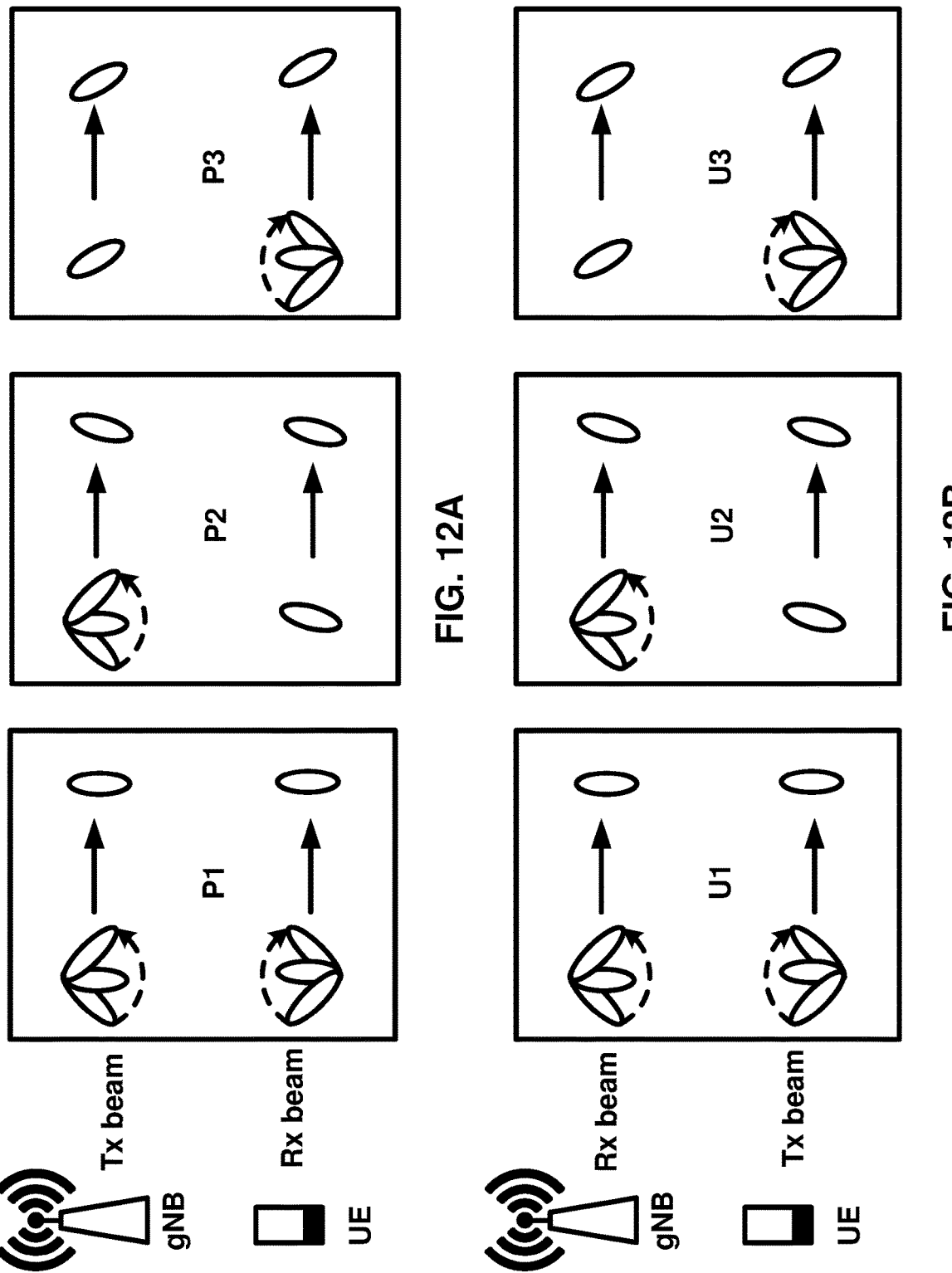
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
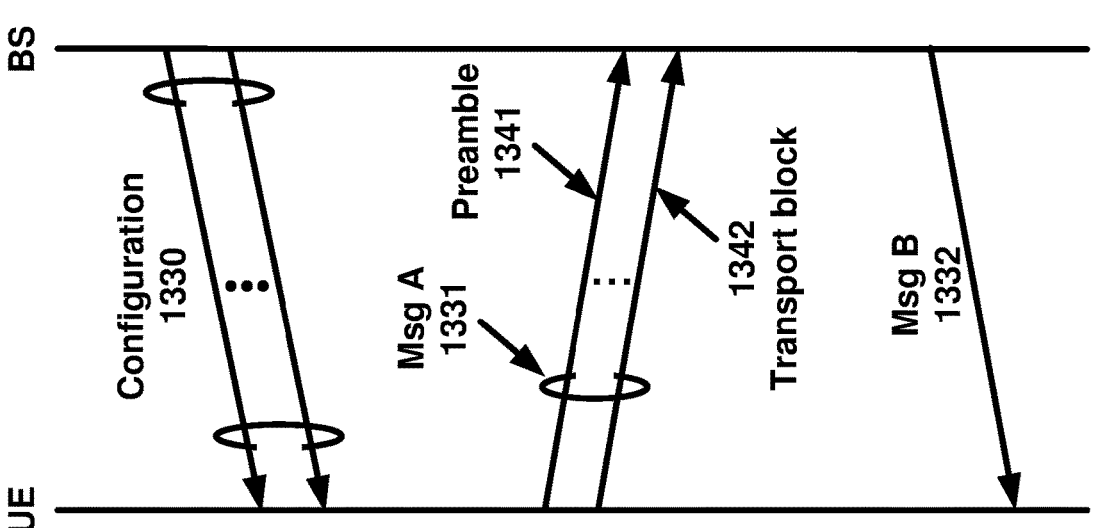
FIG. 13A, FIG. 13B, and FIG. 13C respectively illustrate a four-step contention-based random access procedure, a two-step contention-free random access procedure, and another two-step random access procedure.
Figure 13B:
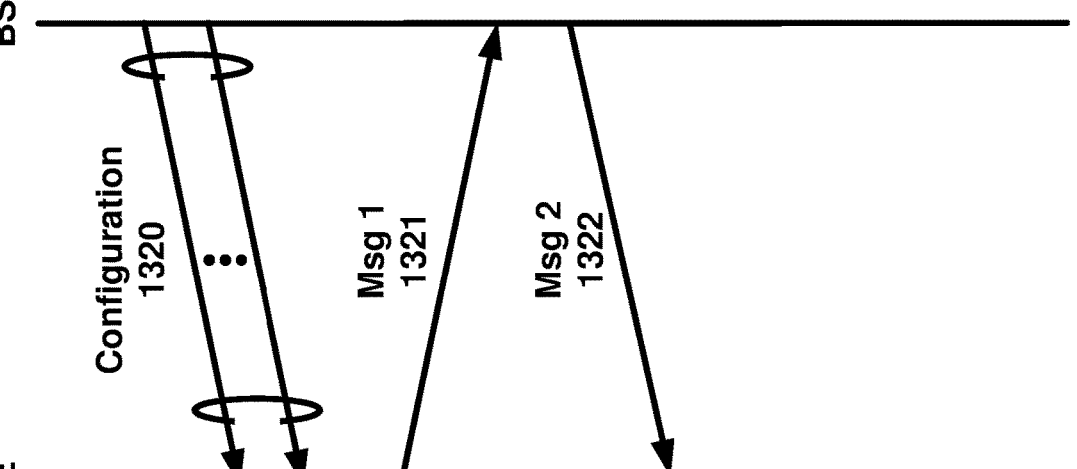
Figure 13A:
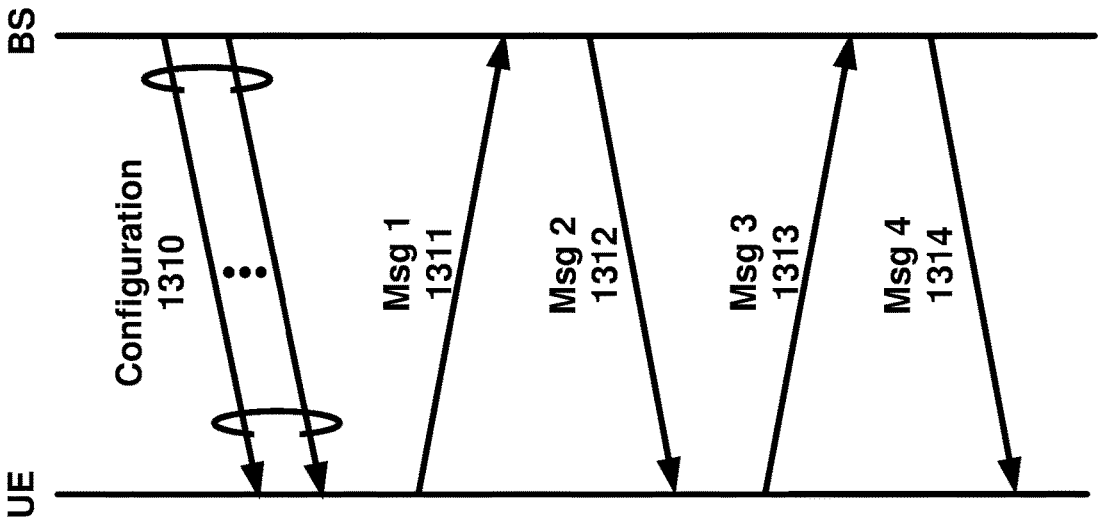

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

RA-RNTI=1+s_id+14×t_id+14×80×f_id+14×80×8×ul_carrier_id where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
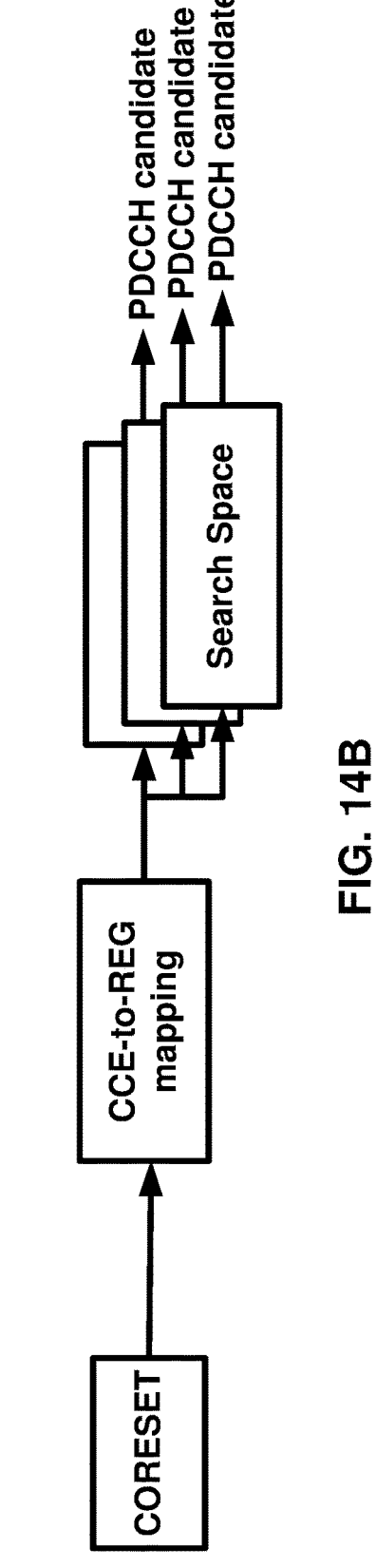
FIG. 14A illustrates an example of CORESET configurations for a bandwidth part.
FIG. 14B illustrates an example of a CCE-to-REG mapping for DCI transmission on a CORESET and PDCCH processing.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
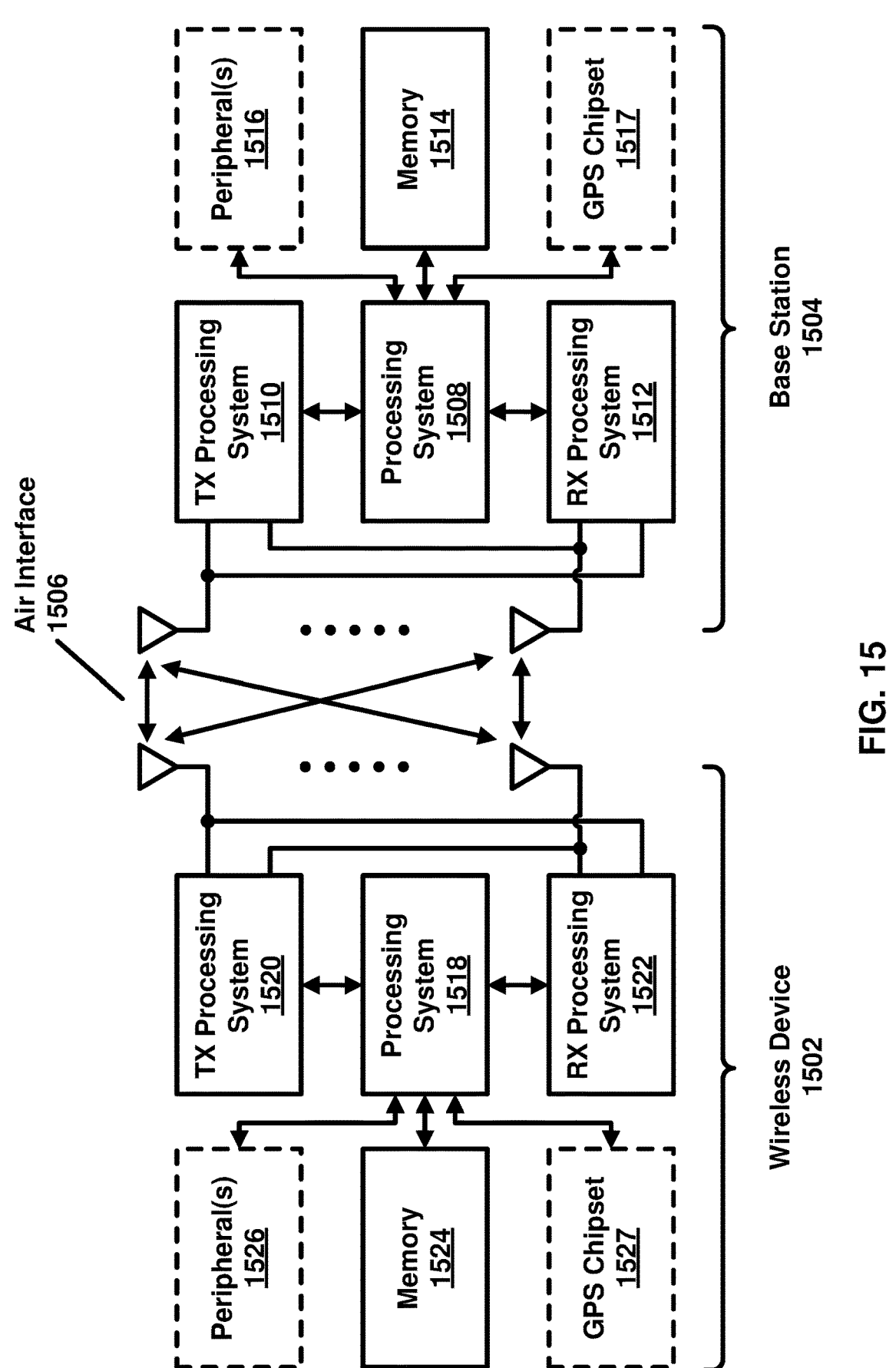
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figures 16A, 16B, 16C, 16D:
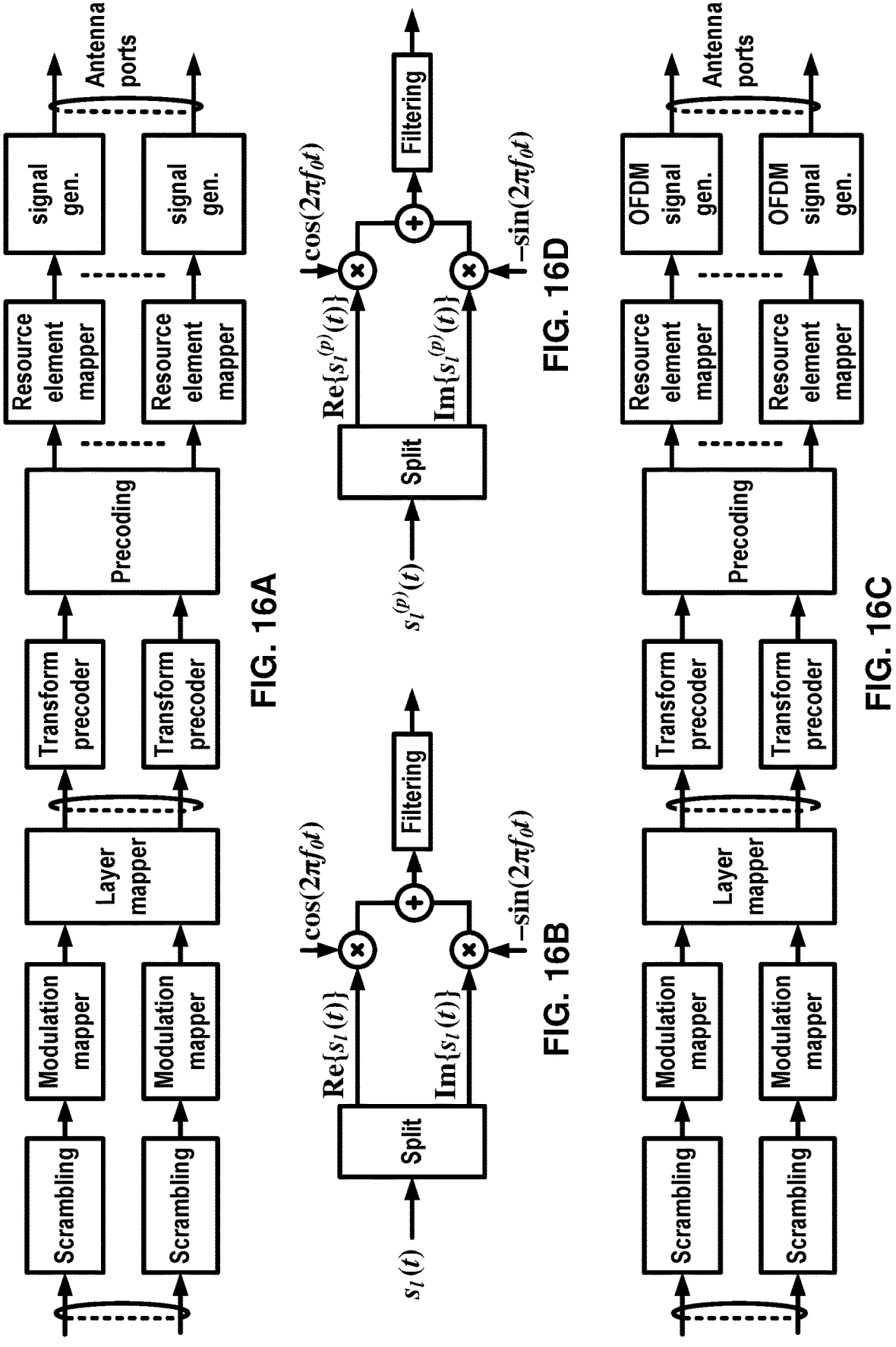
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP- OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier fre- quency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modu- lation symbols onto one or several transmission layers; precoding of the complex-valued modulation symbols on a layer for transmission on the antenna ports; mapping of complex-valued modulation symbols for an antenna port to resource elements; generation of complex-valued time-do- main OFDM signal for an antenna port; and/or the like. These functions are illustrated as examples and it is antici- pated that other mechanisms may be implemented in various embodiments.

FIG. 16D illustrates another example structure for modu- lation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configu- ration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise param- eters for configuring physical and MAC layer channels, bearers, etc. For example, the configuration parameters may comprise parameters indicating values of timers for physi- cal, MAC, RLC, PCDP, SDAP, RRC layers, and/or com- munication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/ window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A base station may transmit one or more MAC PDUs to a wireless device. In an example, a MAC PDU may be a bit string that is byte aligned (e.g., aligned to a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., aligned to a multiple of eight bits) in length. In an example, a MAC SDU may be included in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. In an example, a MAC subheader may be placed immediately in front of a corresponding MAC SDU, MAC CE, or padding. A MAC entity may ignore a value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, or a combination thereof. The MAC SDU may be of variable size. A MAC subheader may correspond to a MAC SDU, a MAC CE, or padding.

In an example, when a MAC subheader corresponds to a MAC SDU, a variable-sized MAC CE, or padding, the MAC subheader may comprise: a Reserve field (R field) with a one bit length; a Format filed (F field) with a one-bit length; a Logical Channel Identifier (LCID) field with a multi-bit length; a Length field (L field) with a multi-bit length, indicating the length of the corresponding MAC SDU or variable-size MAC CE in bytes, or a combination thereof. In an example, F field may indicate the size of the L field.

Figure 17A:
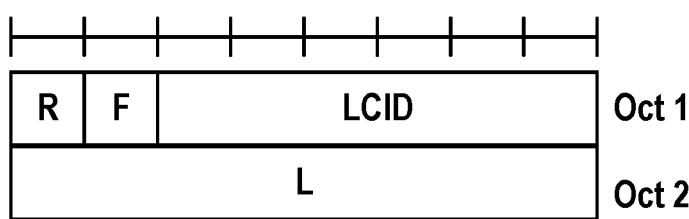
FIG. 17A, FIG. 17B and FIG. 17C show examples of MAC subheaders.
Figure 17B:
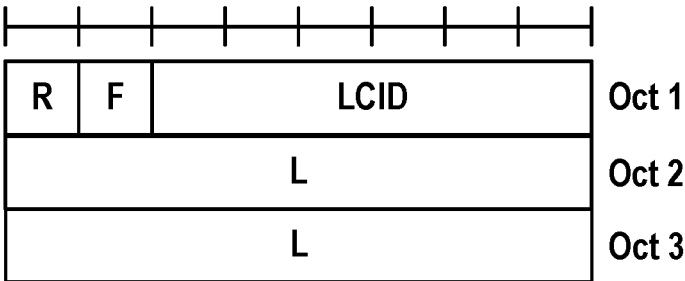
Figure 17C:
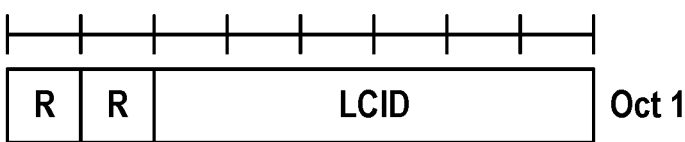

FIG. 17A, FIG. 17B and FIG. 17C show examples of MAC subheaders. FIG. 17A shows an example of a MAC subheader with an R field, an F field, an LCID field, and an L field. In the example MAC subheader of FIG. 17A, the LCID field may be six bits in length, and the L field may be eight bits in length. FIG. 17B shows example of a MAC subheader with an R field, a F field, an LCID field, and an L field. In the example MAC subheader shown in FIG. 17B, the LCID field may be six bits in length, and the L field may be sixteen bits in length. When a MAC subheader corre- sponds to a fixed sized MAC CE or padding, the MAC subheader may comprise: an R field with a two-bit length and an LCID field with a multi-bit length. FIG. 17C shows an example of a MAC subheader with an R field and an LCID field. In the example MAC subheader shown in FIG. 17C, the LCID field may be six bits in length, and the R field may be two bits in length.

Figures 18A, 18B:
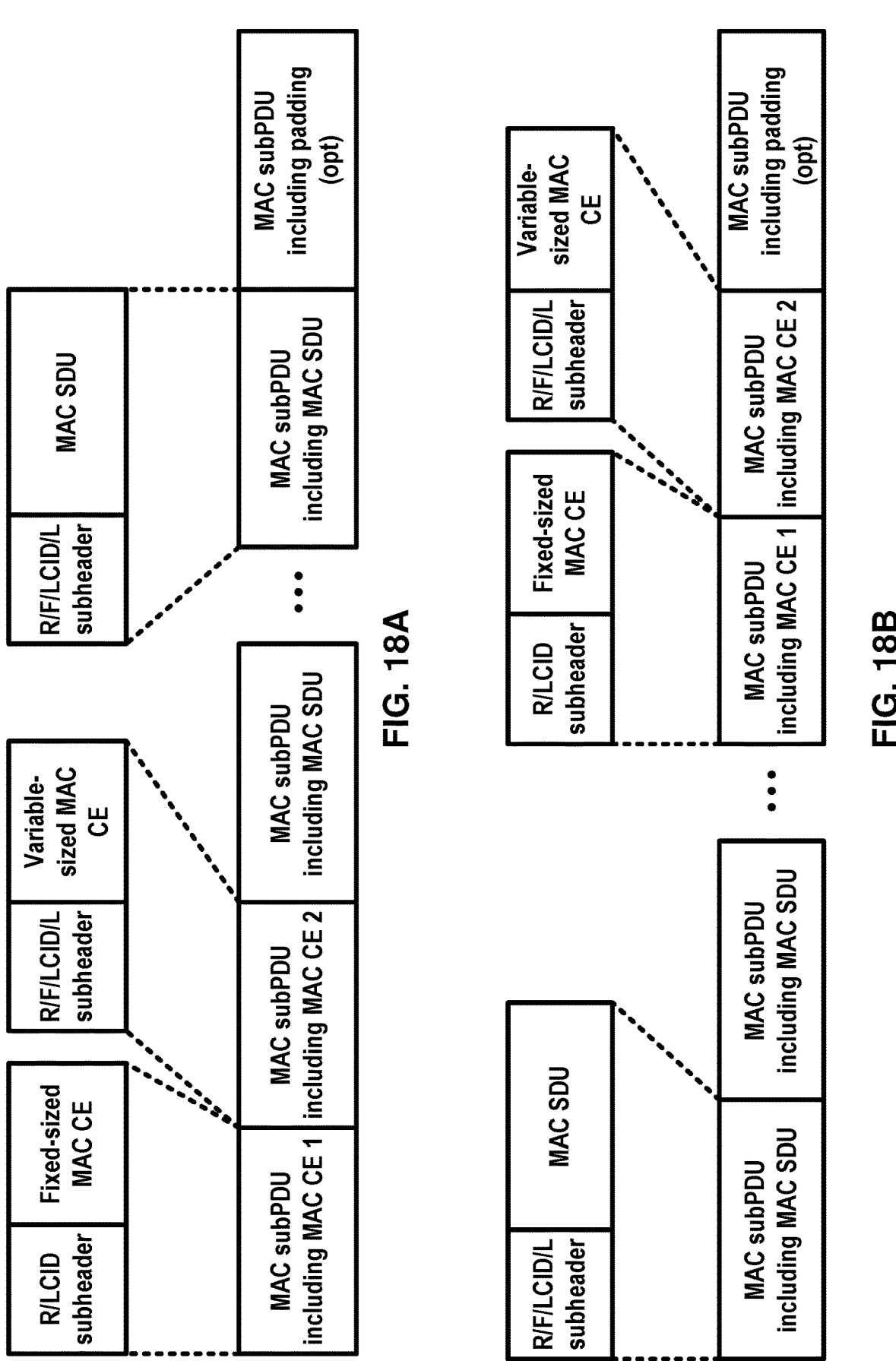
FIG. 18A shows an example of a DL MAC PDU.
FIG. 18B shows an example of an UL MAC PDU.

FIG. 18A shows an example of a DL MAC PDU. Multiple MAC CEs, such as MAC CE 1 and 2, may be placed together. A MAC subPDU, comprising a MAC CE, may be placed before: a MAC subPDU comprising a MAC SDU, or a MAC subPDU comprising padding. FIG. 18B shows an example of an UL MAC PDU. Multiple MAC CEs, such as MAC CE 1 and 2, may be placed together. In an example, a MAC subPDU comprising a MAC CE may be placed after all MAC subPDUs comprising a MAC SDU. In addition, the MAC subPDU may be placed before a MAC subPDU comprising padding.

In an example, a MAC entity of a base station may transmit one or more MAC CEs to a MAC entity of a wireless device. The one or more MAC CEs comprise at least one of: a SP ZP CSI-RS Resource Set Activation/Deactivation MAC CE, a PUCCH spatial relation Activation/Deactivation MAC CE, a SP SRS Activation/Deactivation MAC CE, a SP CSI reporting on PUCCH Activation/Deactivation MAC CE, a TCI State Indication for UE-specific PDCCH MAC CE, a TCI State Indication for UE-specific PDSCH MAC CE, an Aperiodic CSI Trigger State Subselection MAC CE, a SP CSI-RS/CSI-IM Resource Set Activation/Deactivation MAC CE, a UE contention resolution identity MAC CE, a timing advance command MAC CE, a DRX command MAC CE, a Long DRX command MAC CE, an SCell activation/deactivation MAC CE (1 Octet), an SCell activation/deactivation MAC CE (4 Octet), and/or a duplication activation/deactivation MAC CE. In an example, a MAC CE, such as a MAC CE transmitted by a MAC entity of a base station to a MAC entity of a wireless device, may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a long DRX command MAC CE.

In an example, the MAC entity of the wireless device may transmit to the MAC entity of the base station one or more MAC CEs. The one or more MAC CEs may comprise at least one of: a short buffer status report (BSR) MAC CE, a long BSR MAC CE, a C-RNTI MAC CE, a configured grant confirmation MAC CE, a single entry PHR MAC CE, a multiple entry PHR MAC CE, a short truncated BSR, and/or a long truncated BSR. In an example, a MAC CE may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. A wireless device may simultaneously receive or transmit on one or more CCs, depending on capabilities of the wireless device, using the technique of CA. In an embodiment, a wireless device may support CA for contiguous CCs and/or for non-contiguous CCs. CCs may be organized into cells. For example, CCs may be organized into one primary cell (PCell) and one or more secondary cells (SCells). When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a base station may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a base station may activate or deactivate at least one of the one or more SCells. Upon configuration of an SCell, the SCell may be deactivated unless an SCell state associated with the SCell is set to "activated" or "dormant."

A wireless device may activate/deactivate an SCell in response to receiving an SCell Activation/Deactivation MAC CE. In an example, a base station may transmit, to a wireless device, one or more messages comprising an SCell timer (e.g., sCellDeactivationTimer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising SRS transmissions on the SCell; CQI/PMI/RI/CRI reporting for the SCell; PDCCH monitoring on the SCell; PDCCH monitoring for the SCell; and/or PUCCH transmissions on the SCell. In response to the activating the SCell, the wireless device may start or restart a first SCell timer (e.g., sCellDeactivationTimer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivationTimer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

When an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell. When at least one first PDCCH on an activated SCell indicates an uplink grant or a downlink assignment, a wireless device may restart a first SCell timer (e.g., sCellDeactivationTimer) associated with the activated SCell. In an example, when at least one second PDCCH on a serving cell (e.g., a PCell or an SCell config-
ured with PUCCH, i.e., PUCCH SCell) scheduling the
activated SCell indicates an uplink grant or a downlink
assignment for the activated SCell, a wireless device may
restart the first SCell timer (e.g., sCellDeactivationTimer)
associated with the activated SCell. In an example, when an
SCell is deactivated, if there is an ongoing random access
procedure on the SCell, a wireless device may abort the
ongoing random access procedure on the SCell.

A base station may configure a wireless device with
uplink (UL) bandwidth parts (BWPs) and downlink (DL)
BWPs to enable bandwidth adaptation (BA) on a PCell. If
carrier aggregation is configured, the base station may
further configure the wireless device with at least DL
BWP(s) (i.e., there may be no UL BWPs in the UL) to enable
BA on an SCell. For the PCell, an initial active BWP may
be a first BWP used for initial access. For the SCell, a first
active BWP may be a second BWP configured for the
wireless device to operate on the SCell upon the SCell being
activated. In paired spectrum (e.g., FDD), a base station
and/or a wireless device may independently switch a DL
BWP and an UL BWP. In unpaired spectrum (e.g., TDD), a
base station and/or a wireless device may simultaneously
switch a DL BWP and an UL BWP.

In an example, a base station and/or a wireless device may
switch a BWP between configured BWPs by means of a DCI
or a BWP inactivity timer. When the BWP inactivity timer
is configured for a serving cell, the base station and/or the
wireless device may switch an active BWP to a default BWP
in response to an expiry of the BWP inactivity timer
associated with the serving cell. The default BWP may be
configured by the network. In an example, for FDD systems,
when configured with BA, one UL BWP for each uplink
carrier and one DL BWP may be active at a time in an active
serving cell. In an example, for TDD systems, one DL/UL
BWP pair may be active at a time in an active serving cell.
Operating on the one UL BWP and the one DL BWP (or the
one DL/UL pair) may improve wireless device battery
consumption. BWPs other than the one active UL BWP and
the one active DL BWP that the wireless device may work
on may be deactivated. On deactivated BWPs, the wireless
device may: not monitor PDCCH; and/or not transmit on
PUCCH, PRACH, and UL-SCH.

In an example, a serving cell may be configured with at
most a first number (e.g., four) of BWPs. In an example, for
an activated serving cell, there may be one active BWP at
any point in time. In an example, a BWP switching for a
serving cell may be used to activate an inactive BWP and
deactivate an active BWP at a time. In an example, the BWP
switching may be controlled by a PDCCH indicating a
downlink assignment or an uplink grant. In an example, the
BWP switching may be controlled by a BWP inactivity timer
(e.g., bwp-InactivityTimer). In an example, the BWP switch-
ing may be controlled by a MAC entity in response to
initiating a Random Access procedure. Upon addition of a
PSCell or activation of an SCell, one BWP may be initially
active without receiving a PDCCH indicating a downlink
assignment or an uplink grant. The active BWP for a serving
cell may be indicated by RRC and/or PDCCH. In an
example, for unpaired spectrum, a DL BWP may be paired
with a UL BWP, and BWP switching may be common for
both UL and DL.

Figure 19:
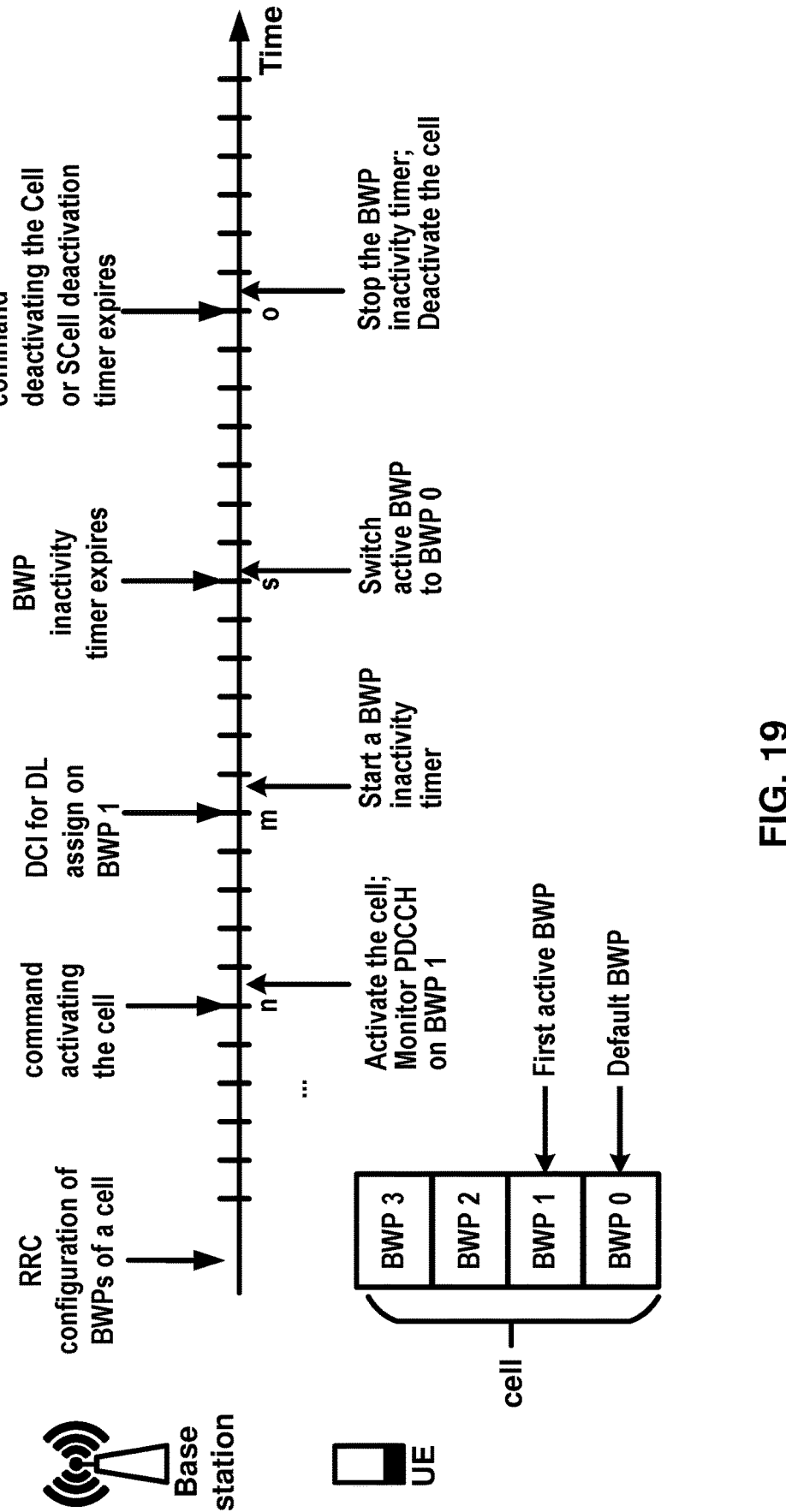
FIG. 19 shows an example of BWP switching on a cell.

FIG. 19 shows an example of BWP switching on a cell.
The cell may be a PCell or a SCell. In an example, a wireless
device may receive, from a base station, at least one RRC
message comprising parameters of a cell and one or more
BWPs associated with the cell. The RRC message may comprise: RRC connection reconfiguration message (e.g.,
RRCReconfiguration); RRC connection reestablishment
message (e.g., RRCRestablishment); and/or RRC connec-
tion setup message (e.g., RRCSetup). Among the one or
more BWPs, at least one BWP may be configured as the first
active BWP (e.g., BWP 1), one BWP as the default BWP
(e.g., BWP 0). The wireless device may receive a command
(e.g., RRC message, MAC CE or DCI) to activate the cell at
an $n^{th}$ slot. In case the cell is a PCell, the wireless device may
not receive the command activating the cell, for example,
the wireless device may activate the PCell once the wireless
device receives RRC message comprising configuration
parameters of the PCell. The wireless device may start
monitoring a PDCCH on BWP 1 in response to activating
the cell.

In an example, the wireless device may start (or restart) a
BWP inactivity timer (e.g., bwp-Inactivity Timer) at an $m^{th}$
slot in response to receiving a DCI indicating DL assignment
on BWP 1. The wireless device may switch back to the
default BWP (e.g., BWP 0) as an active BWP when the BWP
inactivity timer expires, at $s^{th}$ slot. The wireless device may
deactivate the cell and/or stop the BWP inactivity timer
when the sCellDeactivationTimer expires (e.g., if the cell is
a SCell). In response to the cell being a PCell, the wireless
device may not deactivate the cell and may not apply the
sCellDeactivationTimer on the PCell.

In an example, a MAC entity may apply normal opera-
tions on an active BWP for an activated serving cell con-
figured with a BWP comprising: transmitting on UL-SCH;
transmitting on RACH; monitoring a PDCCH; transmitting
PUCCH; receiving DL-SCH; and/or (re-)initializing any
suspended configured uplink grants of configured grant Type
1 according to a stored configuration, if any.

In an example, on an inactive BWP for each activated
serving cell configured with a BWP, a MAC entity may: not
transmit on UL-SCH; not transmit on RACH; not monitor a
PDCCH; not transmit PUCCH; not transmit SRS, not
receive DL-SCH; clear any configured downlink assignment
and configured uplink grant of configured grant Type 2;
and/or suspend any configured uplink grant of configured
Type 1.

In an example, if a MAC entity receives a PDCCH for a
BWP switching of a serving cell while a Random Access
procedure associated with this serving cell is not ongoing, a
wireless device may perform the BWP switching to a BWP
indicated by the PDCCH. In an example, if a bandwidth part
indicator field is configured in DCI format 1_1, the band-
width part indicator field value may indicate the active DL
BWP, from the configured DL BWP set, for DL receptions.
In an example, if a bandwidth part indicator field is config-
ured in DCI format 0_1, the bandwidth part indicator field
value may indicate the active UL BWP, from the configured
UL BWP set, for UL transmissions.

In an example, for a primary cell, a wireless device may
be provided by a higher layer parameter Default-DL-BWP a
default DL BWP among the configured DL BWPs. If a
wireless device is not provided a default DL BWP by the
higher layer parameter Default-DL-BWP, the default DL
BWP is the initial active DL BWP. In an example, a wireless
device may be provided by higher layer parameter bwp-
InactivityTimer, a timer value for the primary cell. If con-
figured, the wireless device may increment the timer, if
running, every interval of 1 millisecond for frequency range
1 or every 0.5 milliseconds for frequency range 2 if the
wireless device may not detect a DCI format 11 for paired spectrum operation or if the wireless device may not detect a DCI format 1_1 or DCI format 0_1 for unpaired spectrum operation during the interval.

In an example, if a wireless device is configured for a secondary cell with higher layer parameter Default-DL-BWP indicating a default DL BWP among the configured DL BWPs and the wireless device is configured with higher layer parameter bwp-Inactivity Timer indicating a timer value, the wireless device procedures on the secondary cell may be same as on the primary cell using the timer value for the secondary cell and the default DL BWP for the secondary cell.

In an example, if a wireless device is configured by higher layer parameter Active-BWP-DL-SCell a first active DL BWP and by higher layer parameter Active-BWP-UL-SCell a first active UL BWP on a secondary cell or carrier, the wireless device may use the indicated DL BWP and the indicated UL BWP on the secondary cell as the respective first active DL BWP and first active UL BWP on the secondary cell or carrier.

In an example, a set of PDCCH candidates for a wireless device to monitor is defined in terms of PDCCH search space sets. A search space set comprises a CSS set or a USS set. A wireless device monitors PDCCH candidates in one or more of the following search spaces sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by searchSpaceOtherSystemInformation in PDCCH-Config-Common for a DCI format with CRC scrambled by a SI-RNTI on the primary cell of the MCG, a Type1-PDCCH CSS set configured by ra-SearchSpace in PDCCH-Config-Common for a DCI format with CRC scrambled by a RA-RNTI, a MsgB-RNTI, or a TC-RNTI on the primary cell, a Type2-PDCCH CSS set configured by paging-SearchSpace in PDCCH-ConfigCommon for a DCI format with CRC scrambled by a P-RNTI on the primary cell of the MCG, a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, CI-RNTI, or PS-RNTI and, only for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

In an example, a wireless device determines a PDCCH monitoring occasion on an active DL BWP based on one or more PDCCH configuration parameters comprising: a PDCCH monitoring periodicity, a PDCCH monitoring offset, and a PDCCH monitoring pattern within a slot. For a search space set (SS s), the wireless device determines that a PDCCH monitoring occasion(s) exists in a slot with number $n_{s,f}^\mu$ in a frame with number $n_f$ if $(n_f \cdot N_{slot}^{frame,\mu} + n_{s,f}^\mu - o_s) \bmod k_s = 0$. $N_{slot}^{frame,\mu}$ is a number of slots in a frame when numerology $\mu$ is configured. $o_s$ is a slot offset indicated in the PDCCH configuration parameters. $k_s$ is a PDCCH monitoring periodicity indicated in the PDCCH configuration parameters. The wireless device monitors PDCCH candidates for the search space set for $T_s$ consecutive slots, starting from slot $n_{s,f}^\mu$, and does not monitor PDCCH candidates for search space set s for the next $k_s - T_s$ consecutive slots. In an example, a USS at CCE aggregation level $L \in \{1, 2, 4, 8, 16\}$ is defined by a set of PDCCH candidates for CCE aggregation level L.

In an example, a wireless device decides, for a search space set s associated with CORESET p, CCE indexes for aggregation level L corresponding to PDCCH candidate $m_{s,n_{CI}}$ of the search space set in slot $n_{s,f}^\mu$ for an active DL BWP of a serving cell corresponding to carrier indicator field value $n_{CI}$ as $$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i,$$

where, $Y_{p,n_{s,f}^\mu} = 0$ for any CSS; $Y_{p,n_{s,f}^\mu} = (A_p \cdot Y_{p,n_{s,f}^\mu -1}) \bmod D$ for a USS, $Y_{p,-1} = n_{RNTI} \neq 0$, $A_p = 39827$ for p mod 3=0, $A_p = 39829$ for p mod 3=1, $A_p = 39839$ for p mod 3=2, and $D = 65537$; $i = 0, \ldots, L-1$; $N_{CCE,p}$ is the number of CCEs, numbered from 0 to $N_{CCE,p} - 1$, in CORESET p; $n_{CI}$ is the carrier indicator field value if the wireless device is configured with a carrier indicator field by CrossCarrierSchedulingConfig for the serving cell on which PDCCH is monitored; otherwise, including for any CSS, $n_{CI} = 0$; $m_{s,n_{CI}} = 0, \ldots, M_{s,n_{CI}}^{(L)} - 1$, where $M_{s,n_{CI}}^{(L)}$ is the number of PDCCH candidates the wireless device is configured to monitor for aggregation level L of a search space set s for a serving cell corresponding to $n_{CI}$; for any CSS, $M_{s,max}^{(L)} = M_{s,0}^{(L)}$; for a USS, $M_{s,max}^{(L)}$ is the maximum of $M_{s,n_{CI}}^{(L)}$ over all configured $n_{CI}$ values for a CCE aggregation level L of search space set s; and the RNTI value used for $n_{RNTI}$ is the C-RNTI.

In an example, a wireless device may monitor a set of PDCCH candidates according to configuration parameters of a search space set comprising a plurality of search spaces (SSs). The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common SSs, and/or number of PDCCH candidates in the UE-specific SSs) and possible (or configured) DCI formats. The decoding may be referred to as blind decoding. The possible DCI formats may be based on example embodiments of FIG. 20.

FIG. 20 shows examples of DCI formats. The DCI formats shown in FIG. 20 may be used by a base station transmit control information to a wireless device or used by the wireless device for PDCCH monitoring. Different DCI formats may comprise different DCI fields and/or have different DCI payload sizes. Different DCI formats may have different signaling purposes. In an example, DCI format 0_0 may be used to schedule PUSCH in one cell. DCI format 0_1 may be used to schedule one or multiple PUSCH in one cell or indicate CG-DFI (configured grant-Downlink Feedback Information) for configured grant PUSCH, etc.

In an example, a base station may transmit to a wireless device one or more RRC messages comprising configuration parameters of DRX operation. A MAC entity of the wireless device, based on the configuration parameters of the DRX operation, may control PDCCH monitoring activity of the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When in RRC_CONNECTED, if DRX is configured, for all the activated Serving Cells, the MAC entity may monitor the PDCCH discontinuously using the DRX operation. Otherwise, the MAC entity may monitor the PDCCH continuously.

In an example, the configuration parameters of the DRX operation may comprise: drx-onDurationTimer indicating a duration at the beginning of a DRX cycle, drx-SlotOffset indicating a delay before starting the drx-onDurationTimer, drx-InactivityTimer indicating a duration after a PDCCH occasion in which a PDCCH indicates a new UL or DL transmission for the MAC entity, drx-RetransmissionTimerDL (per DL HARQ process except for the broadcast process) indicating a maximum duration until a DL retransmission is received, drx-RetransmissionTimerUL (per UL HARQ process) indicating a maximum duration until a grant for UL retransmission is received, drx-LongCycleStartOffset indicating a Long DRX cycle and drx-StartOffset which defines a subframe where a Long and Short DRX cycle starts, drx-ShortCycle for a Short DRX cycle, drx-ShortCycleTimer indicating a duration the wireless device may follow the Short DRX cycle, drx-HARQ-RTT-TimerDL (per DL HARQ process except for the broadcast process) indicating a minimum duration before a DL assignment for HARQ retransmission is expected by the MAC entity, drx-HARQ-RTT-TimerUL (per UL HARQ process) indicating a minimum duration before a UL HARQ retransmission grant is expected by the MAC entity.

In an example, configuration parameters of a power saving operation (e.g., associated with a DRX operation) may comprise: ps-Wakeup indicating whether to start associated drx-onDurationTimer in case a DCI with CRC scrambled by a PS-RNTI (DCP) is monitored but not detected by the wireless device, ps-TransmitOtherPeriodicCSI indicating whether to report periodic CSI that is not L1-RSRP on PUCCH during the time duration indicated by drx-onDurationTimer in case the DCP is configured but associated drx-onDurationTimer is not started, ps-TransmitPeriodicL1-RSRP indicating whether to transmit periodic CSI that is L1-RSRP on PUCCH during the time duration indicated by drx-onDurationTimer in case the DCP is configured but associated drx-onDurationTimer is not started.

In an example, the configuration parameters of the power saving operation may comprise: ps-RNTI indicating a PS-RNTI for DCI format 2_6 (e.g., based on example embodiment of FIG. 24), dci-Format2-6 indicating a number of search space sets for monitoring PDCCH for detection of DCI format 2_6 on an active DL BWP of the PCell or of the PSCell according to a common search space, size-DCI-2-6 indicating a payload size for DCI format 2_6. The configuration parameters may comprise ps-PositionDCI-2-6 indicating a location in DCI format 2_6 of a Wake-up indication bit wherein the Wake-up indication bit setting to 0, when reported to higher layers, indicates to not start the drx-onDurationTimer for the next long DRX cycle, or the Wake-up indication bit setting to 1, when reported to higher layers, indicates start the drx-onDurationTimer for the next long DRX cycle.

In an example, if a wireless device is provided search space sets to monitor PDCCH for detection of DCI format 2_6 in the active DL BWP of the PCell or of the PSCell and the UE detects DCI format 2_6, the physical layer of the wireless device reports the value of the Wake-up indication bit for the wireless device to higher layers (e.g., MAC entity/layer of the wireless device) for the next long DRX cycle. If the wireless device does not detect DCI format 2_6, the physical layer of the wireless device does not report a value of the Wake-up indication bit to higher layers for the next long DRX cycle.

In an example, if a wireless device is provided search space sets to monitor PDCCH for detection of DCI format 2_6 in the active DL BWP of the PCell or of the PSCell and the wireless device is not required to monitor PDCCH for detection of DCI format 2_6 for all corresponding PDCCH monitoring occasions outside Active Time prior to a next long DRX cycle, or does not have any PDCCH monitoring occasions for detection of DCI format 2_6 outside Active Time of a next long DRX cycle, the physical layer of the wireless device reports a value of 1 for the Wake-up indication bit to higher layers for the next long DRX cycle.

In an example, Serving Cells of a MAC entity may be configured by RRC in two DRX groups with separate DRX parameters. When RRC does not configure a secondary DRX group, there may be only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

In an example, when a DRX cycle is configured, a wireless device may determine that the Active Time for Serving Cells in a DRX group includes the time while: drx-onDurationTimer or drx-InactivityTimer configured for the DRX group is running, or drx-RetransmissionTimerDL or drx-RetransmissionTimerUL is running on any Serving Cell in the DRX group, or ra-ContentionResolutionTimer (or msgB-ResponseWindow) is running, or a SR is sent on PUCCH and is pending; a PDCCH indicating a new transmission addressed to the C-RNTI of the MAC entity has not been received after successful reception of a RAR for the Random Access Preamble not selected by the MAC entity among the contention-based Random Access Preamble.

In an example, when DRX operation is configured, if a MAC PDU is received in a configured downlink assignment, a MAC entity of a wireless device may start the drx-HARQ-RTT-TimerDL for a corresponding HARQ process in a first symbol after the end of a corresponding transmission carrying a DL HARQ feedback and/or stop the drx-RetransmissionTimerDL for the corresponding HARQ process.

In an example, when DRX operation is configured, if a drx-HARQ-RTT-TimerDL expires and if the data of the corresponding HARQ process was not successfully decoded, a MAC entity of a wireless device may start the drx-RetransmissionTimerDL for the corresponding HARQ process in the first symbol after the expiry of drx-HARQ-RTT-TimerDL.

In an example, when DRX operation is configured, if a drx-HARQ-RTT-TimerUL expires, a MAC entity of a wireless device may start the drx-RetransmissionTimerUL for the corresponding HARQ process in the first symbol after the expiry of drx-HARQ-RTT-TimerUL.

In an example, when DRX operation is configured, if a DRX Command MAC CE or a Long DRX Command MAC CE is received, a MAC entity of a wireless device may stop drx-onDurationTimer for each DRX group and/or stop drx-Inactivity Timer for each DRX group.

In an example, when DRX operation is configured, if drx-Inactivity Timer for a DRX group expires, a MAC entity of a wireless device may start or restart drx-ShortCycleTimer for this DRX group in the first symbol after the expiry of drx-Inactivity Timer and/or use the Short DRX cycle for this DRX group, if the Short DRX cycle is configured. If drx-InactivityTimer for a DRX group expires, a MAC entity of a wireless device may use the Long DRX cycle for this DRX group, if the Short DRX cycle is not configured.

In an example, when DRX operation is configured, if a DRX Command MAC CE is received, a MAC entity of a wireless device may start or restart drx-ShortCycle Timer for each DRX group in the first symbol after the end of DRX Command MAC CE reception and/or use the Short DRX cycle for each DRX group, if the Short DRX cycle is configured. If a DRX Command MAC CE is received, a MAC entity of a wireless device may use the Long DRX cycle for this DRX group, if the Short DRX cycle is not configured.

In an example, when DRX operation is configured, if drx-ShortCycle Timer for a DRX group expires, a MAC entity of a wireless device may use the Long DRX cycle for this DRX group. If a Long DRX Command MAC CE is received, a MAC entity of a wireless device may stop drx-ShortCycleTimer for each DRX group and/or use the Long DRX cycle for each DRX group.

In an example, regardless of whether the MAC entity is monitoring PDCCH or not on the Serving Cells in a DRX group, the MAC entity may transmit HARQ feedback, aperiodic CSI on PUSCH, and aperiodic SRS on the Serving Cells in the DRX group when such is expected. The MAC entity needs not to monitor the PDCCH if it is not a complete PDCCH occasion (e.g. the Active Time starts or ends in the middle of a PDCCH occasion).

In an example, a wireless device may be configured with configuration parameters of a buffer status report (BSR). The configuration parameters may comprise at least one of: a periodic BSR timer (e.g., periodicBSR-Timer), a BSR retransmission timer (e.g., retxBSR-Timer), a SR delay timer application indicator (e.g., logicalChannelSR-Delay-TimerApplied), a SR delay timer (e.g., logicalChannelSR-DelayTimer), a SR mask parameter (e.g., logicalChannelSR-Mask), a logical channel group (LCG) group indication (e.g., logicalChannelGroup), etc.

In an example, a wireless device may trigger a first BSR in response to a MAC entity of the wireless device having new UL data (e.g., new data) available for a logical channel (LCH) which belongs to an LCG, either when the new UL data belongs to a LCH with higher priority than the priority of any LCH containing available UL data which belong to any LCG, or when none of the LCHs which belong to an LCG contains any available UL data. The first BSR may be referred to as a regular BSR (or a first type of BSR) in this specification.

In an example, a wireless device may trigger a second BSR in response to UL resources being allocated and number of padding bits being equal to or larger than the size of a BSR MAC CE plus its subheader. The second BSR may be referred to as a padding BSR (or a second type of BSR) in this specification.

In an example, a wireless device may trigger a third BSR in response to a timer (e.g., retxBSR-Timer) expiring, and at least one of the LCHs which belong to an LCG containing UL data. The third BSR may be the same type of BSR as the first BSR. The third BSR may be referred to as a regular BSR in this specification. In an example, a MAC entity of a wireless device may restart retxBSR-Timer upon reception of an UL grant for transmission of new data on any UL-SCH.

In an example, for a BSR triggered by a BSR retransmission timer (e.g., retxBSR-Timer) expiry, a MAC entity of a wireless device may determine that a LCH that triggered the BSR is the highest priority LCH that has data available for transmission at the time the BSR is triggered.

In an example, a wireless device may trigger a fourth BSR in response to a timer (e.g., periodicBSR-Timer) expiring. The fourth BSR may be referred to as a periodic BSR (or a third type of BSR) in this specification.

In an example, for a BSR (e.g., a regular BSR), a wireless device may start or restart a SR delay timer (e.g., logical-ChannelSR-DelayTimer) in response to the BSR being triggered for a first LCH. The first LCH may be associated with a logicalChannelSR-DelayTimerApplied being set to value true. In an example, the wireless device may not trigger an SR for the pending BSR based on determining that the associated SR delay timer is running. The wireless device may stop the SR delay timer, if running, in response to the BSR being triggered for a second LCH for which a logical-ChannelSR-DelayTimerApplied is not configured or is set to value false if configured.

In an example, for a BSR (e.g., a regular BSR or a periodic BSR), a wireless device may report Long BSR for all LCGs which have data available for transmission in response to more than one LCG having data available for transmission when the MAC PDU containing the BSR is to be built, otherwise the wireless device may report Short BSR.

In an example, for a BSR (e.g., a padding BSR), a wireless device may report Short Truncated BSR of the LCG with the highest priority logical channel with data available for transmission if: the number of padding bits is equal to or larger than the size of the Short BSR plus its subheader but smaller than the size of the Long BSR plus its subheader, more than one LCG has data available for transmission when the BSR is to be built and the number of padding bits is equal to the size of the Short BSR plus its subheader.

In an example, for a BSR (e.g., a padding BSR), a wireless device may report Long Truncated BSR of the LCG(s) with the logical channels having data available for transmission following a decreasing order of the highest priority logical channel (with or without data available for transmission) in each of these LCG(s), and in case of equal priority, in increasing order of LCGID if: the number of padding bits is equal to or larger than the size of the Short BSR plus its subheader but smaller than the size of the Long BSR plus its subheader, more than one LCG has data available for transmission when the BSR is to be built and the number of padding bits is greater than the size of the Short BSR plus its subheader.

In an example, for a BSR (e.g., a padding BSR), a wireless device may report Short BSR if: the number of padding bits is equal to or larger than the size of the Short BSR plus its subheader but smaller than the size of the Long BSR plus its subheader, at most one LCG has data available for transmission when the BSR is to be built.

In an example, for a BSR (e.g., a padding BSR), a wireless device may report Long BSR for all LCGs which have data available for transmission if the number of padding bits is equal to or larger than the size of the Long BSR plus its subheader.

In an example, a wireless device may instruct a Multiplexing and Assembly procedure to generate BSR MAC CE(s), (re-)start a periodic BSR timer (e.g., periodicBSR- Timer) except when all generated BSRs are long or short Truncated BSRs and/or start or restart a BSR retransmission timer (e.g., retxBSR-Timer) in response to: at least one BSR having been triggered and not been cancelled, and UL-SCH resources being available for a new transmission and the UL-SCH resources accommodating the BSR MAC CE plus its subheader as a result of logical channel prioritization.

In an example, a wireless device may trigger a SR in response to: at least one BSR having been triggered and not been cancelled, a regular BSR of the at least one BSR having been triggered and a logicalChannelSR-Delay Timer associated with a LCH for the regular BSR not being running, and no UL-SCH resource being available for a new transmission (or the MAC entity being configured with configured uplink grant(s) and the Regular BSR being triggered for a LCH for which logicalChannelSR-Mask is set to false, or the UL-SCH resources available for a new transmission not meeting the LCP mapping restrictions configured for the LCH that triggered the BSR).

In an example, a wireless device may determine that UL-SCH resources are available if a MAC entity of the wireless device has an active configuration for either type (type 0 or type 1) of configured uplink grants, or if the MAC entity has received a dynamic uplink grant, or if both of these conditions are met. In an example, the wireless device may determine that one or more UL-SCH resources are available if the MAC entity has been configured with, receives, or determines an uplink grant. If the MAC entity has determined at a given point in time that UL-SCH resources are available, this need not imply that UL-SCH resources are available for use at that point in time.

In an example, a MAC PDU may contain at most one BSR MAC CE, even when multiple events have triggered a BSR. The Regular BSR and the Periodic BSR shall have precedence over the padding BSR.

In an example, a wireless device may cancel all triggered BSRs when the UL grant(s) can accommodate all pending data available for transmission but is not sufficient to additionally accommodate the BSR MAC CE plus its subheader.

In an example, a wireless device may cancel all BSRs triggered prior to MAC PDU assembly when a MAC PDU is transmitted and this PDU includes a Long or Short BSR MAC CE which contains buffer status up to (and including) the last event that triggered a BSR prior to the MAC PDU assembly.

In an example, a MAC PDU assembly can happen at any point in time between uplink grant reception and actual transmission of the corresponding MAC PDU. BSR and SR can be triggered after the assembly of a MAC PDU which contains a BSR MAC CE, but before the transmission of this MAC PDU. In addition, BSR and SR can be triggered during MAC PDU assembly.

Uplink control information (UCI) may be carried by PUCCH or PUSCH. The UCI may include scheduling request (SR), hybrid automatic repeat request-acknowledgement (HARQ-ACK) feedback, channel state information (CSI) report (e.g., channel quality indicator (CQI), precoding matrix indicator (PMI), CSI resource indicator (CRI) and rank indicator (RI) and/or beam related information such as Layer 1 reference signal received power). The UCI may be transmitted, by a wireless device, via one or more PUCCH resources corresponding to that type of UCI in response to determining that the wireless device has UCI to send.

In an example, a base station may semi-statically configure a wireless device with separate one or more PUCCH resource(s) for each type of UCI. Configured one or more PUCCH resources may be time-domain or frequency-domain multiplexed and may be available per slot.

In an example, a base station may transmit to a wireless device one or more RRC messages comprising configuration parameters of one or more PUCCH resources. A PUCCH resource may be identified by at least: frequency location (e.g., starting PRB); a PUCCH format associated with initial cyclic shift of a base sequence and time domain location (e.g., starting symbol index); number of symbols (e.g., nrofSymbols) indicating the number of contiguous symbols used for transmitting the PUCCH using the corresponding PUCCH resource.

In an example, a wireless device may be configured with up to four sets of PUCCH resources. A PUCCH resource set may be provided by PUCCH-ResourceSet and may be associated with a PUCCH resource set index provided by pucch-ResourceSetId, with a set of PUCCH resource indexes provided by resourceList, and with a maximum number of UCI information bits the wireless device may transmit using a PUCCH resource in the PUCCH resource set provided by maxPayloadSize. In an example, the set of PUCCH resource indexes may provide a set of pucch-ResourceId used in the PUCCH resource set.

In an example, for the first PUCCH resource set, the maximum number of UCI information bits may be 2.

In an example, a maximum number of PUCCH resource indexes for a set of PUCCH resources may be provided by maxNrofPUCCH-ResourcesPerSet. For example, the maximum number of PUCCH resources in the first PUCCH resource set may be 32 and the maximum number of PUCCH resources in the other PUCCH resource sets may be 8.

The one or more configuration parameters may indicate PUCCH resource indices (e.g., provided by a higher layer parameter PUCCH-ResourceId) for the plurality of PUCCH resources. In an example, each PUCCH resource of the plurality of PUCCH resources may be identified by a respective PUCCH resource index of the PUCCH resource indices.

In an example, a first PUCCH resource of the plurality of PUCCH resources may be identified by a first PUCCH resource index of the PUCCH resource indices.

In an example, a second PUCCH resource of the plurality of PUCCH resources may be identified by a second PUCCH resource index of the PUCCH resource indices.

In an example, if a wireless device transmits $O_{UCI}$ UCI information bits, which may include HARQ-ACK information bits, the wireless device may determine a PUCCH resource set to be a first set of PUCCH resources with pucch-ResourceSetId=0 based on determining that $O_{UCI} \leq 2$ (e.g., including 1 or 2 HARQ-ACK information bits and a positive or negative SR) on one SR transmission occasion if transmission of HARQ-ACK information and SR occurs simultaneously.

In an example, if a wireless device transmits $O_{UCI}$ UCI information bits, which may include HARQ-ACK information bits, the wireless device may determine a PUCCH resource set to be a second set of PUCCH resources with pucch-ResourceSetId=1, if provided by higher layers, if $2 < O_{UCI} \leq N_2$ where $N_2$ is equal to maxPayloadSize if maxPayloadSize is provided for the PUCCH resource set with pucch-ResourceSetId=1; otherwise $N_2$ is equal to 1706.

In an example, if a wireless device transmits $O_{UCI}$ UCI information bits, which may include HARQ-ACK information bits, the wireless device may determine a PUCCH resource set to be a third set of PUCCH resources with pucch-ResourceSetId=2, if provided by higher layers, if $N_2 < O_{UCI} \le N_3$ where $N_3$ is equal to maxPayloadSize if max-PayloadSize is provided for the PUCCH resource set with pucch-ResourceSetId=2; otherwise $N_3$ is equal to 1706.

In an example, if a wireless device transmits $O_{UCI}$ UCI information bits, which may include HARQ-ACK information bits, the wireless device may determine a PUCCH resource set to be a fourth set of PUCCH resources with pucch-ResourceSetId=3, if provided by higher layers, if $N_3 < O_{UCI} \le 1706$.

In an example, a PUCCH format may be PUCCH format 0, or PUCCH format 1, or PUCCH format 2, or PUCCH format 3, or PUCCH format 4. Short PUCCH (e.g., PUCCH formats 0 and 2) can span 1 or 2 OFDM symbols and may carry less than or equal to 2 bits. Long PUCCH (e.g., PUCCH formats 1, 3 and 4) may span from 4 to 14 OFDM symbols within a slot and may carry greater than 2 bits. In an example, long PUCCH (e.g., PUCCH formats 1, 3 and 4) may span multiple slots to further enhance the coverage.

In an example, for a given wireless device, two short PUCCHs expected to be transmitted in a slot may be multiplexed in an TDM manner in the slot. In another example, the wireless device may multiplex, in an TDM manner, a short PUCCH and along PUCCH in the slot. F For UL data slot, PUCCH and PUSCH may be multiplexed in a frequency division multiplexing (FDM) fashion. In an example, for PUCCH with short duration, PUCCH and physical uplink shared channel (PUSCH) may be multiplexed in a time division multiplexing (TDM) manner.

In an example, for PUCCH formats 1, 3, or 4, a wireless device may be configured a number of slots, $N_{PUCCH}^{repeat}$, for repetitions of a PUCCH transmission by respective nrofSlots. For $N_{PUCCH}^{repeat} > 1$, the wireless device may repeat the PUCCH transmission with the UCI over $N_{PUCCH}^{repeat}$ slots such that: a PUCCH transmission in each of the $N_{PUCCH}^{repeat}$ slots has a same number of consecutive symbols (e.g., as provided by nrofSymbols in PUCCH-format1, nrofSymbols in PUCCH-format3, or nrofSymbols in PUCCH-format4), a PUCCH transmission in each of the $N_{PUCCH}^{repeat}$ slots has a same first symbol (e.g., as provided by startingSymbolIndex in PUCCH-format1, startingSymbolIndex in PUCCH-format3, or startingSymbolIndex in PUCCH-format4), the wireless device may be configured by interslotFrequencyHopping whether or not to perform frequency hopping for PUCCH transmissions in different slots.

In an example, for PUCCH formats 1, 3, or 4, when a wireless device being configured a number of slots, $N_{PUCCH}^{repeat}$, for repetitions of a PUCCH transmission, if the wireless device being configured to perform frequency hopping for PUCCH transmissions across different slots: the wireless device may perform frequency hopping per slot, the wireless device may transmit the PUCCH starting from a first PRB, provided by startingPRB, in slots with even number and starting from the second PRB, provided by secondHopPRB, in slots with odd number.

In an example, a slot indicated to a wireless device for a first PUCCH transmission may have number 0 and each subsequent slot until the wireless device transmits the PUCCH in $N_{PUCCH}^{repeat}$ slots may be counted regardless of whether or not the wireless device transmits the PUCCH in the slot. In an example, the wireless device may not expect to be configured to perform frequency hopping for a PUCCH transmission within a slot. In an example, if the wireless device not being configured to perform frequency hopping for PUCCH transmissions across different slots and if the wireless device being configured to perform frequency hopping for a PUCCH transmission within a slot, the frequency hopping pattern between the first PRB and the second PRB may be the same within each slot.

In an example, when a wireless device is provided a PUCCH-config that includes subslotLengthForPUCCH, the wireless device may not expect the PUCCH-config to include nrofSlots.

Figure 21:
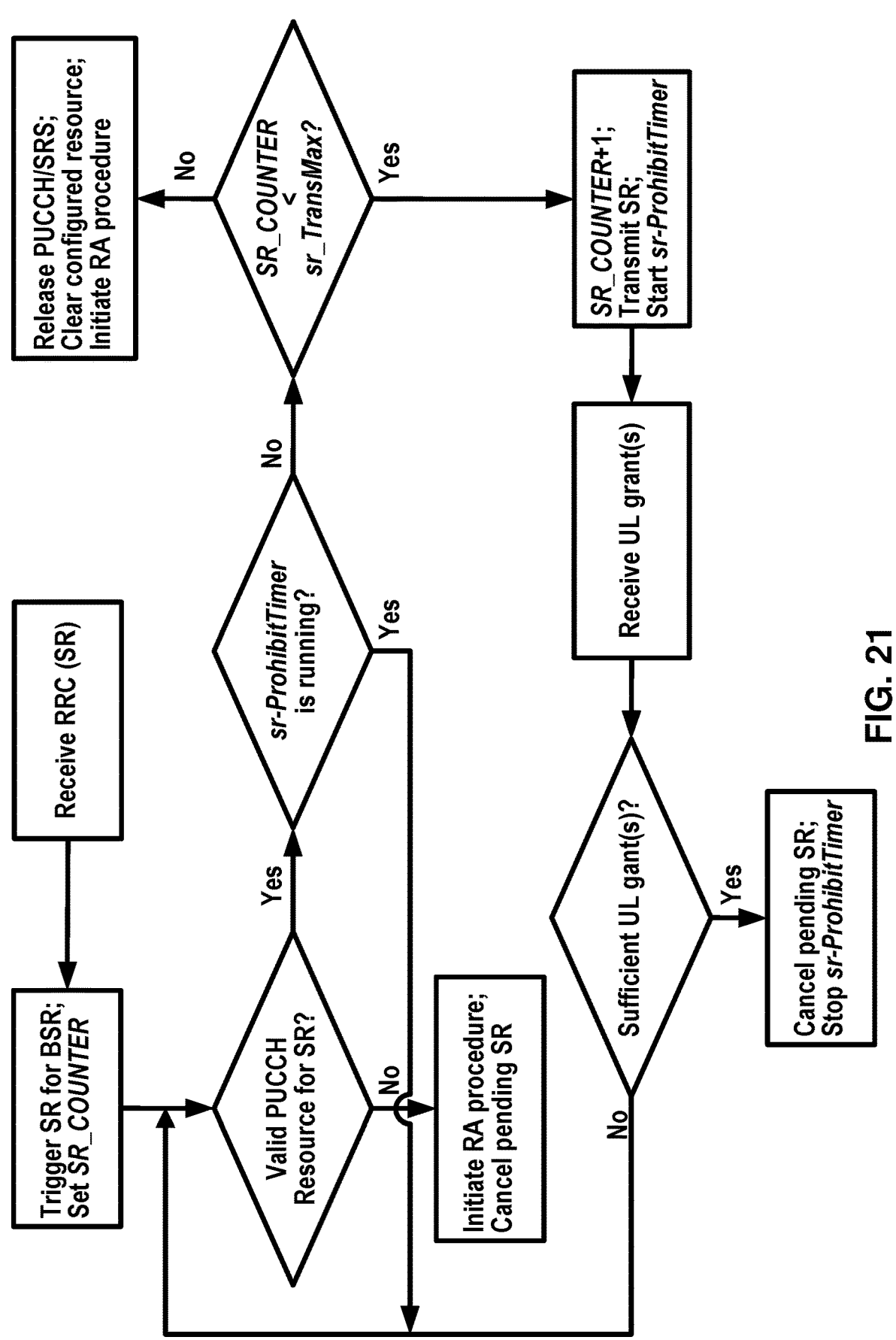
FIG. 21 shows a flow diagram as per an example of SR procedure in NR.

FIG. 21 shows a flow diagram as per an example of SR procedure in NR. In an example, a base station may transmit to a wireless device RRC messages comprising configuration parameters of a plurality of SR configurations. A first SR configuration in the plurality of SR configurations may correspond to one or more first LCHs of the plurality of LCHs.

In an example, a gNB may transmit to a wireless device at least one message comprising parameters indicating zero, one or more SR configurations. A SR configuration may comprise a set of PUCCH resources for SR on one or more BWPs, and/or one or more cells. On a BWP, at most one PUCCH resource for SR may be configured. Each SR configuration may correspond to one or more logical channels. Each logical channel may be mapped to zero or one SR configuration configured by the at least one message. A SR configuration of a logical channel (LCH) that triggers a buffer status report (BSR) may be considered as a corresponding SR configuration for a triggered SR.

In an example, a wireless device may be configured by SchedulingRequestResourceConfig a set of configurations for SR in a PUCCH transmission using either PUCCH format 0 or PUCCH format 1.

In an example, a wireless device may further be configured by a priority index 0 or a priority index 1 for the SR (e.g., by phy-PriorityIndex in SchedulingRequestResourceConfig). If the wireless device not being provided a priority index for SR, the priority index may be 0.

In an example, configuration parameters of a SR configuration may comprise at least one of: a SR prohibit timer (e.g., sr_ProhibitTimer); a maximum number of SR transmission (e.g., sr_TransMax); a parameter indicating a periodicity and offset of SR transmission in slots (e.g., periodicityAndOffset) for a PUCCH transmission conveying SR; and/or a PUCCH resource; a number of symbols for a PUCCH transmission (e.g., provided by nrofSymbols).

In an example, the wireless device may trigger a BSR in response to data becoming available for the LCH. The wireless device may determine that a SR configuration of a LCH that triggers a BSR is a corresponding SR configuration for a triggered SR.

In an example, a wireless device may trigger a SR for requesting UL-SCH resource when the wireless device has new transmission (e.g., SR for BSR). In an example, when an SR is triggered, a wireless device may consider the SR pending until it is cancelled. In an example, when one or more UL grants accommodate one or more pending data (e.g., all pending data) available for transmission, one or more pending SRs (e.g., all pending SRs) may be cancelled.

In an example, the SR prohibit timer may be a duration during which the wireless device may be not allowed to transmit the SR. In an example, the wireless device may stay active while sr_ProhibitTimer is running and may monitor PDCCH for detecting DCI indicating uplink scheduling grant(s). In an example, the maximum number of SR transmission (e.g., sr_TransMax) may be a transmission number for which the wireless device may be allowed to transmit the SR at most.

In an example shown in FIG. 21, a wireless device may determine whether there is at least one valid PUCCH resource for the pending SR at the time of SR transmission occasion. In an example, based on determining that there is no valid PUCCH resource for the pending SR, the wireless device may initiate a random access procedure on a PCell, or a PSCell. The wireless device may cancel the pending SR based on initiating the RA procedure in response to no valid PUCCH resource for the pending SR.

As shown in FIG. 21, based on determining that there is at least one valid PUCCH resource for the pending SR (e.g., by determining that the PUCCH resource for the SR transmission occasion does not overlap with a measurement gap), the wireless device may determine an SR transmission occasion on the at least one valid PUCCH resource based on the periodicity and the offset of SR transmission. In an example, based on determining that at least one valid PUCCH resource for the pending SR being available, the wireless device may determine an SR transmission occasion on one valid PUCCH resource based on the periodicity and the offset of the SR transmission in slots by periodicityAndOffset for a PUCCH transmission conveying the SR.

In an example, when the wireless device being configured a periodicity $SR_{PERIODICITY}$ in symbols or slots and an offset $SR_{OFFSET}$ in slots by periodicityAndOffset for a PUCCH transmission conveying SR, based on determining that the $SR_{PERIODICITY}$ being larger than one slot, the wireless device may determine a SR transmission occasion in a PUCCH to be in a slot with number $n_{s,f}^{\mu}$ in a frame with number $n_f$ if $(n_f N_{slot}^{frame,\mu} + n_{s,f}^{\mu} - SR_{OFFSET})$ mod $SR_{PERIODICITY} = 0$, where $N_{slot}^{frame,\mu}$ is a number of slots in a frame when numerology p is configured.

In an example, based on determining that $SR_{PERIODICITY}$ being one slot, the wireless device may expect that $SR_{OFFSET}$ be zero, and each slot may be considered as an SR transmission occasion.

In an example, based on determining that the $SR_{PERIODICITY}$ is smaller than one slot, the wireless device may determine a SR transmission occasion in a PUCCH to be started in a symbol with index 1 where $(1-l_0$ mod $SR_{PERIODICITY})$ mod $SR_{PERIODICITY} = 0$, where $l_0$ is the value of startingSymbolIndex.

In an example shown in FIG. 21, based on determining that the SR prohibit timer being running, the wireless device may wait for another SR transmission occasion (e.g., when the SR prohibit timer not being running). In an example, a wireless device may maintain a SR transmission counter (e.g., SR_COUNTER) associated with an SR configuration.

In an example, if an SR of a SR configuration being triggered, and there are no other SRs pending corresponding to the same SR configuration, a wireless device may set the SR_COUNTER of the SR configuration to a first value (e.g., 0).

In an example, if the SR prohibit timer not being running and the SR_COUNTER being less than the maximum number of SR transmission, the wireless device may instruct the physical layer of the wireless device to signal the SR on the at least one valid PUCCH resource for the SR, increment the SR_COUNTER (e.g., by one), and start the SR prohibit timer. In an example, the physical layer of the wireless device may transmit a PUCCH on the at least one valid PUCCH resource for the SR. In an example, the wireless device may transmit the PUCCH using PUCCH format 0, or PUCCH format 1, according to the PUCCH configuration.

In an example, a wireless device may transmit a PUCCH in a PUCCH resource associated with a SR configuration when the wireless device transmits a positive SR (e.g., a positive SR may indicate the presence of UL data to be transmitted by a wireless device, and a negative SR may indicate the absence of UL data to be transmitted by the wireless device). In an example, a wireless device may transmit the PUCCH using PUCCH format 0, or PUCCH format 1, according to the PUCCH configuration. A wireless device may transmit a PUCCH in a PUCCH resource for a corresponding SR configuration when the wireless device transmits a positive SR. For a positive SR transmission using PUCCH format 0, a wireless device may transmit a PUCCH by setting the cyclic shift to a first value (e.g., 0). For a positive SR transmission using PUCCH format 1, a wireless device may transmit a PUCCH by setting a first bit, before BPSK modulated on a sequence, to a first value (e.g., 0). In an example, a wireless device may determine one or more PUCCH resources on an active BWP as valid PUCCH resources at a time of SR transmission occasion.

In an example, based on determining that, by the wireless device, the number of symbols available for the PUCCH transmission in a slot, for a SR transmission occasion in a PUCCH, being smaller than the value provided by nrofSymbols, the wireless device may not transmit the PUCCH in the slot and drop SR.

In an example, when a wireless device is configured to perform $N_{PUCCH}^{repeat} > 1$ PUCCH repetitions over a number of slots (e.g., for repetitions of a PUCCH transmission by respective nrofSlots for PUCCH formats 1, 3, or 4), by determining that, by the wireless device, the number of symbols available for the PUCCH transmission in a slot being smaller than the value provided by nrofSymbols, the wireless device may not transmit the PUCCH in the slot. In an example, the SR may be dropped in response to not transmitting PUCCH over the $N_{PUCCH}^{repeat}$ number of slots when in each slot the number of symbols available for the PUCCH transmission in a slot being smaller than the value provided by nrofSymbols.

As shown in FIG. 21, in response and/or after instructing the physical layer of the wireless device to signal the SR on the at least one valid PUCCH resource for the SR, the wireless device may start monitoring a PDCCH for detecting a DCI for uplink grant (e.g., when the SR prohibit timer is running).

In an example, based on determining, by a wireless device, that one or more uplink grants being received, which may accommodate one or more pending data (e.g., all pending data) available for transmission, the wireless device may cancel the pending SR, and/or stop the SR prohibit timer.

In an example, a wireless device may cancel all pending SR(s) for BSR triggered before the MAC PDU assembly and/or stop each respective sr-ProhibitTimer in response to the MAC PDU being transmitted and this PDU being comprised a Long or Short BSR MAC CE which may contain buffer status up to (and including) the last event that triggered a BSR prior to the MAC PDU assembly.

In an example, the wireless device may cancel all pending SR(s) for BSR triggered according to the BSR procedure and stop each respective sr-ProhibitTimer by determining that the UL grant(s) accommodating all pending data available for transmission.

In an example, based on determining that, by the wireless device, one or more uplink grants, which may accommodate all pending data available for transmission, not being received until the expiry of the SR prohibit timer, the wireless device may repeat one or more actions comprising: determining the at least one valid PUCCH resource for the transmission of the SR; checking whether the SR prohibit timer is running; whether the SR_COUNTER is equal or greater than the maximum number of SR transmission;

incrementing the SR_COUNTER, transmitting the SR and starting the SR prohibit timer; monitoring a PDCCH for uplink grant.

In an example, based on determining that the SR_COUNTER indicating a number equal to or greater than the maximum number of SR transmission, a wireless device may release PUCCH for one or more serving cells, and/or release SRS for the one or more serving cells, and/or clear one or more configured downlink assignments and uplink grants, and/or initiate a random access procedure on a PCell, and/or cancel the pending SR.

In an example, the wireless device (e.g., a MAC entity of the wireless device) may stop ongoing Random Access (RA) procedure due to a pending SR which has no valid PUCCH resources configured, wherein the SR was initiated by the MAC entity of the wireless device prior to a MAC PDU assembly. In an example, the wireless device may stop the ongoing RA procedure due to an SR (triggered by a BSR) not being configured with valid PUCCH resource, in response to: transmitting a MAC PDU via a first UL grant other than a second UL grant provided by a RAR of the RA procedure; the MAC PDU comprising a BSR MAC CE which contains buffer status up to (and comprising) a last event that triggered the BSR prior to the MAC PDU assembly, or when the UL grant(s) can accommodate all pending data available for transmission.

Multiple PUCCH formats (e.g., PUCCH format 0 and PUCCH format 1) may be used, by a wireless device, to report various UCI (e.g., HARQ-ACK, SR, and CSI). In an example, at most up to two PUCCHs, where each of which containing one or more UCI types, may be scheduled per slot. In an example, multiple UCI may be reported on different PUCCHs in the same slot with partial or fully overlap between them.

Figures 22A, 22B, 22C:
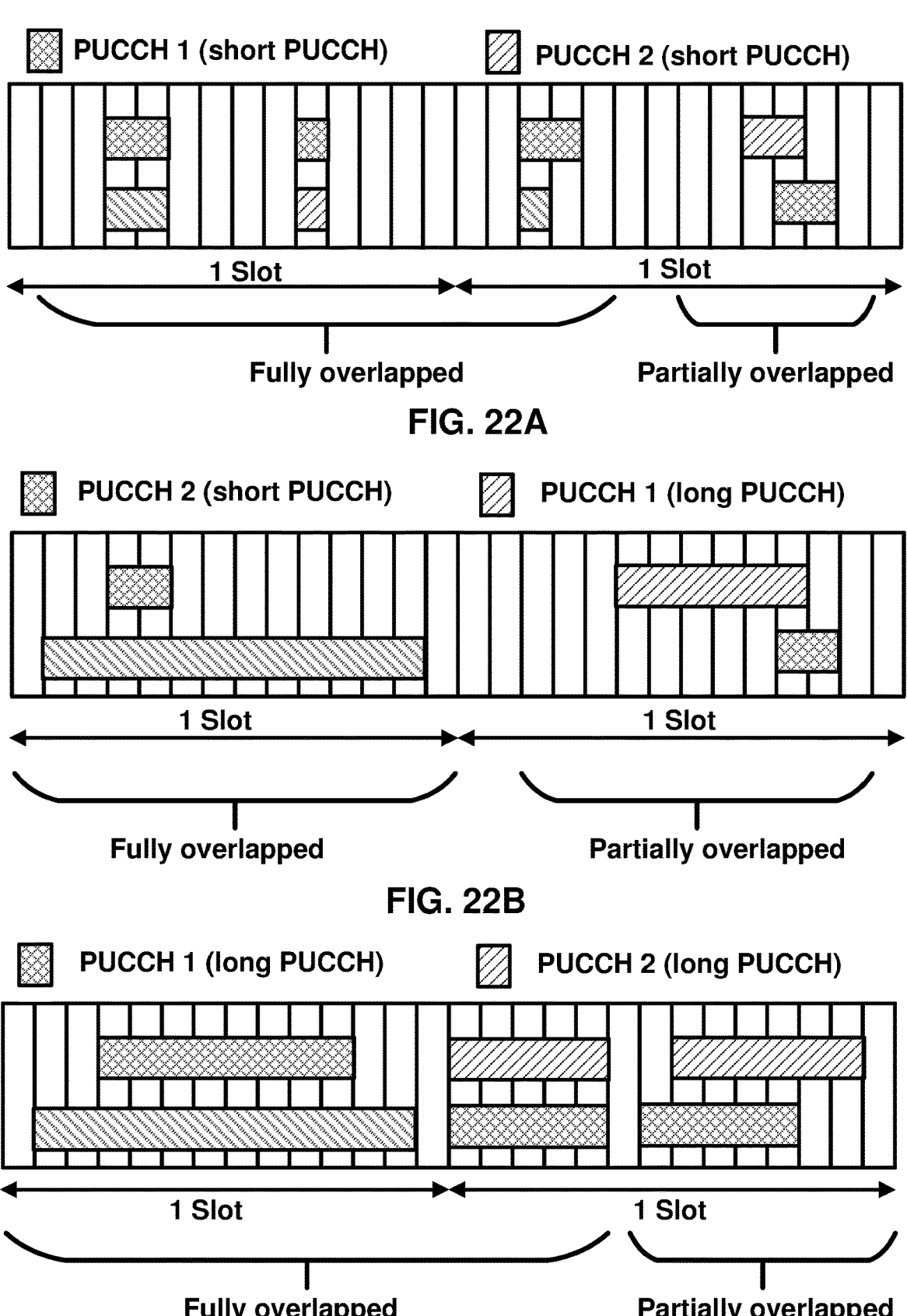
FIG. 22A, FIG. 22B and FIG. 22C show some possible combinations of PUCCH collisions between different PUCCH formats.

FIGS. 22A, 22B, AND 22C shows some example combinations of PUCCH collisions between different PUCCH formats. As multiple PUCCH formats are defined, and the durations of a PUCCH may be configurable (e.g., short PUCCH and long PUCCH), there may be many different collision/overlapped cases between PUCCHs. In an example, FIG. 22A illustrates some cases that different PUCCHs with short PUCCH format may collide. As seen from FIG. 22A, fully overlapped (i.e., one PUCCH occupies the same symbols or is contained within another PUCCH) case and partially overlapped (i.e., some symbols of one PUCCH overlaps with another PUCCH) case is possible. FIG. 22B shows the case that a short PUCCH format may overlap with a long PUCCH format, wherein the collision may be full or partial. FIG. 22C shows the collision between PUCCHs with long PUCCH format, wherein the collision may be full or partial.

As FIG. 22 shows, for both fully overlap and partial overlap cases, the number of overlapping symbols can be different based on the durations and the relative starting positions of the PUCCHs.

In an example, multiple UCI may be reported on different PUCCHs in the same slot with partial or fully overlap between them (e.g., FIG. 22), where different rules may be applied to handle the partial and fully PUCCH overlapping cases for different combinations of UCI contents. In an example, the rules managing the transmission of multiple UCI, when associated resources are fully or partially overlapping, may be categorized into two cases. In a first case, the UCI can be multiplexed and reported on a single PUCCH. In this case, the UCI payload of the PUCCH may be increased and the same or different PUCCH resource (compared to each individual PUCCH resource) may be used to report the aggregated/multiplexed UCI. In case of multiplexing HARQ-ACK information and CSI report (e.g., when simultaneous HARQ-ACK and CSI transmission on a single PUCCH being configured and/or supported), the CSI content should be known at the time of HARQ-ACK PUCCH transmission. In a second case, some partial or fully PUCCH dropping rules may be adopted in response to determining that the UCI cannot be multiplexed. In this case, at least part or all the PUCCH for some UCI may be dropped.

In an example, an SR may be multiplexed with HARQ-ACK or CSI on a PUCCH format. When a positive SR multiplexed with HARQ-ACK, a wireless device may decide a cyclic shift of the base sequence based on the initial cyclic shift and a first cyclic shift based on one or more values of one or more HARQ-ACK bits. When a negative SR multiplexed with HARQ-ACK, a wireless device may decide a cyclic shift of the base sequence based on the initial cyclic shift and a second cyclic shift based on one or more values of the one or more HARQ-ACK bits. The first cyclic shift may be different from the second cyclic shift.

In an example, if an HARQ-ACK PUCCH (e.g., a PUCCH carrying HARQ-ACK) resource uses PUCCH format 0 and fully overlaps with an SR PUCCH (e.g., a PUCCH carrying SR) resource in time, the HARQ-ACK may be transmitted in a resource resulting from applying a cyclic shift (CS), orthogonal cover code (OCC), and/or PRB offset to an HARQ-ACK PUCCH when UCI carries a positive SR. Otherwise, the HARQ-ACK information may be transmitted in an HARQ-ACK PUCCH resource when UCI state of the SR being negative SR.

In an example, if an HARQ-ACK PUCCH resource uses PUCCH format 1 and fully overlaps with an SR PUCCH resource in time, the HARQ-ACK may be transmitted in a resource in an SR PUCCH resource when the UCI state of the SR is positive SR. Otherwise, when the UCI state of the SR is negative SR, the HARQ-ACK may be transmitted in the HARQ-ACK resource.

In another example, if an HARQ-ACK PUCCH resource uses one of PUCCH formats 2, 3 and 4 and fully overlaps with an SR PUCCH resource in time, regardless of whether the UCI state of the SR is positive SR or negative SR, UCI payload may be generated by representing an SR by explicit bit(s) and appending the SR to the HARQ-ACK information, and the generated UCI may be transmitted in the HARQ-ACK PUCCH resource.

In an example, a wireless device, may transmit one or two PUCCHs on a serving cell in different symbols within a slot. When the wireless device transmits two PUCCHs in a slot and the wireless device is not provided ackNackFeedbackMode=separate, at least one of the two PUCCHs uses PUCCH format 0 or PUCCH format 2. In an example, based on determining that a wireless device being provided ackNackFeedbackMode=separate, the wireless device may transmit up to two PUCCHs with HARQ-ACK information in different symbols within a slot.

In an example, when there are multiple non-overlapping PUCCH resources with positive SR corresponding to different SR configurations within one slot, it may be up to a wireless device to select at most two PUCCHs with positive SR, and one of the selected PUCCH should be short PUCCH if two PUCCHs are selected. In an example, the wireless device may drop the SRs that their associated PUCCHs are not selected for transmission.

Figure 23A:
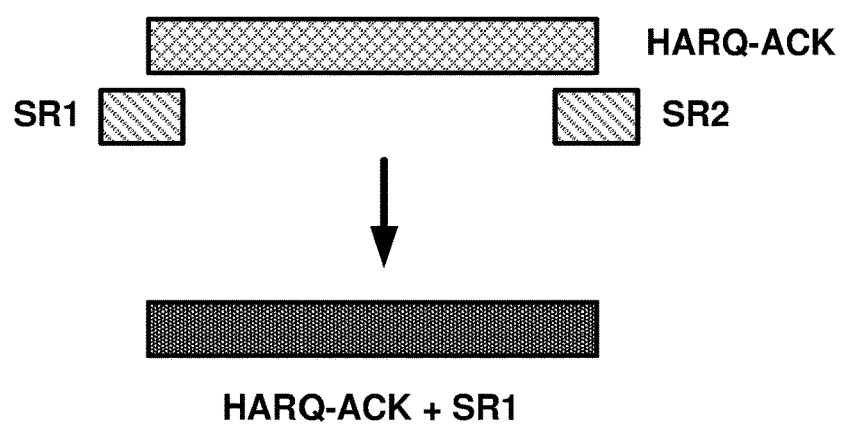
FIG. 23A, FIG. 23B and FIG. 23C show several overlapping scenarios between SR PUCCH resources and HARQ-ACK PUCCH resources.

In an example, a wireless device may be configured to transmit K PUCCHs for respective K SRs in a slot, as determined by a set of schedulingRequestResourceId and a schedulingRequestResourceId associated with schedulingRequestID-BFR-SCell, with SR transmission occasions that would overlap with a transmission of a PUCCH with HARQ-ACK information from the wireless device in the slot or with a transmission of a PUCCH with CSI report(s) from the wireless device in the slot. FIG. 23A shows several overlapping scenarios between SR PUCCH resources and HARQ-ACK PUCCH resources. In an example shown in FIG. 23A, the wireless device may require transmitting two PUCCHs for respective two SRs in a slot. The wireless device may also require transmitting a third PUCCH for respective HARQ-ACK in the slot that is overlapping with two PUCCHs associated with SR1 and SR2. As shown in FIG. 23A, the wireless device may drop one PUCCH associated with one of the SRs (e.g., SR2) and multiplex the SR1 with HARQ-ACK.

In an example, if a wireless device requires to transmit a PUCCH with positive SR and at most two HARQ-ACK information bits in a resource using PUCCH format 0, the wireless device may transmit the PUCCH in the resource using PUCCH format 0 in PRB(s) for HARQ-ACK information.

In an example, if a wireless device requires to transmit negative SR and a PUCCH with at most two HARQ-ACK information bits in a resource using PUCCH format 0, the wireless device may transmit the PUCCH in the resource using PUCCH format 0 for HARQ-ACK information.

In an example, if a wireless device requires to transmit SR in a resource using PUCCH format 0 and HARQ-ACK information bits in a resource using PUCCH format 1 in a slot, the wireless device may transmit a PUCCH with the HARQ-ACK information bits in the resource using PUCCH format 1.

In an example, if a wireless device requires to transmit positive SR in a first resource using PUCCH format 1 and at most two HARQ-ACK information bits in a second resource using PUCCH format 1 in a slot, the wireless device may transmit both positive SR and HARQ-ACK using a PUCCH with HARQ-ACK information bits in the first resource using PUCCH format 1.

In an example, if a wireless device does not transmit a positive SR in a resource using PUCCH format 1 and requires transmitting at most two HARQ-ACK information bits in a resource using PUCCH format 1 in a slot, the wireless device may transmit a PUCCH in the resource using PUCCH format 1 for HARQ-ACK information.

In an example, based on determining that a PUCCH resource for SR overlaps with an HARQ-ACK PUCCH resource and the SR PUCCH resource starts before the HARQ-ACK PUCCH resource, if SR being present, the wireless device may transmit the SR and drop the HARQ-ACK. If the SR PUCCH resource is after or at the same time as the HARQ-ACK resource, SR and HARQ-ACK may be multiplexed on the HARQ-ACK PUCCH resource.

In an example, for overlapping HARQ-ACK and SR PUCCH resources with the same starting time, the wireless device may use the PUCCH resources for HARQ-ACK for simultaneous HARQ-ACK/SR transmission (e.g., multiplexing HARQ-ACK and SR), except for the case when simultaneous transmission of HARQ-ACK/SR is obtained by using PUCCH format 1.

Figure 23B:
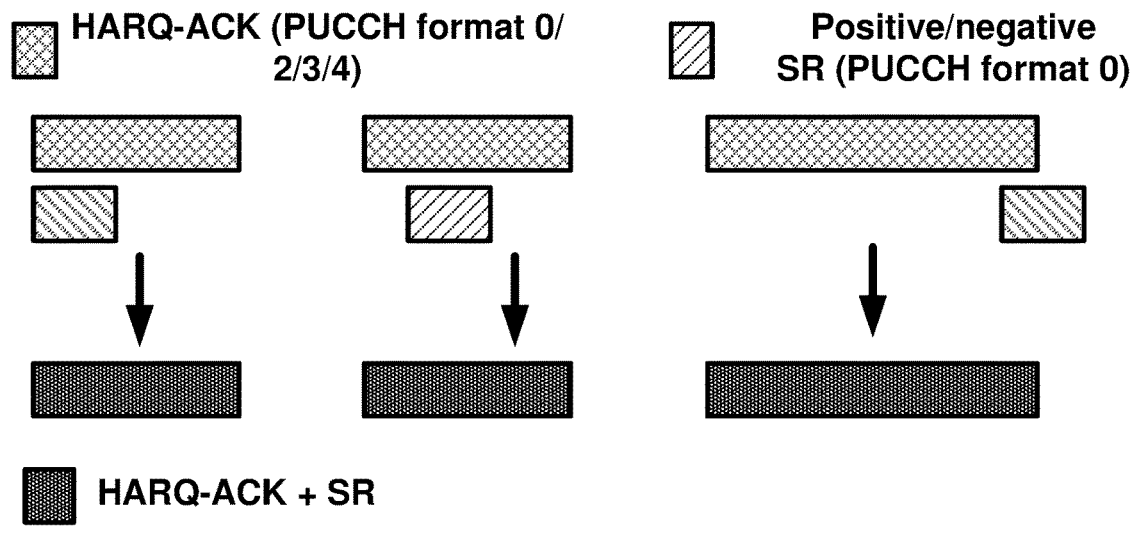

FIG. 23B shows several overlapping scenarios between SR PUCCH resources and HARQ-ACK PUCCH resources. As shown in FIG. 23B, the HARQ-ACK PUCCH (e.g., a PUCCH carrying HARQ-ACK) resources may comprise PUCCH formats 0/2/3/4. FIG. 23B shows that the wireless device may use the HARQ-ACK PUCCH resource to simultaneously transmit HARQ-ACK and SR (e.g., multiplex HARQ-ACK and SR).

In an example, for overlapping HARQ-ACK and SR PUCCH resources with the same starting time in case of PUCCH format 1 for respective HARQ-ACK information, HARQ-ACK may be transmitted using SR PUCCH resource or HARQ-ACK PUCCH resource, depending on the presence or absence of SR (e.g., whether UCI state of the SR being positive SR or negative SR), respectively.

Figure 23C:
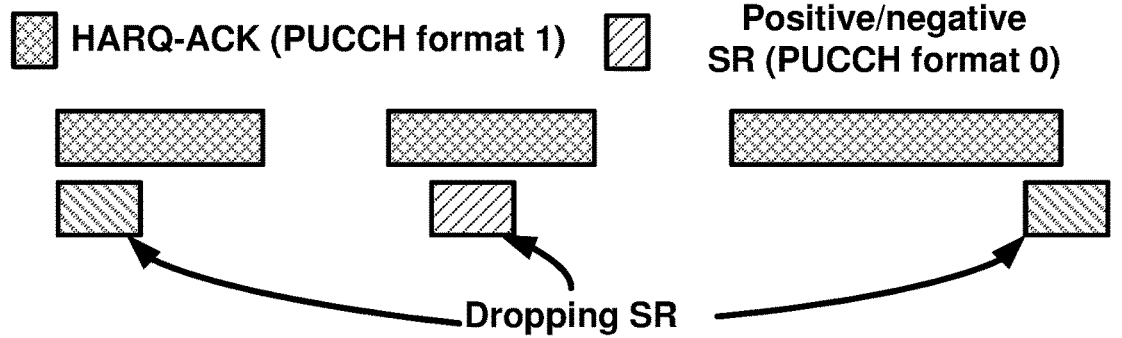

FIG. 23C shows several overlapping scenarios between SR PUCCH resources and HARQ-ACK PUCCH resources. As shown in FIG. 23C, for the case that HARQ-ACK information being carried via a PUCCH format 1 and SR configuration is based on PUCCH format 0, simultaneous transmission of HARQ-ACK and SR may not be supported since the SR resource may not be used for transmission of HARQ-ACK using a format 1 PUCCH.

In an example, PUCCH resources carrying different UCI types (e.g., HARQ-ACK, SR, CSI) may overlap at least one symbol in time in a slot. Based on determining that a higher layer parameter simultaneousHARQ-ACK-CSI being configured, the wireless device may multiplex dynamic HARQ-ACK and/or SR and/or one or more CSI in a resource that may be indicated by a PUCCH resource indication field in DCI scheduling a PDSCH reception according to a payload size of the combined UCI. The wireless device may require choosing an appropriate HARQ-ACK PUCCH (e.g., a PUCCH carrying HARQ-ACK) resource based on the combined payload size and a maximum coding rate of the PUCCH resource to determine if multiplexing of HARQ-ACK with CSI is supported by the PUCCH resource. In an example, the wireless device may require to determine which part of the CSI may be multiplexed and reported and which part of the CSI may be dropped. Based on determining that the multiplexing is feasible, the wireless device may perform joint coding of HARQ-ACK and all or part of the CSI.

In an example, when the wireless device being required to transmit multiple PUCCHs in a slot that include HARQ-ACK information and CSI report(s), the wireless device may be provided a same configuration for simultaneousHARQ-ACK-CSI for each of PUCCH formats 2, 3, and 4.

Figures 24A, 24B:
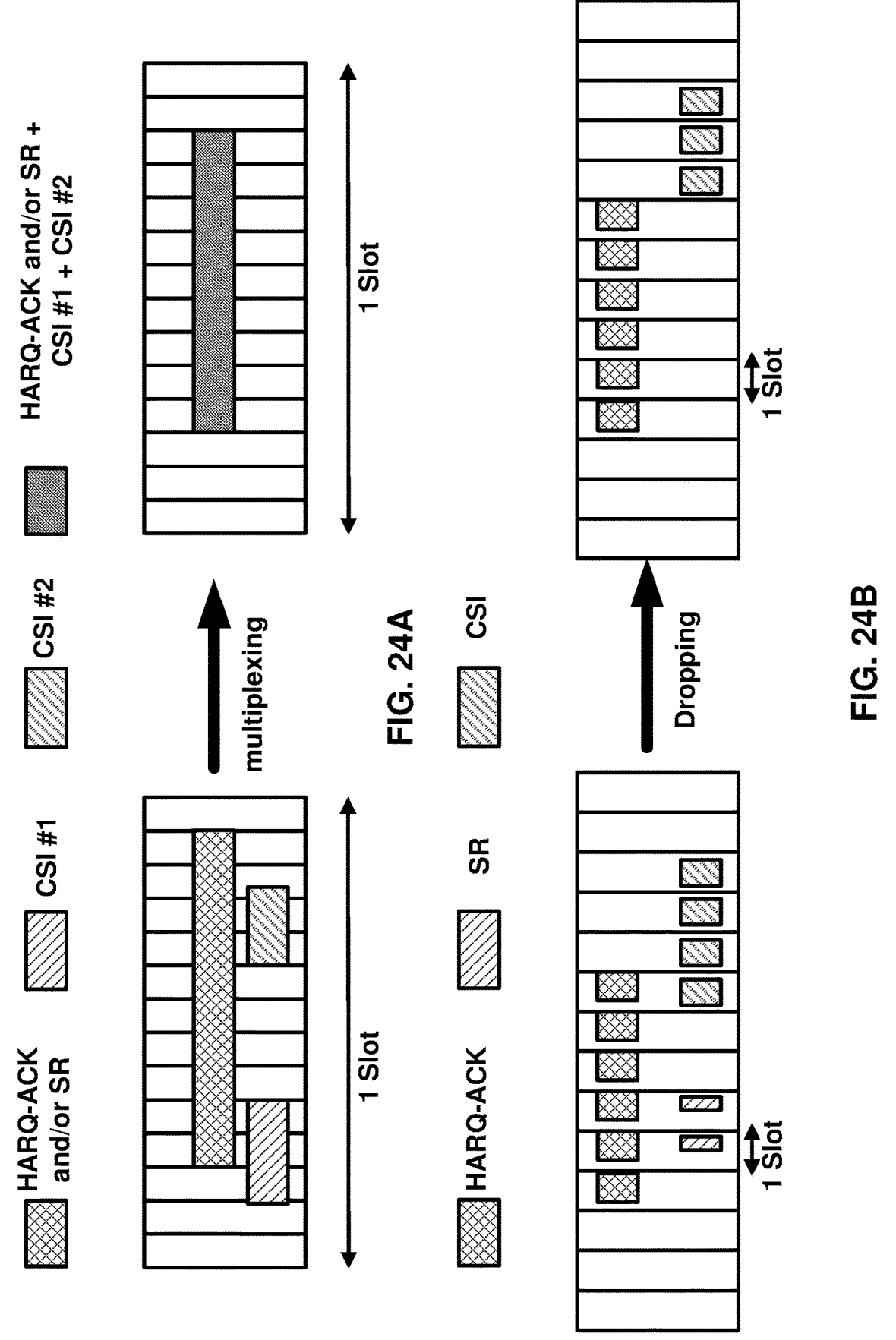
FIG. 24A shows an example of a multiplexing of HARQ-ACK/SR and CSI.
FIG. 24B shows an example of collision of PUCCH resources with repetitions.

FIG. 24A shows an example of a multiplexing of HARQ-ACK/SR and CSI. The wireless device may require to report two CSIs, CSI #1 and CSI #2 in a slot. In an example, when the HARQ-ACK and/or SR is overlapped in time with one or more CSI reports in the slot, a new PUCCH resource may be obtained, by the wireless device, based on an PUCCH resource indication field in a DCI scheduling a PDSCH reception and combined UCI payload size. In an example, the combined UCI payload size may be determined based on at least the payload size of HARQ-ACK and/or SR and the one or more CSI reports. In an example, the new PUCCH resource may be different from either one of the initial PUCCH resources corresponding to HARQ-ACK, SR, and the one or more CSI reports, respectively. In an example, until all overlapping PUCCH resources that the wireless device may have selected for transmitting the combined UCI in the slot have been multiplexed, the practice of combining PUCCH resources may be continued through an iterative loop. If multiplexing is not feasible, e.g., the payload of the combined UCI is beyond a maximum supported value for the new PUCCH, the method for no simultaneous HARQ-ACK and CSI may be used by the wireless device. In an example, based on determining that the parameter simultaneousHARQ-ACK-CSI not being configured, the wireless device may drop the CSI report(s) and includes only HARQ-ACK information, with or without SR, in the new PUCCH.

In an example, a plurality of PUCCH resources, corresponding to different types of UCI such as HARQ-ACK, SR, and CSI reports, may overlap with a PUSCH resource in a slot. Based on determining that, by a wireless device, a PUCCH-PUSCH simultaneous transmission is not configured in the slot, the wireless device may transmit corresponding UCI on a PUSCH (e.g., UCI piggyback).

In an example, a wireless device may transmit multiple overlapping PUCCHs in a slot or overlapping PUCCH(s) and PUSCH(s) in a slot (e.g., a group of overlapping PUCCHs and PUSCHs). The wireless device may be configured to multiplex different UCI types in one PUCCH. In an example, at least one of the multiple overlapping PUCCHs or PUSCHs may be in response to a DCI format detection by the wireless device. The wireless device may multiplex all corresponding UCI types if the following timeline conditions are fulfilled (e.g., timeline conditions 1, 2, 3, 4, and 5). In an example, if one of the PUCCH transmissions or PUSCH transmissions is in response to a DCI format detection by the wireless device, the wireless device may expect that the first symbol $S_0$ of the earliest PUCCH or PUSCH, among the group overlapping PUCCHs and PUSCHs in the slot, satisfies the following timeline conditions (timeline conditions 1-5).

A first timeline condition (e.g., timeline condition 1) may imply that the first symbol of the earlies PUCCH or PUSCH, among the group of overlapping PUCCHs and PUSCHs in the slot, $S_0$, is not before a symbol with CP starting after $T_{proc,1}{}^{mux}$ after a last symbol of any corresponding PDSCH, where $T_{proc,1}{}^{mux}$ is given by maximum of $\{T_{proc,1}{}^{mux,1}, \ldots, T_{proc,1}{}^{mux,i}, \ldots\}$. In an example, for the i-th PDSCH with corresponding HARQ-ACK transmission on a PUCCH which is in the group of overlapping PUCCHs and PUSCHs, $T_{proc,1}{}^{mux,i}$ may be specified at least based on the wireless device PUSCH processing capability, SCS configuration among the SCS configurations used for a PDCCH scheduling the i-th PDSCH, the PUCCH with corresponding HARQ-ACK transmission for the i-th PDSCH, and all PUSCHs in the group of overlapping PUCCHs and PUSCHs.

In an example, if among the group of overlapping PUCCHs and PUSCHs in the slot, one of the PUCCHs includes HARQ-ACK information in response to an SPS PDSCH reception, and any PUSCH is not in response to a DCI format detection, the wireless device may expect that the first symbol $S_0$ of the earliest PUCCH or PUSCH satisfies the first timeline condition. For the i-th PDSCH with corresponding HARQ-ACK transmission on a PUCCH which is in the group of overlapping PUCCHs and PUSCHs, $T_{proc,1}{}^{mux,i}$ may be specified at least based on the wireless device PUSCH processing capability, SCS configuration among the SCS configurations used all PUSCHs in the group of overlapping PUCCHs and PUSCHs without considering the an SCS configuration for a PDCCH scheduling a PDSCH or a PUSCH.

A second timeline condition (e.g., timeline condition 2) may imply that the first symbol of the earlies PUCCH or PUSCH, among the group of overlapping PUCCHs and PUSCHs in the slot, $S_0$, is not before a symbol with CP starting after $T_{proc,release}{}^{mux}$ after a last symbol of any corresponding SPS PDSCH release, or a DCI format 1_1 indicating SCell dormancy, or a DCI format 1_1 indicating a request for a Type-3 HARQ-ACK codebook report. $T_{proc,release}{}^{mux}$ may be calculated/determined/given by maximum of $\{T_{proc,release}{}^{mux,1}, \ldots, T_{proc,release}{}^{mux,i}, \ldots\}$. In an example, for the i-th PDCCH providing the SPS PDSCH release or the DCI format 1_1 with corresponding HARQ-ACK transmission on a PUCCH which is in the group of overlapping PUCCHs and PUSCHs, $T_{proc,release}{}^{mux,i}$ may depend on at least SCS corresponding to the smallest SCS configuration among the SCS configurations used for the PDCCH providing the i-th SPS PDSCH release or the DCI format 1_1, the PUCCH with corresponding HARQ-ACK transmission for the i-th SPS PDSCH release or the DCI format 1_1, and all PUSCHs in the group of overlapping PUCCHs and PUSCHs.

A third timeline condition (e.g., timeline condition 3) may imply that if there is no aperiodic CSI report multiplexed in a PUSCH in the group of overlapping PUCCHs and PUSCHs, the first symbol of the earlies PUCCH or PUSCH, among the group of overlapping PUCCHs and PUSCHs in the slot, $S_0$, is not before a symbol with CP starting after $T_{proc,2}{}^{mux}$ after a last symbol of any PDCCH with a DCI format scheduling an overlapping PUSCH, and any PDCCH scheduling a PDSCH or SPS PDSCH release, or a DCI format 1_1 indicating an SCell dormancy, or a DCI format 1_1 indicating a request for a Type-3 HARQ-ACK codebook report without scheduling a PDSCH, with corresponding HARQ-ACK information in an overlapping PUCCH in the slot. If there is at least one PUSCH in the group of overlapping PUCCHs and PUSCHs, $T_{proc,2}{}^{mux}$ may be determined/calculated/given by maximum of $\{T_{proc,2}{}^{mux,1}, \ldots, T_{proc,2}{}^{mux,i}, \ldots\}$. In an example, for the i-th PUSCH which is in the group of overlapping PUCCHs and PUSCHs, $T_{proc,2}{}^{mux,i}$ may be calculated/determined at least by considering the UE PUSCH processing capability of the i-th PUSCH and SCS configuration y, where y corresponds to the smallest SCS configuration among the SCS configurations used for a PDCCH scheduling the i-th PUSCH, one or more PDCCHs scheduling one or more PDSCHs or providing the SPS PDSCH releases or providing the SCell dormancy indication with corresponding HARQ-ACK transmission on a PUCCH which is in the group of overlapping PUCCHs/PUSCHs, and all PUSCHs in the group of overlapping PUCCHs and PUSCHs. If there is no PUSCH in the group of overlapping PUCCHs and PUSCHs, $T_{proc,2}{}^{mux}$ may be calculated/determined/given by maximum of $\{T_{proc,2}{}^{mux,1}, \ldots, T_{proc,2}{}^{mux,i}, \ldots\}$. In an example, for the i-th PDSCH or the i-th SPS PDSCH release or the i-th SCell dormancy indication with corresponding HARQ-ACK transmission on a PUCCH which is in the group of overlapping PUCCHs, $T_{proc,2}{}^{mux,i}$ may be based on at least the wireless device PUSCH processing capability of an PUCCH serving cell, if configured, the smallest SCS configuration between the SCS configuration used for a PDCCH scheduling the i-th PDSCH or providing the i-th SPS PDSCH release or providing the i-th SCell dormancy indication with corresponding HARQ-ACK transmission on a PUCCH which is in the group of overlapping PUCCHs, and the SCS configuration for the PUCCH serving cell.

A fourth timeline condition (e.g., timeline condition 4) may imply that if there is an aperiodic CSI report multiplexed in a PUSCH in the group of overlapping PUCCHs and PUSCHs, the first symbol of the earlies PUCCH or PUSCH, among the group overlapping PUCCHs and PUSCHs in the slot, $S_0$, is not before a symbol with CP starting after $T_{proc,CSI}{}^{mux}$ after a last symbol of any PDCCH with a DCI format scheduling an overlapping PUSCH, and any PDCCH scheduling a PDSCH, or SPS PDSCH release, or providing a DCI format 1_1 indicating SCell dormancy, or a DCI format 1_1 indicating a request for a Type-3 HARQ-ACK codebook report without scheduling PDSCH, with corresponding HARQ-ACK information in an overlapping PUCCH in the slot where y corresponds to the smallest SCS configuration among the SCS configuration of the PDCCHs, the smallest SCS configuration for the group of the overlapping PUSCHs, and the smallest SCS configuration of CSI-RS associated with a DCI format scheduling the PUSCH with the multiplexed aperiodic CSI report.

A fifth timeline condition (e.g., timeline condition 5) may imply that if there is one or more aperiodic CSI reports multiplexed on a PUSCH in the group of overlapping PUCCHs and PUSCHs and if symbol $S_0$ (e.g., the first symbol of the earlies PUCCH or PUSCH, among the group overlapping PUCCHs and PUSCHs in the slot) is before symbol $Z_{ref}^{mux}$ that is a next uplink symbol with CP starting after $Z_{proc,CSI}^{mux}$ after the end of: the last symbol of aperiodic CSI-RS resource for channel measurements, the last symbol of aperiodic CSI-IM used for interference measurements, and the last symbol of aperiodic NZP CSI-RS for interference measurements, when aperiodic CSI-RS is used for channel measurement for a triggered CSI report. In an example, $Z_{proc,CSI}^{mux}$ may be calculated at least based on smallest SCS configuration among the SCS configurations of one or more PDCCHs scheduling the one or more PUSCHs, the smallest SCS configuration of aperiodic CSI-RSs associated with DCI formats provided by the PDCCHs triggering the aperiodic CSI reports, and the smallest SCS configuration of the overlapping PUCCHs and PUSCHs.

In an example, a wireless device may not expect a PUCCH or a PUSCH that is in response to a DCI format detection to overlap with any other PUCCH or PUSCH that does not satisfy the timeline conditions 1, 2, 3, and 4.

In an example, the wireless device does not expect a PUCCH that is in response to a DCI format detection to overlap with any other PUCCH that does not satisfy the corresponding timing conditions 1, 2, 3, 4, and 5 described above.

In an example, based on determining that the fifth timeline condition is satisfied, the UE may not be required to update an CSI report for the triggered CSI report.

In an example, a wireless device may require to obtain the resources for a transmission of a PUCCH that contain the UCI of several overlapping PUCCHs. The wireless device may obtain a set Q that determines the set of resources for transmission of corresponding PUCCHs in a single slot without repetitions. In obtaining the set Q the wireless device may consider at least following rules with regard to several overlapping PUCCHs: a PUCCH resource with earlier first symbol is placed before a PUCCH resource with later first symbol; for two overlapping PUCCH resources with same first symbol, a PUCCH resource with a longer duration is placed before a PUCCH resource with a shorter duration; for two overlapping PUCCH resources with same first symbol and same duration, the placement is arbitrary; a PUCCH resource for negative SR transmission that does not overlap with a PUCCH resource for HARQ-ACK or CSI transmission is excluded from the set Q; if the wireless device is not provided simultaneousHARQ-A CK-CSI and overlapping PUCCH resources for transmission of HARQ-ACK information include PUCCH format 0 or PUCCH format 2, the PUCCH resources that include PUCCH format 2, or PUCCH format 3, or PUCCH format 4 for transmission of CSI reports are excluded from the set Q if they overlap with any resource from the PUCCH resources for transmission of HARQ-ACK information; if the wireless device is not provided simultaneousHARQ-A CK-CSI and at least one of the resources for transmission of HARQ-ACK information includes PUCCH format 1, PUCCH format 3, or PUCCH format 4, PUCCH resources that include PUCCH format 3 or PUCCH format 4 for transmission of CSI reports are excluded from the set Q and the PUCCH resources that include PUCCH format 2 for transmission of CSI reports are excluded from the set Q if they overlap with any resource from the resources for transmission of HARQ-ACK information.

In an example, if a wireless device requires to transmit multiple PUCCHs in a slot that include HARQ-ACK information, and/or SR, and/or CSI reports and any PUCCH with HARQ-ACK information in the slot satisfies the above timeline conditions 1, 2, 3, 4, and 5 and not overlapping with any other PUCCH or PUSCH in the slot that does not satisfy the above timeline conditions 1, 2, 3, 4, and 5, the wireless device may multiplex the HARQ-ACK information, and/or SR, and/or CSI reports and determine corresponding PUCCH(s) for transmission in the slot by determining the resource set Q. If the multiple PUCCHs do not include HARQ-ACK information and do not overlap with any PUSCH transmission in response to a DCI format detection in the slot, the described timeline conditions 1, 2, 3, 4, and 5 may not apply.

In an example, if a wireless device is not provided multi-CSI-PUCCH-ResourceList, and a resource for a PUCCH transmission with HARQ-ACK information in response to SPS PDSCH reception and/or a resource for a PUCCH associated with a SR occasion overlap in time with two PUCCH resources for respective PUCCH transmissions with two CSI reports, and there is no resource for a PUCCH transmission with HARQ-ACK information in response to a DCI format detection that overlaps in time with any of the previous resources, and the set Q results to the wireless device attempting to determine a single PUCCH resource from the HARQ-ACK and/or the SR resource and the two PUCCH resources with CSI reports, the wireless device may multiplex the HARQ-ACK information and/or the SR in the resource for the PUCCH transmission with the CSI report having the higher priority, and may not transmit the PUCCH with the CSI report having the lower priority.

In an example, a wireless device may require to transmit multiple overlapping PUCCHs in a slot that include HARQ-ACK information, and/or SR, and/or CSI reports. In an example, the wireless device may obtain the set Q for determining the resources for a transmission of a PUCCH that contain the UCI of the overlapping PUCCHs. For each PUCCH resource in the set Q that satisfies the aforementioned timeline conditions (e.g., timelines conditions 1, 2, 3, 4, and 5), the wireless device may transmit a PUCCH using a PUCCH resource if the PUCCH resource does not overlap in time with a PUSCH transmission after multiplexing UCI. In an example, the multiplexing UCI may be obtained, by the wireless device, by combining the UCIs of the PUCCH resources that are included in the set Q.

In an example, a wireless device may require to transmit multiple overlapping PUCCHs in a slot that include HARQ-ACK information, and SR, and/or CSI reports. In an example, the wireless device may obtain the set Q for determining the resources for a transmission of a PUCCH that contain the UCI of the overlapping PUCCHs. In an example, for each PUCCH resource in the set Q that satisfies the aforementioned timeline conditions (e.g., timelines conditions 1, 2, 3, 4, and 5), the wireless device may multiplex HARQ-ACK information and/or CSI reports in a PUSCH in the slot if the PUCCH resource overlaps in time with a PUSCH transmission. In an example, the wireless device may drop SR.

In an example, a wireless device may require to transmit multiple overlapping PUCCHs in a slot that include HARQ-ACK information, and/or SR, and/or CSI reports. In an example, the wireless device may obtain the set Q for determining the resources for a transmission of a PUCCH that contain the UCI of the overlapping PUCCHs. In an example, for each PUCCH resource in the set Q that satisfies the aforementioned timeline conditions (e.g., timelines conditions 1, 2, 3, 4, and 5), when applicable, in case the PUCCH resource overlaps in time with multiple PUSCH transmissions in the slot, the PUSCH for multiplexing HARQ-ACK information and/or CSI is selected. If the PUSCH transmission by a wireless device is not in response to a DCI format detection and the UE multiplexes only CSI reports, the timeline conditions 1, 2, 3, 4, and 5 may not be applicable.

In an example, a wireless device may require to transmit multiple overlapping PUCCHs in a slot that include HARQ-ACK information, and/or SR, and/or CSI reports. In an example, the wireless device may obtain the set Q for determining the resources for a transmission of a PUCCH that contain the UCI of the overlapping PUCCHs. For each PUCCH resource in the set Q that satisfies the aforementioned timeline conditions (e.g., timeline conditions 1, 2, 3, 4, and 5), when applicable, the wireless device may not expect the corresponding resource to overlap with a second resource of a PUCCH transmission over multiple slots if the resource is obtained from a group of resources that do not overlap with the second resource.

In an example, a wireless device may require to transmit multiple overlapping PUCCHs in a slot that include HARQ-ACK information, and/or SR, and/or CSI reports. In an example, the wireless device may obtain the set Q for determining the resources for a transmission of a PUCCH that contain the UCI of the overlapping PUCCHs. In an example, a wireless device in response to determining that resources for transmissions of UCI types overlap in the slot, multiplexing of UCI types in a single PUCCH is possible, and the wireless device does not transmit any PUSCH time-overlapping with PUCCH in the slot, the wireless device may multiplex UCI types comprising HARQ-ACK, SR, and CSI.

In an example, a wireless device may be configured to transmit K PUCCHs for respective K SRs in a slot, as determined by a set of schedulingRequestResourceId and a schedulingRequestResourceId associated with schedulingRequestID-BFR-SCell, with SR transmission occasions that may overlap with a transmission of a PUCCH with HARQ-ACK information from the wireless device in the slot or with a transmission of a PUCCH with CSI report(s) from the wireless device in the slot. If the wireless device transmits a PUCCH with $O_{ACK}$ HARQ-ACK information bits in a resource using PUCCH format 2 or PUCCH format 3 or PUCCH format 4 in a slot, $\lfloor \log_2(K+1) \rfloor$ bits representing a negative or positive SR, in ascending order of the values of schedulingRequestResourceId and a schedulingRequestResourceId associated with schedulingRequestID-BFR-SCell, are appended to the HARQ-ACK information bits and the wireless device may transmit the combined $O_{UCI}=O_{ACK}+\lfloor \log_2(K+1) \rfloor$ UCI bits in a PUCCH using a resource with PUCCH format 2 or PUCCH format 3 or PUCCH format 4. In an example, an all-zero value for the $\lfloor \log_2(K+1) \rfloor$ bits may represent a negative SR value across all K SRs.

In an example, a wireless device may be configured to transmit K PUCCHs for respective K SRs in a slot, as determined by a set of schedulingRequestResourceId and a schedulingRequestResourceId associated with schedulingRequestID-BFR-SCell, with SR transmission occasions that would overlap with a transmission of a PUCCH with HARQ-ACK information from the wireless device in the slot or with a transmission of a PUCCH with CSI report(s) from the wireless device in the slot.

In an example, a wireless device may be configured to transmit K PUCCHs for respective K SRs in a slot, as determined by a set of schedulingRequestResourceId and a schedulingRequestResourceId associated with schedulingRequestID-BFR-SCell, with SR transmission occasions that would overlap with a transmission of a PUCCH with HARQ-ACK information from the wireless device in the slot or with a transmission of a PUCCH with CSI report(s) from the wireless device in the slot. If the wireless device transmits a PUCCH with $O_{ACK}$ HARQ-ACK information bits, $O_{SR}=\lfloor \log_2(K+1) \rfloor$ SR bits, and $O_{CRC}$ CRC bits using PUCCH format 2 or PUCCH format 3 in a PUCCH resource that includes $M_{RB}$ PRBs, the wireless device may determine a number of PRBs $M_{RB,min}$ for the PUCCH transmission to be the minimum number of PRBs, that is smaller than or equal to a number of PRBs provided respectively by nrof-PRBs in PUCCH-format2 or nrofPRBs in PUCCH-format3 and starts from the first PRB from the number of PRBs.

In an example, a wireless device may transmit a PUCCH over a first number $N_{PUCCH}^{repeat}>1$ of slots and the wireless device may transmit a PUSCH with repetition Type A over a second number of slots, such that the PUCCH transmission would overlap with the PUSCH transmission in one or more slots. In case that the wireless device determines that the multiplexing of UCI in the PUSCH are satisfied in the overlapping slots, the wireless device may transmit the PUCCH and does not transmit the PUSCH in the overlapping slots.

In an example, a wireless device may transmit a PUCCH over a first number $N_{PUCCH}^{repeat}>1$ of slots and transmit a PUSCH with repetition Type B over a second number of slots such that the PUCCH transmission would overlap with actual PUSCH repetitions in one or more slots. In case that the wireless device determines that multiplexing of UCI in the PUSCH are satisfied for the overlapping actual PUSCH repetitions, the wireless device may transmit the PUCCH and does not transmit the overlapping actual PUSCH repetitions.

In an example, when a wireless device is configured to perform $N_{PUCCH}^{repeat}>1$ PUCCH repetitions over a number of slots (e.g., for repetitions of a PUCCH transmission by respective nrofSlots for PUCCH formats 1, 3, or 4), the wireless device may not multiplex different UCI types in a PUCCH transmission with repetitions over $N_{PUCCH}^{repeat}>1$ slots. If the wireless device would transmit a first PUCCH over more than one slot and at least a second PUCCH over one or more slots, and the transmissions of the first PUCCH and the second PUCCH would overlap in a number of slots, for each slot of the number of slots and with UCI type priority of HARQ-ACK>SR>CSI with higher priority>CSI with lower priority, the wireless device does not expect the first PUCCH and any of the second PUCCHs to start at a same slot and include a UCI type with same priority.

In an example, when the transmissions of the first PUCCH and the second PUCCH would overlap in a number of slots, for each slot of the number of slots if the first PUCCH and any of the second PUCCHs include a UCI type with same priority, the wireless device may transmit the PUCCH starting at an earlier slot and may not transmit the PUCCH starting at a later slot. In an example, UCI type priority may be specified via HARQ-ACK>SR>CSI with higher priority>CSI with lower priority.

In an example, when the transmissions of the first PUCCH and the second PUCCH would overlap in a number of slots, for each slot of the number of slots if the first PUCCH and any of the second PUCCHs do not include a UCI type with same priority, the wireless device transmits the PUCCH that includes the UCI type with higher priority and does not transmit the PUCCH that include the UCI type with lower priority. In an example, UCI type priority may be specified via HARQ-ACK>SR>CSI with higher priority>CSI with lower priority.

In an example, if a wireless device transmits a PUCCH over $N_{PUCCH}^{repeat}$ slots and the wireless device does not transmit the PUCCH in a slot from the $N_{PUCCH}^{repeat}$ slots due to overlapping with another PUCCH transmission in the slot, the wireless device may count the slot in the number of $N_{PUCCH}^{repeat}$ slots.

FIG. 24B shows an example of collision of PUCCH resources with repetitions. In an example shown in FIG. 24B, a wireless device may transmit HARQ-ACK over a first PUCCH resource with $N_{PUCCH}^{repeat}=6$, SR over a second PUCCH resource with $N_{PUCCH}^{repeat}=2$, and CSI over a third PUCCH resource with $N_{PUCCH}^{repeat}=4$. In an example, the wireless device may drop the SR upon determining that the first PUCCH resource occasion and the second PUCCH resource occasion overlap in time when the priority of HARQ-ACK is higher than the priority of the SR. Further, by determining that the priority of HARQ-ACK is higher than that of CSI, the wireless device may transmit HARQ-ACK in the slots that the first PUCCH resource overlaps with the third PUCCH resource.

In an example, a (communication) satellite may comprise a space-borne vehicle (e.g., satellite, balloons, air ships, high altitude platform stations, unmanned aircraft system, and the like) embarking a bent pipe payload, etc. The satellite may forward a received signal from another satellite (e.g., over inter-link satellite communication links) or a gateway on the ground (e.g., over the feeder communication link) back to the earth. The satellite may forward a received signal from a wireless device on the earth to another satellite or a gateway on the ground. The signal may be forwarded back with amplification and/or a shift between service link frequency (point or a bandwidth) and feeder link frequency. The signal may be forwarded back with an on board processing. The satellite may comprise a regenerative payload telecommunication transmitter with the on board processing used to demodulate and decode the received signal and/or regenerate the signal before sending it back to the earth. Otherwise, the satellite may comprise a transparent payload telecommunication transmitter without the capability of on board digital signal processing (e.g., modulation and coding).

Figures 25A, 25B:
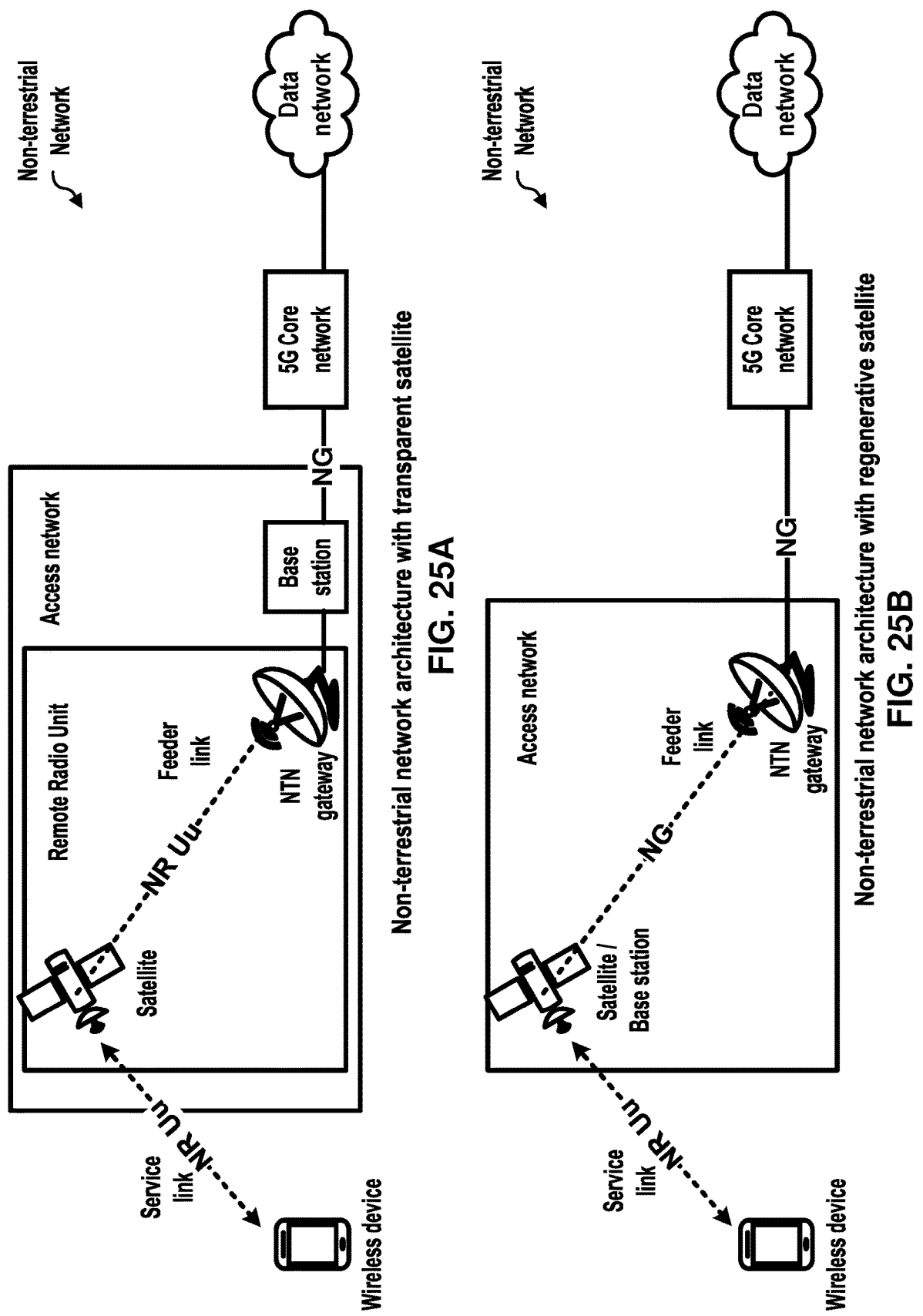
FIG. 25A is an example non-terrestrial network architecture with transparent satellite as an aspect of an embodiment of the present disclosure.
FIG. 25B is an example non-terrestrial network architecture with regenerative satellite as an aspect of an embodiment of the present disclosure.

FIG. 25A is an example non-terrestrial network architecture with transparent satellite as an aspect of an embodiment of the present disclosure. In an example, an NTN architecture may comprise a wireless device, a satellite, an NTN gateway, a base station, a 5G core network, and/or a data network. The satellite may behave as a remote radio unit (RRU) communicating with the NTN gateway. The satellite may implement frequency conversion and radio frequency amplification in the uplink and/or downlink directions. The NTN gateway may connect to a base station on the ground. A wireless device may transmit and receive via the satellite. The satellite (e.g., an RRU) may correspond to an analogue RF repeater that repeats the NR-Uu radio interface from a service link (between the satellite and the wireless device) to a feeder link (between the NTN gateway and the satellite), and vice-versa.

FIG. 25B is an example non-terrestrial network architecture with regenerative satellite as an aspect of an embodiment of the present disclosure. In an example, an NTN architecture may comprise a wireless device, a satellite, an NTN gateway, a 5G core network, and/or the like. The satellite may regenerate signals received from earth (e.g., from a wireless device or from an NTN gateway). In an example, the satellite may behave as a base station.

FIG. 26 is an example figure of different types of non-terrestrial network platforms. In an example, a satellite may be placed into a low-earth orbit (LEO) at an altitude between 250 km to 1500 km, with orbital periods ranging from 90-130 minutes. A mean orbital velocity needed to maintain a stable LEO may be 7.8 km/s and may be reduced with increased orbital altitude. A mean orbital velocity for circular orbit of 200 km may be 7.79 km/s. A mean orbital velocity for circular orbit 1500 km may be 7.12 km/s. From the perspective of a given point on the surface of the earth, the position of the LEO satellite may change.

In an example, a satellite may be placed into a medium-earth orbit (MEO) at an altitude between 5000 to 20000 km, with orbital periods ranging from 2 hours to 14 hours.

In an example, a satellite may be placed into a geostationary satellite earth orbit (GEO) at 35,786 km altitude, and directly above the equator. This may equate to an orbital velocity of 3.07 km/s and an orbital period of 1,436 minutes, which equates to almost one sidereal day (23.934461223 hours). From the perspective of a given point on the surface of the earth, the position of the GEO may not move.

In an example, a satellite network may be a network or network segment that uses a space-borne vehicle to embark a transmission equipment relay node or a base station. While a terrestrial network is a network located on the surface of the earth, an NTN may be a network which uses a satellite as an access network, a backhaul interface network, or both. A (communication) satellite may generate several beams over a given area.

In an example, a footprint of a beam of a satellite may be in an elliptical shape (e.g., which may be considered as a cell). The footprint of a beam may be referred to as a spotbeam. The footprint of a beam may move over the Earth's surface with the satellite movement. The footprint of a beam may be Earth fixed with some beam pointing mechanism used by the satellite to compensate for its motion. The size of a spotbeam may depend on the system design and may range from tens of kilometers to a few thousand kilometers.

In an example, a propagation delay (e.g., between a satellite and the ground or between multiple satellites) may be the amount of time it takes for the head of the signal to travel from a sender to a receiver or vice versa. For uplink, the sender may be a wireless device and the receiver may be a base station/access network. For downlink, the sender may be a base station/access network and the receiver may be a wireless device. The propagation delay may vary depending on a distance between the sender and the receiver.

FIG. 27 examples of propagation delay corresponding to NTNs of different altitudes. The propagation delay in the figure may be one-way latency. In an example, one-way latency may be an amount of time required to propagate through a telecommunication system from a terminal to the receiver (e.g., base station, eNB, gNB, RRU of a base station).

In an example, for the transparent satellite model of GEO case, the round-trip propagation delay (RTD) may comprise service link delay (e.g., between the satellite and the wireless device) and feeder link delay (e.g., between the NTN gateway and the satellite). The RTD may be four times of 138.9 milliseconds (approximately 556 milliseconds).

In an example, a RTD of the GEO satellite may be more than a few seconds if processing time and congestion are considered. In an example, a RTD of a terrestrial network (e.g., NR, E-UTRA, LTE) may be negligible. The RTD of a terrestrial network may be less than 1 millisecond. In an example, the RTD of a GEO satellite may be hundreds of times longer than the one of terrestrial network.

In an example, a maximum RTD of a LEO satellite with transparent payload with altitude of 600 km may be 25.77 milliseconds. The differential RTD may be 3.12 milliseconds. The differential RTD within a beam of the satellite may be calculated based on the maximum diameter of the beam footprint at nadir. In an example, the differential RTD may imply the difference between communication latency that two wireless devices (one is located close to the edge of the cell/beam and one is located close to the center of the cell/beam) may experience while communicating with an NTN node. In an example, for a LEO satellite with transparent payload with altitude of 1200 km, the maximum RTD of may be 41.77 milliseconds. The differential RTD may be 3.18 milliseconds.

Figure 28:
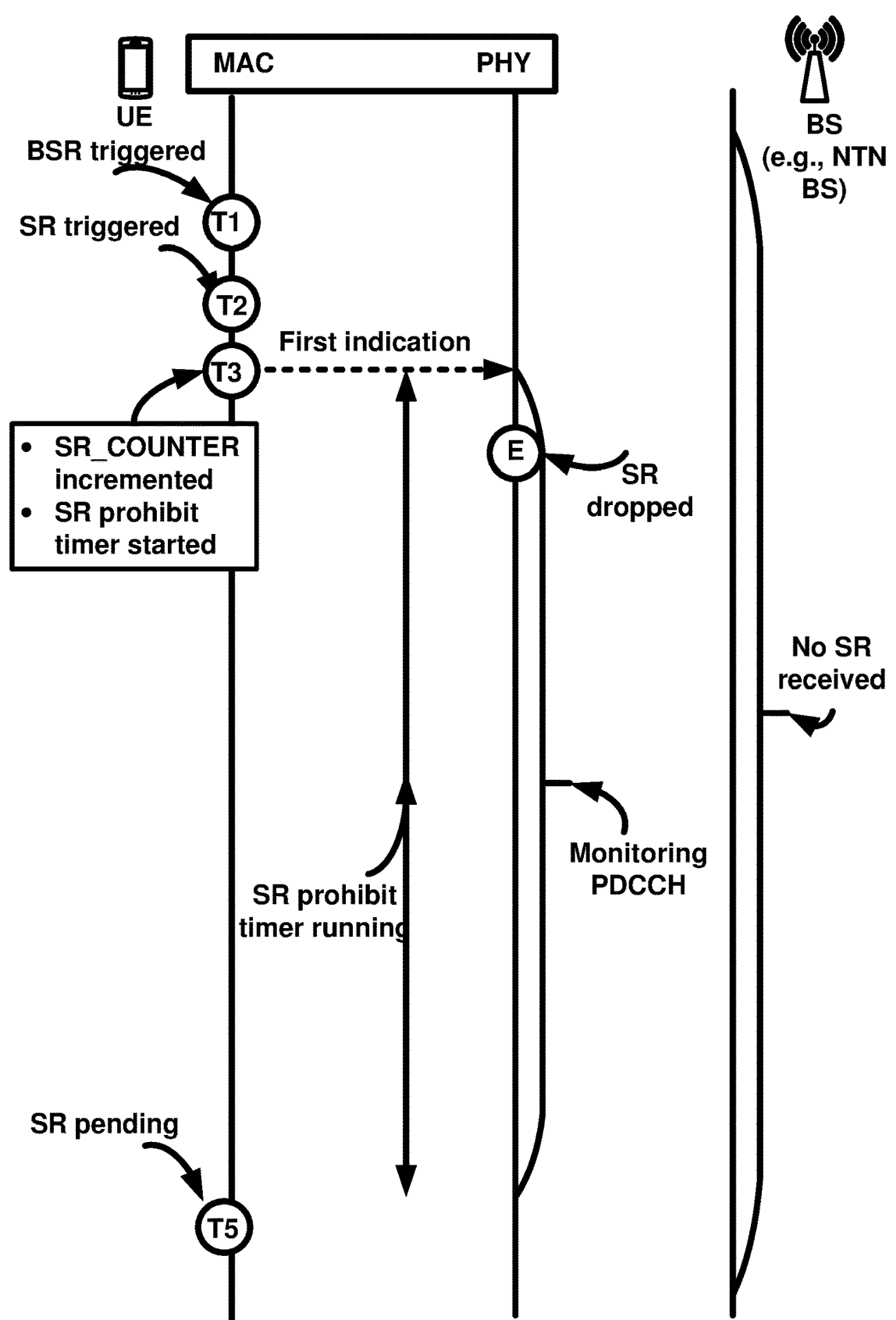
FIG. 28 shows an example of SR procedure in an NTN scenario.

FIG. 28 shows an example of SR procedure in an NTN scenario. The wireless device may be configured with zero, one, or more SR configurations. An SR configuration may comprise a set of PUCCH resources for SR across different BWPs and cells. For an LCH, at most one PUCCH resource for SR may be configured per BWP.

In an example embodiment shown in FIG. 28, a wireless device may trigger a BSR (e.g., regular BSR) in response to data belonging to an LCH become available and no UL-SCH resources being available for a transmission of UL data and/or BSR MAC CE (at time T1 in FIG. 28). In an example, in response to the triggering BSR the higher layer of the wireless device may trigger an SR (at time T2 in FIG. 28).

The lower layer may be, for example, a PHY layer 211 of a wireless device, and the higher layer may be, for example, a MAC layer 212 of a wireless device. The lower layer may be, for example, a MAC layer 212 of a wireless device, and the higher layer may be, for example, an RRC layer of a wireless device. In the example shown in FIG. 28, the physical layer is the lower layer and the MAC layer is higher layer.

The higher layer of the wireless device may determine that the LCH being configured with one or more SR configurations parameters. In an example, the higher layer of the wireless device may determine that one valid PUCCH resource for the triggered/pending SR at the time of SR transmission occasion is available.

The higher layer of the wireless device may, based on determining that an SR being triggered and not cancelled (e.g., SR being pending), determine whether one or more conditions for the transmission of an SR being fulfilled. In an example, the one or more conditions for the transmission of the SR may comprise at least one of: having one or more valid PUCCH resources configured for the pending SR; having an SR transmission occasion on valid PUCCH resource corresponding to the SR configuration; the SR prohibit timer not being running at the time of the SR transmission occasion; the PUCCH resource for the SR transmission occasion not being overlapped with a measurement gap; the SR_COUNTER being smaller than an SR counter threshold. In an example, the SR counter threshold may be the maximum number of SR transmission (e.g., sr_TransMax). In an example, upon determining that the one or more conditions for the transmission of the triggered SR being met, the MAC layer of the wireless device may notify, via the first indication, the physical layer to signal the SR over one valid PUCCH resource corresponding to the SR (at time T3 in FIG. 28). The first indication may indicate/notify the lower layer of the wireless device of the transmission of the SR.

In an example, upon (or based on) receiving the first indication of the SR transmission, the physical layer of the wireless device may determine an SR transmission occasion on one valid PUCCH resource. The physical layer may determine the SR transmission occasion, for example, based on the periodicity of the SR transmission in slots (e.g., provided by periodicityAndOffset) for the PUCCH transmission conveying/carrying the SR (e.g., at time T4 in FIG. 28). The physical layer may determine the SR transmission occasion, for example, based on the offset of the SR transmission in slots (e.g., provided by periodicityAndOffset) for the PUCCH transmission conveying/carrying the SR (e.g., at time T4 in FIG. 28). In an example, configuration parameters (e.g., parameter nrofSymbols) from a higher layer (e.g., RRC) may indicate the number of symbols being used of the PUCCH transmission.

In an example, in response to transmitting the first indication of the SR transmission to the physical layer, the higher layer of the wireless device may start the SR prohibit timer and increment SR_COUNTER by 1. While the SR prohibit timer is running, the wireless device may monitor PDCCH for receiving one or more DCIs indicating UL grant(s) for the transmission of the UL data.

In an example, the physical layer may transmit the SR as determined (e.g., in the obtained frame number and the slot number based on periodicityAndOffset). Based on determining, by the wireless device, that one or more uplink grants being received until the expiry of the SR prohibit timer, the wireless device may use the one or more UL grants to transmit UL data and/or BSR MAC CE. In an example, upon transmitting the UL data and/or BSR MAC CE using the UL grants, the wireless device may cancel the BSR. In an example, the wireless device, based on determining that the BSR being cancelled, may cancel the SR and stop the sr-ProhibitTimer. The wireless device may stop monitoring PDCCH in response to determining that the SR prohibit timer being stopped.

In an example shown in FIG. 28, despite receiving the first indication of the transmission of the SR from the higher layer of the wireless device at time T3, the lower layer of the wireless device may drop the SR at time T4 (e.g., by not transmitting the PUCCH conveying the SR). Dropping the SR may comprise, for example, dropping transmission of the SR. Dropping the SR may comprise, for example, not transmitting the SR.

For example, when the number of symbols required for the transmission of the PUCCH conveying the SR (provided by nrofSymbols) is larger than the available symbols in the slot s, the lower layer of the wireless device may drop the SR.

In another example, if the wireless device transmits the SR in a resource using PUCCH format 0 and HARQ-ACK information bits in a resource using PUCCH format 1 in the slot s, the wireless may transmit a PUCCH with the HARQ-ACK information bits in the resource using PUCCH format 1 (e.g., the lower layer may drop the SR).

In another example, if the wireless device transmits the SR in a first resource using PUCCH format 1 and at most two HARQ-ACK information bits in a second resource using PUCCH format 1 in the slot s, the wireless device may transmit a PUCCH with HARQ-ACK information bits in the first resource using PUCCH format 1. The wireless device may not transmit the SR.

In another example, the wireless device may transmit multiple overlapping PUCCHs in the slot s or overlapping PUCCH(s) and PUSCH(s) in the slot s. In an example, one of the PUCCHs may include HARQ-ACK information in response to an SPS PDSCH reception. In an example, any PUSCH is not in response to a DCI format detection. For each PUCCH resource in the set Q that satisfies the aforementioned timeline conditions (e.g., timelines condition 1, 2, 3, 4, and 5), when applicable, the wireless device may multiplex HARQ-ACK information and/or CSI reports in a PUSCH if the PUCCH resource overlaps in time with a PUSCH transmission. In an example, the physical layer of the wireless device may drop the SR.

In an example, the wireless device may be configured to transmit K PUCCHs for respective K SRs in the slot s(e.g., as determined by a set of schedulingRequestResourceId and a schedulingRequestResourceId associated with schedulingRequestID-BFR-SCell) with SR transmission occasions that would overlap with a transmission of a PUCCH with HARQ-ACK information from the wireless device in the slot s or with a transmission of a PUCCH with CSI report(s) from the wireless device in the slot s. While a total number of K+1 PUCCHs may be required to be transmitted in the slot s, only K PUCCHs may be transmitted where one of the transmitting PUCCHs being corresponding to the HARQ-ACK or CSI. In an example, the wireless device may drop one SR. In an example, the dropped SR may be the SR.

In case the SR is dropped, the wireless device, my unnecessarily start monitoring the PDCCH as for a non-transmitted/dropped SR the base station may not be able to allocate one or more UL grants (e.g., the base station, based on not receiving the SR, may not be able to predict the required UL resources of the wireless device).

In an example, based on determining that one or more uplink grants not being received until the expiry of the SR prohibit timer the wireless device may consider the SR pending. In an example, based on determining that the SR being pending, the wireless device may repeat one or more actions comprising: determining the at least one valid PUCCH resource for the transmission of the SR; checking whether the SR prohibit timer is running; whether the SR_COUNTER is equal or greater than the maximum number of SR transmission; incrementing the SR_COUNTER, transmitting the SR and starting the SR prohibit timer; monitoring a PDCCH for uplink grant. In an example, upon determining that the SR being pending, the higher layer may transmit the first indication of the SR transmission to the physical layer.

A wireless device may trigger a BSR in response to arrival of a new data. Based on the triggered BSR, the wireless device may trigger an SR in response to determining that there is no UL-SCH resource available for transmitting the BSR and/or UL data. Based on the triggering the SR, a higher layer of the wireless device may notify a physical layer of the wireless device via a first indication to signal/ transmit an SR over one valid PUCCH resource corresponding to the SR. After the transmission of the first indication, the higher layer of the wireless device may start the SR prohibit timer. While the SR prohibit timer is running, the wireless device may monitor the PDCCH for receiving one or more DCIs indicating one or more UL grant(s) for the transmission of the UL data.

When the wireless device is communicating with an NTN base station, for example, with a long propagation delay, the wireless device may be configured to extend the value range of the SR prohibit timer by a variable offset (e.g., due to satellite movement) value in order to account for the long propagation delay. Compared to a terrestrial network scenario, the value range of the SR prohibit timer may be substantially larger in an NTN scenario (e.g., around 500 milliseconds larger when the wireless device communicating with a GEO satellite). Compared to a terrestrial network scenario, to account for the long propagation delay, in an NTN scenario, the wireless device may, in response to signaling the SR, monitor PDCCH for a longer time window until receiving an UL grant.

In the existing technologies, the lower layer of the wireless device, despite receiving the first indication indicating the transmission of the SR from the higher layer of the wireless device, may not transmit the SR (e.g., the SR being dropped by the physical layer). For example, when the number of symbols required for transmission of a PUCCH conveying/carrying the SR is larger than the available symbols in a slot corresponding to the SR transmission occasion, the physical layer of the wireless device may drop the SR. In the existing technologies, when the SR is dropped, the higher layer of the wireless device may keep the SR prohibit timer running. Based on the SR prohibit timer running, the wireless device may keep monitoring the PDCCH despite the SR being dropped. In an NTN scenario with the long propagation delay, monitoring PDCCH despite the SR being dropped may increase the consumed power of the wireless device. In the implementation of the existing technologies in an NTN scenario, the SR procedure may substantially increase the power consumption of the wireless device.

Further, despite the SR being dropped by the lower layer, the higher layer of the wireless device may consider the SR being transmitted and keep the SR prohibit timer running. As the SR prohibit timer being running, the higher layer of the wireless device may not transmit another first indication indicating the physical layer to signal the SR over one valid PUCCH corresponding to the SR. Based on existing technologies, in an NTN scenario with a long propagation delay, despite the SR being dropped, the wireless device may wait until the SR prohibit timer expires and then the higher layer may transmit the first indication to the physical layer. In the implementation of the existing technologies in an NTN scenario, the SR procedure may substantially increase the data transmission latency of the wireless device.

For the wireless device communicating with an NTN base station, there is a need to improve the existing SR procedure in order to reduce the power consumption of the wireless device and/or reduce the data transmission latency.

A wireless device may communicate with an NTN node (e.g., an NTN base station). The wireless device may trigger a BSR in response to data becoming available. In response to the triggered BSR, the wireless device may trigger an SR in response to determining that there is no UL-SCH resource(s) available for transmitting the BSR and/or UL data. Based on the triggering the SR, a higher layer of the wireless device may notify/indicate a lower layer of the wireless device via a first indication to signal/transmit an SR over one valid PUCCH resource corresponding to the SR.

The lower layer may be, for example, a PHY layer 211 of a wireless device, and the higher layer may be, for example, a MAC layer 212 of a wireless device. The lower layer may be, for example, a MAC layer 212 of a wireless device, and the higher layer may be, for example, an RRC layer of a wireless device. In the example shown in FIG. 28, the physical layer is the lower layer and the MAC layer is higher layer.

Based on transmitting the first indication indicating the transmission of the SR, the higher layer may start the SR prohibit timer. While the SR prohibit timer is running, the wireless device may monitor the PDCCH for receiving one or more DCIs indicating one or more UL grants for the transmission of the UL data.

When the wireless device is communicating with an NTN base station, for example, with a long propagation delay, the wireless device may be configured to extend the value range of the SR prohibit timer by a variable offset (e.g., due to satellite movement) value in order to account for the long propagation delay.

In an example, the wireless device may extend the value range of the SR prohibit timer by the propagation delay (e.g., RTD). In another example, the wireless device may be configured to extend the value range of the SR prohibit timer by an offset. The offset value may be indicated via a broadcast system information (e.g., SIB1). For example, the offset value may be explicitly configured based on the timing advance (TA) value that may be indicated via a Timing Advance Command (TAC) MAC CE.

In another example, the offset value may be shared across several timers in the higher layer (e.g., MAC layer) such as HARQ RTT retransmission timer (e.g., drx-HARQ-RTT-TimerUL and/or drx-HARQ-RTT-TimerDL), Random Access response timer (e.g., ra-ResponseWindow and/or msgB-ResponseWindow), contention resolution timer (e.g., ra-ContentionResolutionTimer), and the like (e.g., the wireless device may implicitly extend the value range of the SR prohibit timer by the offset value based on one or more other higher layer timers). In another example, the offset value may be implicitly indicated based on an offset value indicated for the scheduling timing of a PUSCH scheduled by a DCI.

In an example, upon receiving the first indication of the SR transmission from the higher layer, the lower layer of the wireless device may determine an SR transmission occasion (e.g., slot s) on one valid PUCCH resource. The wireless device may determine the SR transmission occasion, for example, based on the periodicity and the offset of the corresponding SR configuration (e.g., provided by period-icityAndOffset) for the PUCCH transmission conveying the SR.

In an example, the lower layer of the wireless device, despite receiving the first indication indicating the transmission of the SR from the higher layer of the wireless device, may not transmit the SR (e.g., the SR being dropped by the lower layer).

For example, when the number of symbols required for the transmission of the PUCCH conveying the SR (provided by nrofSymbols) is larger than the available symbols in the slot s, the lower layer of the wireless device may drop the SR.

In another example, if the wireless device transmits (or is configured to transmit) the SR in a resource using PUCCH format 0 and HARQ-ACK information bits in a resource using PUCCH format 1 in the slot s, the wireless may transmit a PUCCH with the HARQ-ACK information bits in the resource using PUCCH format 1 (e.g., the lower layer may drop the SR).

In another example, if the wireless device transmits the SR in a first resource using PUCCH format 1 and at most two HARQ-ACK information bits in a second resource using PUCCH format 1 in the slot s, the wireless device may transmit a PUCCH with HARQ-ACK information bits in the first resource using PUCCH format 1. The wireless device may not transmit the SR.

In another example, the wireless device may transmit multiple overlapping PUCCHs in the slot s or overlapping PUCCH(s) and PUSCH(s) in the slot s. In an example, one of the PUCCHs may include HARQ-ACK information in response to an SPS PDSCH reception. In an example, any PUSCH is not in response to a DCI format detection. For each PUCCH resource in the set Q that satisfies the afore-mentioned timeline conditions (e.g., timelines condition 1, 2, 3, 4, and 5), when applicable, the wireless device may multiplex HARQ-ACK information and/or CSI reports in a PUSCH if the PUCCH resource overlaps in time with a PUSCH transmission. In an example, the physical layer of the wireless device may drop the SR.

In an example, when there are multiple non-overlapping PUCCH resources with positive SR corresponding to dif-ferent SR configurations within the slot s, it may be up to wireless device to select at most two PUCCHs with positive SR. One of the selected PUCCH may be short PUCCH if two PUCCHs are selected. In an example, the wireless device may drop one or more SRs that their associated PUCCHs are not selected for transmission.

In an example, the wireless device may be configured to transmit K PUCCHs for respective K SRs in the slot s(e.g., as determined by a set of schedulingRequestResourceId and a schedulingRequestResourceId associated with schedulin-gRequestID-BFR-SCell) with SR transmission occasions that would overlap with a transmission of a PUCCH with HARQ-ACK information from the wireless device in the slot s or with a transmission of a PUCCH with CSI report(s) from the wireless device in the slot s. While a total number of K+1 PUCCHs may be required to be transmitted in the slot s, only K PUCCHs may be transmitted where one of the transmitting PUCCHs being corresponding to the HARQ-ACK or CSI. In an example, the wireless device may drop one SR. In an example, the dropped SR may be the SR.

The description provided regarding whether the SR being dropped or transmitted should not be considered limited to examples provided in this disclosure. By way of the pro-vided examples, several details of the exemplary set of embodiments regarding the SR being dropped or transmitted are provided hereinabove. It will be recognized by those of skill in the art that any number of variations on or alterna-tives to the specific details of the exemplary embodiments may be implemented if desired.

When the SR being dropped, based on some example embodiments of this disclosure, the physical layer of the wireless device may notify the higher layer of the wireless device accordingly. The higher layer of the wireless device may determine that the lower layer dropped the SR. The higher layer may take some actions accordingly. For example, the higher layer may stop the SR prohibit timer based on the determining that the lower layer dropped the SR. Based on the stopping the SR prohibit timer, the wireless device may not monitor the PDCCH. In an NTN scenario with a long propagation delay, not monitoring PDCCH may substantially reduce the consumed power of the wireless device. Example embodiments may reduce the power consumption of the wireless device.

When the SR being dropped, based on some example embodiments of this disclosure, the physical layer of the wireless device may notify the higher layer of the wireless device accordingly. The higher layer of the wireless device may stop the SR prohibit timer based on determining that the lower layer dropped the SR. In an example, when the SR prohibit timer is stopped, the higher layer of the wireless device may determine that the SR is pending and notify the lower layer to signal the SR over one valid PUCCH via the first indication of the transmission of the SR. In an NTN scenario with a long propagation delay, example embodiments may substantially reduce the data transmission latency.

Based on some example embodiments of this disclosure, the higher layer of the wireless device may not start the SR prohibit timer in response to transmitting the first indication indicating the SR transmission to the lower layer. The lower layer of the wireless device may notify the higher layer of the wireless device via a second indication that the SR being dropped. Based on determining that the lower layer being dropped the SR, the higher layer of the wireless device may not start the SR prohibit timer. Based on determining that the lower layer being dropped the SR, the higher layer of the wireless device may transmit another first indication for the transmission of the SR to the lower layer. This may substantially reduce the data transmission latency of the wireless device. Example embodiments may reduce the data transmission latency of the wireless device.

Based on some example embodiments of this disclosure, the higher layer of the wireless device may not start the SR prohibit timer in response to transmitting the first indication indicating the SR transmission to the lower layer. The lower layer of the wireless device may notify the higher layer of the wireless device via a second indication that the SR being dropped. Based on determining that the lower layer being dropped the SR, the higher layer of the wireless device may not start the SR prohibit timer. Based on determining that the lower layer being dropped the SR, the higher layer of the wireless device may transmit another first indication for the transmission of the SR to the lower layer. In an example, when the SR prohibit timer is not started, the wireless device may not monitor the PDCCH. In an NTN scenario with the long propagation delay, not monitoring PDCCH may substantially reduce the consumed power of the wireless device. Example embodiments may reduce the power consumption of the wireless device.

Based on some example embodiments of this disclosure, the higher layer of the wireless device may not start the SR prohibit timer in response to transmitting the first indication indicating the SR transmission to the lower layer. The lower layer of the wireless device may notify the higher layer of the wireless device via a third indication that the SR being transmitted. Based on determining that the lower layer being signaled/transmitted the SR, the higher layer of the wireless device may start the SR prohibit timer. In an example, based on determining that the lower layer signaled/transmitted the SR, the wireless device may start monitoring the PDCCH. In an NTN scenario with the long propagation delay, monitoring PDCCH in response to determining that the SR being signaled/transmitted may improve the power efficiency of the wireless device. Example embodiments may reduce the power consumption of the wireless device.

Figure 29:
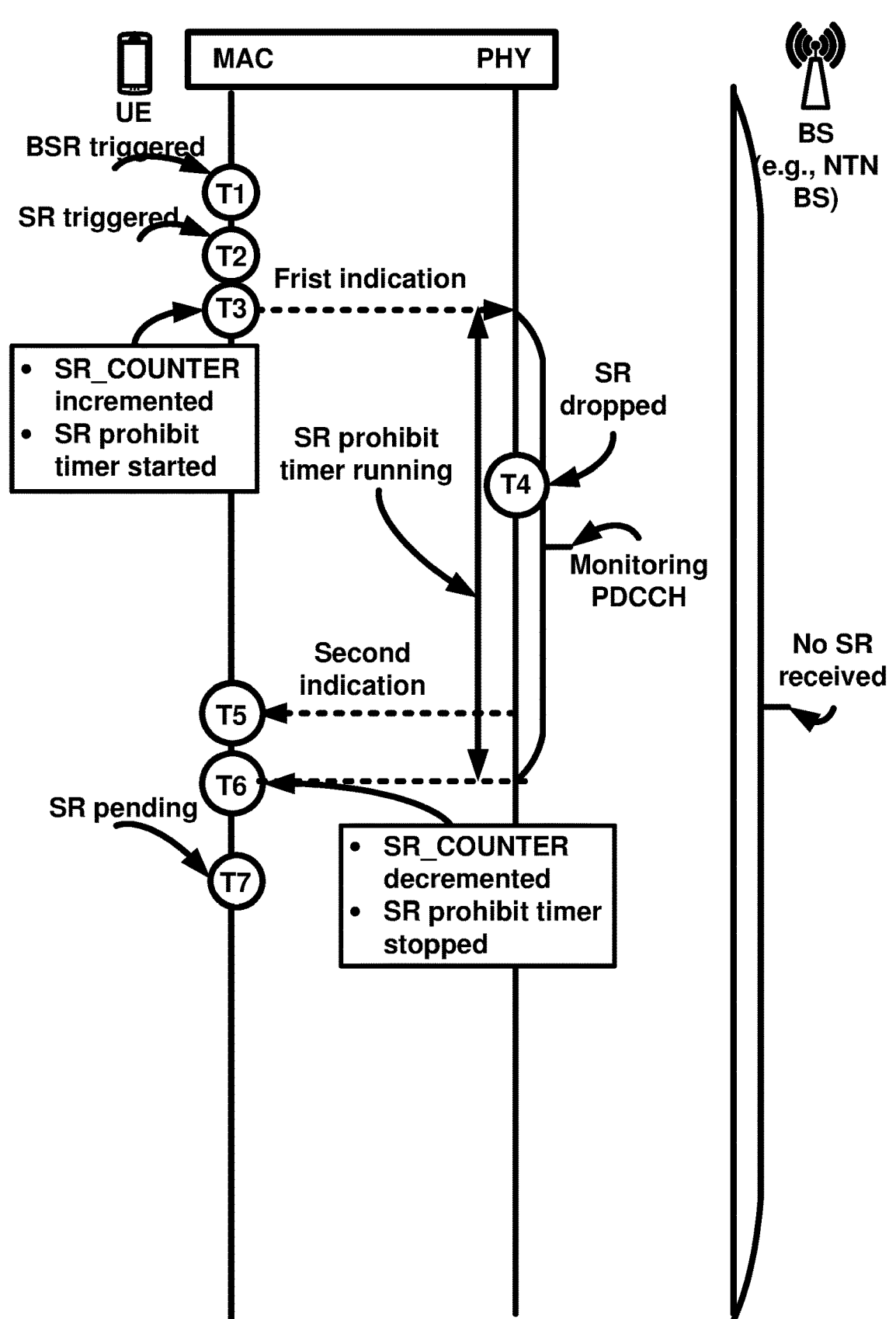
FIG. 29 shows an example of SR procedure in an NTN scenario, in accordance with certain aspects of the present disclosure.

FIG. 29 shows an example of SR procedure in an NTN scenario, in accordance with certain aspects of the present disclosure. A wireless device may be configured with zero, one, or more SR configurations. An SR configuration may comprise a set of PUCCH resources for SR across different BWPs and cells. For an LCH, at most one PUCCH resource for SR may be configured per BWP. The wireless device may be configured to extend the value range of the SR prohibit timer by an offset in order to account for the long propagation delay (e.g., RTD). The offset value may be indicated via a broadcast system information (e.g., SIB1). In an example, the offset value may be chosen based on an offset value indicated for the scheduling timing of a PUSCH scheduled by a DCI. In another example, the offset value may be configured based on the timing advance (TA) value that may be indicated via a Timing Advance Command (TAC) MAC CE. In another example, the wireless device may implicitly determine/calculate the value of the offset from one or more timers in the higher layer (e.g., ra-ResponseWindow).

In an example embodiment shown in FIG. 29, at time T1 the wireless device may trigger a BSR (e.g., regular BSR), for example, in response to data belonging to an LCH becoming available and no UL-SCH resources being available for a transmission of UL data and/or BSR MAC CE. In an example, in response to the triggering BSR, the MAC layer of the wireless device may trigger an SR (at time T2 in FIG. 29).

The higher layer of the wireless device may, based on determining that an SR being triggered and not cancelled (e.g., SR being pending), determine whether one or more conditions for the transmission of an SR being fulfilled. In an example, the one or more conditions for the transmission of the SR may comprise at least one of: having one or more valid PUCCH resources configured for the pending SR; having an SR transmission occasion on valid PUCCH resource corresponding to the SR configuration; the SR prohibit timer not being running at the time of the SR transmission occasion; the PUCCH resource for the SR transmission occasion not being overlapped with a measurement gap; the SR_COUNTER being smaller than an SR counter threshold. In an example, the SR counter threshold may be the maximum number of SR transmission (e.g., sr_TransMax). In an example, upon determining that the one or more conditions for the transmission of the triggered SR being met, the MAC layer of the wireless device may notify, via the first indication, the physical layer to signal the SR over one valid PUCCH resource corresponding to the SR (at time T3 in FIG. 29). The first indication may indicate/notify the lower layer of the wireless device of the transmission of the SR. In an example, in response to transmitting the first indication of the SR transmission to the physical layer, the higher layer of the wireless device may start the SR prohibit timer and increment SR_COUNTER by 1. While the SR prohibit timer is running, the wireless device may monitor PDCCH for receiving one or more DCIs indicating UL grant(s) for the transmission of the UL data.

In an example, upon (or based on) receiving the first indication of the SR transmission, the physical layer of the wireless device may determine an SR transmission occasion on one valid PUCCH resource. The physical layer may determine the SR transmission occasion, for example, based on the periodicity of the SR transmission in slots (e.g., provided by periodicityAndOffset) for the PUCCH transmission conveying/carrying the SR (e.g., at time T4 in FIG. 29). The physical layer may determine the SR transmission occasion, for example, based on the offset of the SR transmission in slots (e.g., provided by periodicityAndOffset) for the PUCCH transmission conveying/carrying the SR (e.g., at time T4 in FIG. 29). In an example, configuration parameters (e.g., parameter nrofSymbols) from a higher layer (e.g., RRC) may indicate the number of symbols being used of the PUCCH transmission.

In an example shown in FIG. 29, despite receiving the first indication of the transmission of the SR from the higher layer of the wireless device at time T3, the lower layer of the wireless device may drop the SR at time T4 (e.g., by not transmitting the PUCCH conveying the SR). Dropping the SR may comprise, for example, dropping transmission of the SR. Dropping the SR may comprise, for example, not transmitting the SR.

For example, when the number of symbols required for the transmission of the PUCCH conveying the SR (provided by nrofSymbols) is larger than the available symbols in the slot s, the lower layer of the wireless device may drop the SR.

In another example, if the wireless device transmits (or is configured to transmit) the SR in a resource using PUCCH format 0 and HARQ-ACK information bits in a resource using PUCCH format 1 in the slot s, the wireless may transmit a PUCCH with the HARQ-ACK information bits in the resource using PUCCH format 1 (e.g., the lower layer may drop the SR).

In another example, if the wireless device transmits the SR in a first resource using PUCCH format 1 and at most two HARQ-ACK information bits in a second resource using PUCCH format 1 in the slot s, the wireless device may transmit a PUCCH with HARQ-ACK information bits in the first resource using PUCCH format 1. The wireless device may not transmit the SR.

In another example, the wireless device may transmit multiple overlapping PUCCHs in the slot s or overlapping PUCCH(s) and PUSCH(s) in the slot s. In an example, one of the PUCCHs may include HARQ-ACK information in response to an SPS PDSCH reception. In an example, any PUSCH is not in response to a DCI format detection. For each PUCCH resource in the set Q that satisfies the afore-mentioned timeline conditions (e.g., timelines condition 1, 2, 3, 4, and 5), when applicable, the wireless device may multiplex HARQ-ACK information and/or CSI reports in a PUSCH if the PUCCH resource overlaps in time with a PUSCH transmission. In an example, the physical layer of the wireless device may drop the SR.

In an example, the wireless device may be configured to transmit K PUCCHs for respective K SRs in the slot s(e.g., as determined by a set of schedulingRequestResourceId and a schedulingRequestResourceId associated with schedulin-gRequestID-BFR-SCell) with SR transmission occasions that would overlap with a transmission of a PUCCH with HARQ-ACK information from the wireless device in the slot s or with a transmission of a PUCCH with CSI report(s) from the wireless device in the slot s. While a total number of K+1 PUCCHs may be required to be transmitted in the slot s, only K PUCCHs may be transmitted where one of the transmitting PUCCHs being corresponding to the HARQ-ACK or CSI. In an example, the wireless device may drop one SR. In an example, the dropped SR may be the SR. In an example, the lower layer of the wireless device may, based on determining that the SR being dropped, notify the higher layer of the wireless device via a second indication at time T5 in FIG. 29. In an example, the second indication may indicate that the lower layer did not transmit the SR. In an example, the second indication may indicate failure of transmission of the SR. In an example, the second indication may indicate that the lower layer dropped the SR.

The higher layer of the wireless device may, in response to receiving the second indication indicating the SR being dropped, stop the SR prohibit timer. The higher layer of the wireless device may, in response to receiving the second indication indicating the SR being dropped may decrement the SR counter (at time T6). In an example, upon (or based on) receiving the second indication, the wireless device may stop monitoring the PDCCH. Stopping the monitoring the PDCCH may reduce the power consumption of the wireless device In an example, based on receiving the second indication, the higher layer of the wireless device may determine that the SR is pending at time T7 in FIG. 29. Stopping the SR prohibit timer based on determining that the SR being dropped may reduce the data transmission latency of the wireless device.

In an example, based on determining that the SR being pending, the wireless device may repeat one or more actions comprising: determining the at least one valid PUCCH resource for the transmission of the SR; checking whether the SR prohibit timer is running; whether the SR_COUNTER is equal or greater than the maximum number of SR transmission; incrementing the SR_COUNTER, transmitting the SR and starting the SR prohibit timer; monitoring a PDCCH for uplink grant.

Figure 30:
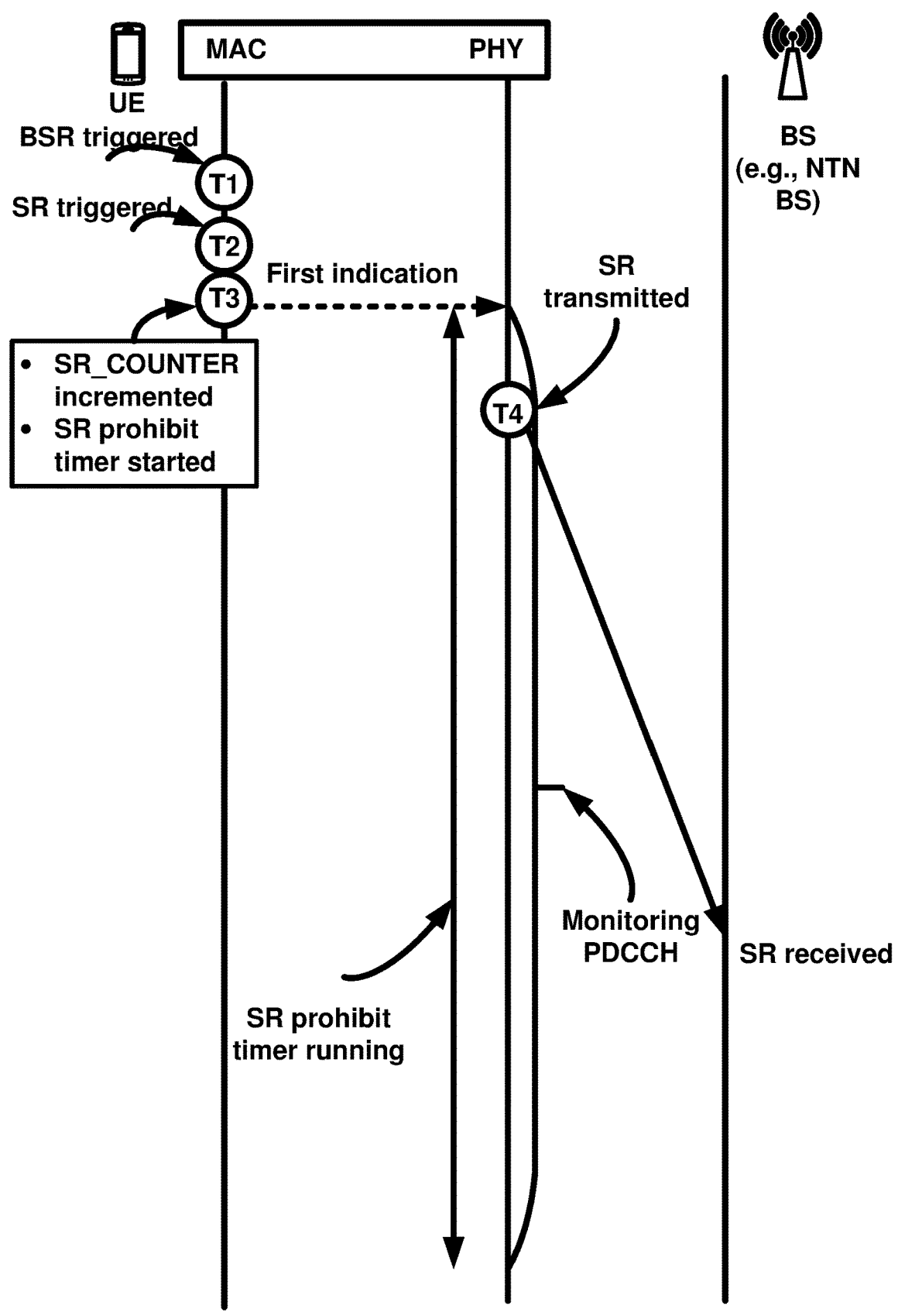
FIG. 30 shows an example of SR procedure in an NTN scenario, in accordance with certain aspects of the present disclosure.

FIG. 30 shows an example of SR procedure in an NTN scenario, in accordance with certain aspects of the present disclosure. A wireless device may be configured with zero, one, or more SR configurations. An SR configuration may comprise a set of PUCCH resources for SR across different BWPs and cells. For an LCH, at most one PUCCH resource for SR may be configured per BWP.

The wireless device may be configured to extend the value range of the SR prohibit timer by an offset in order to account for the long propagation delay (e.g., RTD). The offset value may be indicated via a broadcast system infor-mation (e.g., SIB1). In an example, the offset value may be chosen based on an offset value indicated for the scheduling timing of a PUSCH scheduled by a DCI. In another example, the offset value may be configured based on the timing advance (TA) value that may be indicated via a Timing Advance Command (TAC) MAC CE. In another example, the wireless device may implicitly determine/calculate the value of the offset from one or more timers in the higher layer (e.g., ra-ResponseWindow).

In an example embodiment shown in FIG. 30, at time T1 the wireless device may trigger a BSR (e.g., regular BSR), for example, in response to data belonging to an LCH becoming available and no UL-SCH resources being avail-able for a transmission of UL data and/or BSR MAC CE. In an example, in response to the triggering BSR, the MAC layer of the wireless device may trigger an SR (at time T2 in FIG. 30).

The higher layer of the wireless device may, based on determining that an SR being triggered and not cancelled (e.g., SR being pending), determine whether one or more conditions for the transmission of an SR being fulfilled. In an example, the one or more conditions for the transmission of the SR may comprise at least one of: having one or more valid PUCCH resources configured for the pending SR; having an SR transmission occasion on valid PUCCH resource corresponding to the SR configuration; the SR prohibit timer not being running at the time of the SR transmission occasion; the PUCCH resource for the SR transmission occasion not being overlapped with a measure-ment gap; the SR_COUNTER being smaller than an SR counter threshold. In an example, the SR counter threshold may be the maximum number of SR transmission (e.g., sr_TransMax). In an example, upon determining that the one or more conditions for the transmission of the triggered SR being met, the MAC layer of the wireless device may notify, via the first indication, the physical layer to signal the SR over one valid PUCCH resource corresponding to the SR (at time T3 in FIG. 30). The first indication may indicate/notify the lower layer of the wireless device of the transmission of the SR. In an example, in response to transmitting the first indication of the SR transmission to the physical layer, the higher layer of the wireless device may start the SR prohibit timer and increment SR_COUNTER by 1. While the SR prohibit timer is running, the wireless device may monitor PDCCH for receiving one or more DCIs indicating UL grant(s) for the transmission of the UL data.

In an example, upon (or based on) receiving the first indication of the SR transmission, the physical layer of the wireless device may determine an SR transmission occasion on one valid PUCCH resource. The physical layer may determine the SR transmission occasion, for example, based on the periodicity of the SR transmission in slots (e.g., provided by periodicityAndOffset) for the PUCCH transmission conveying/carrying the SR (e.g., at time T4 in FIG. 30). The physical layer may determine the SR transmission occasion, for example, based on the offset of the SR transmission in slots (e.g., provided by periodicityAndOffset) for the PUCCH transmission conveying/carrying the SR (e.g., at time T4 in FIG. 30). In an example, configuration parameters (e.g., parameter nrofSymbols) from a higher layer (e.g., RRC) may indicate the number of symbols being used of the PUCCH transmission.

In an example, the lower layer based on determining that the SR being transmitted may not transmit the second indication to the higher layer of the wireless device.

As shown in FIG. 30, the higher layer of the wireless device, based on not receiving the second indication from the lower layer, may allow the SR prohibit timer operate (e.g., keep the SR prohibit timer running).

As shown in FIG. 30, the higher layer of the wireless device, based on not receiving the second indication from the lower layer, may not decrement the SR counter.

Figure 31:
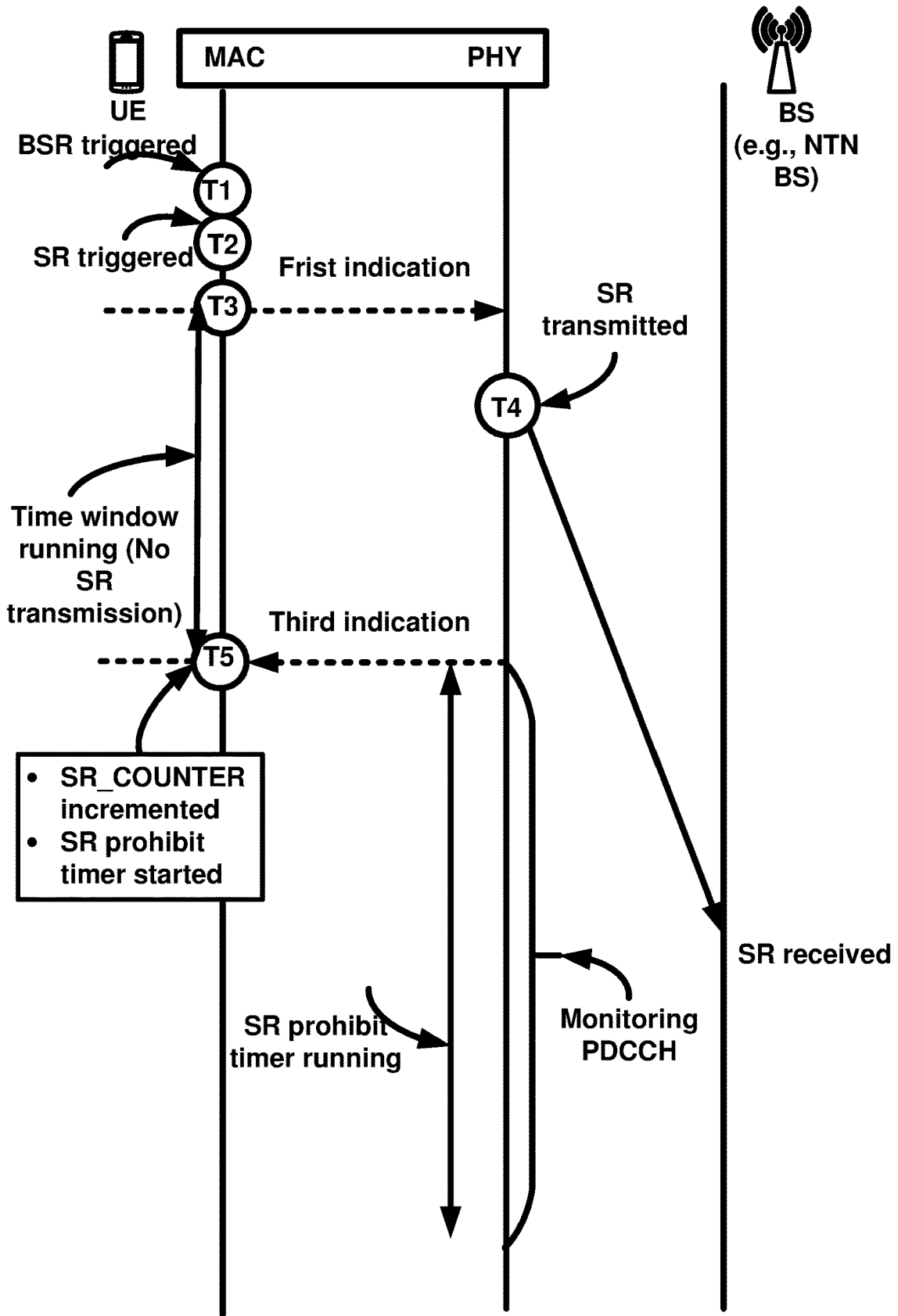
FIG. 31 shows an example of SR procedure in an NTN scenario, in accordance with certain aspects of the present disclosure.

FIG. 31 shows an example of SR procedure in an NTN scenario, in accordance with certain aspects of the present disclosure. A wireless device may be configured with zero, one, or more SR configurations. An SR configuration may comprise a set of PUCCH resources for SR across different BWPs and cells. For an LCH, at most one PUCCH resource for SR may be configured per BWP.

The wireless device may be configured to extend the value range of the SR prohibit timer by an offset in order to account for the long propagation delay (e.g., RTD). The offset value may be indicated via a broadcast system information (e.g., SIB1). In an example, the offset value may be chosen based on an offset value indicated for the scheduling timing of a PUSCH scheduled by a DCI. In another example, the offset value may be configured based on the timing advance (TA) value that may be indicated via a Timing Advance Command (TAC) MAC CE. In another example, the wireless device may implicitly determine/calculate the value of the offset from one or more timers in the higher layer (e.g., ra-ResponseWindow).

In an example embodiment shown in FIG. 31, at time T1 the wireless device may trigger a BSR (e.g., regular BSR), for example, in response to data belonging to an LCH becoming available and no UL-SCH resources being available for a transmission of UL data and/or BSR MAC CE. In an example, in response to the triggering BSR, the MAC layer of the wireless device may trigger an SR (at time T2 in FIG. 31).

The higher layer of the wireless device may, based on determining that an SR being triggered and not cancelled (e.g., SR being pending), determine whether one or more conditions for the transmission of an SR being fulfilled. In an example, the one or more conditions for the transmission of the SR may comprise at least one of: having one or more valid PUCCH resources configured for the pending SR; having an SR transmission occasion on valid PUCCH resource corresponding to the SR configuration; the SR prohibit timer not being running at the time of the SR transmission occasion; the PUCCH resource for the SR transmission occasion not being overlapped with a measurement gap; the SR_COUNTER being smaller than an SR counter threshold. In an example, the SR counter threshold may be the maximum number of SR transmission (e.g., sr_TransMax). In an example, upon determining that the one or more conditions for the transmission of the triggered SR being met, the MAC layer of the wireless device may notify, via the first indication, the physical layer to signal the SR over one valid PUCCH resource corresponding to the SR (at time T3 in FIG. 31). The first indication may indicate/notify the lower layer of the wireless device of the transmission of the SR. In an example, in response to transmitting the first indication of the SR transmission to the physical layer, the higher layer of the wireless device may start the SR prohibit timer and increment SR_COUNTER by 1. While the SR prohibit timer is running, the wireless device may monitor PDCCH for receiving one or more DCIs indicating UL grant(s) for the transmission of the UL data.

In an example, based on transmitting the first indication to the lower layer, the higher layer may start a (predetermined) time window (at time T3 in FIG. 31). In an example, while the time window is running, the higher layer of the wireless device may not transmit another first indication to the lower layer.

The length of the time window may be determined based on at least the SR configuration parameters. In an example, the length of the time window may be determined based on at least the periodicity of the PUCCH carrying/conveying the SR. In another example, he length of the time window may be determined based on at least the value range of the SR prohibit timer. In another example, the length of the time window may be determined based on at least a repetition factor (e.g., $N_{PUCCH}^{repeat}$) of the PUCCH conveying/carrying the SR.

In an example, upon (or based on) receiving the first indication of the SR transmission, the physical layer of the wireless device may determine an SR transmission occasion on one valid PUCCH resource. The physical layer may determine the SR transmission occasion, for example, based on the periodicity of the SR transmission in slots (e.g., provided by periodicityAndOffset) for the PUCCH transmission conveying/carrying the SR (e.g., at time T4 in FIG. 31). The physical layer may determine the SR transmission occasion, for example, based on the offset of the SR transmission in slots (e.g., provided by periodicityAndOffset) for the PUCCH transmission conveying/carrying the SR (e.g., at time T4 in FIG. 31). In an example, configuration parameters (e.g., parameter nrofSymbols) from a higher layer (e.g., RRC) may indicate the number of symbols being used of the PUCCH transmission.

In an example, while the time window is running, the higher layer of the wireless device may receive a third indication from the lower layer (at time T5 in FIG. 31). The third indication may indicate that the lower layer has signaled/transmitted the SR. In an example, the third indication may notify the higher layer that the lower layer has signaled/transmitted the SR.

In an example, the higher layer upon (or based on) receiving the third indication may stop the time widow. In an example, the higher layer of the wireless device based on receiving the third indication may start the SR prohibit timer.

In an example, the higher layer of the wireless device based on receiving the third indication may increment the SR counter. In an example, based on starting the SR prohibit timer, the wireless device may monitor PDCCH for detecting one or more DCIs indicating one or more UL grants for UL data transmission.

Figure 32:
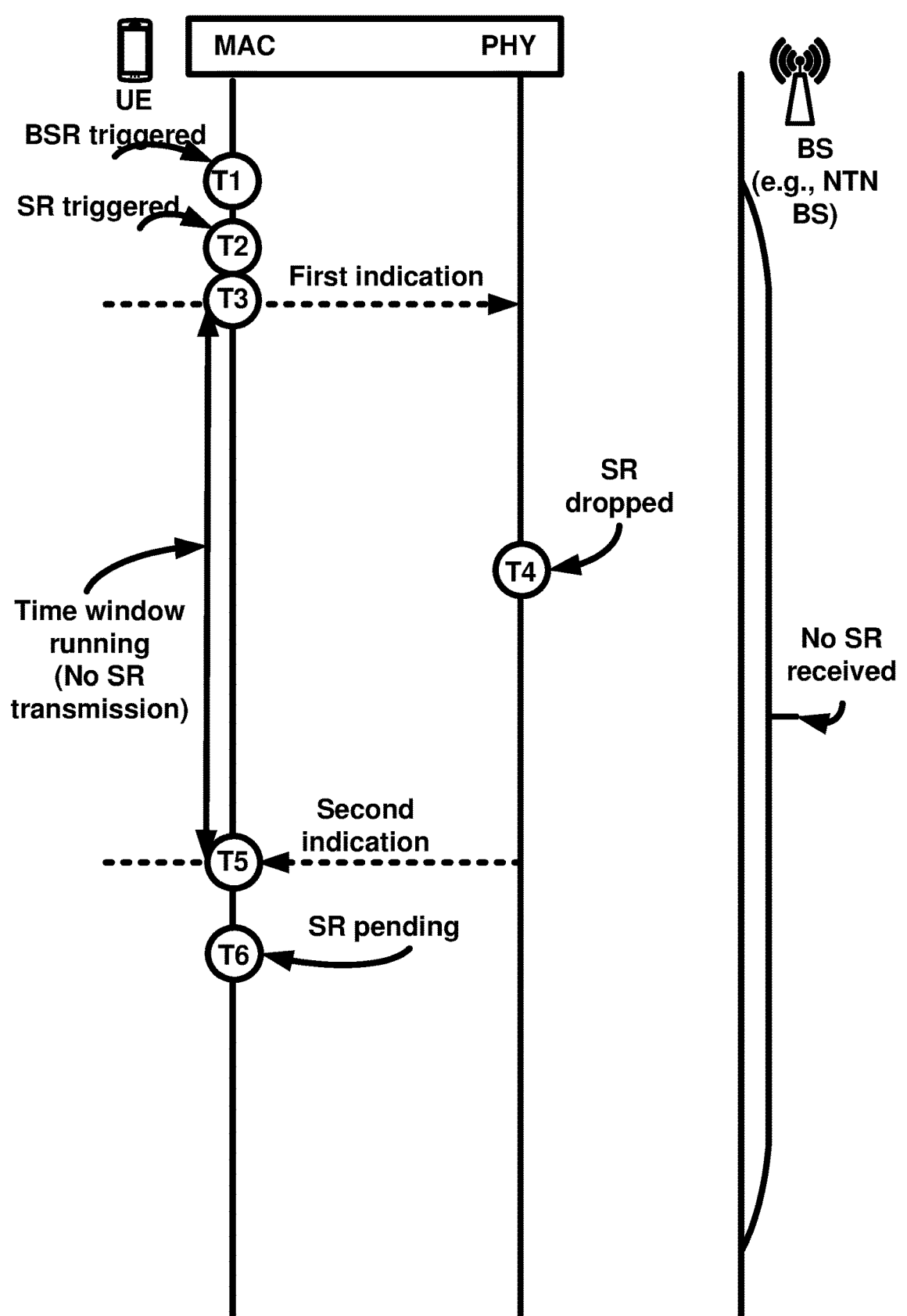
FIG. 32 shows an example of SR procedure in an NTN scenario, in accordance with certain aspects of the present disclosure.

FIG. 32 shows an example of SR procedure in an NTN scenario, in accordance with certain aspects of the present disclosure. A wireless device may be configured with zero, one, or more SR configurations. An SR configuration may comprise a set of PUCCH resources for SR across different BWPs and cells. For an LCH, at most one PUCCH resource for SR may be configured per BWP.

The wireless device may be configured to extend the value range of the SR prohibit timer by an offset in order to account for the long propagation delay (e.g., RTD). The offset value may be indicated via a broadcast system information (e.g., SIB1). In an example, the offset value may be chosen based on an offset value indicated for the scheduling timing of a PUSCH scheduled by a DCI. In another example, the offset value may be configured based on the timing advance (TA) value that may be indicated via a Timing Advance Command (TAC) MAC CE. In another example, the wireless device may implicitly determine/calculate the value of the offset from one or more timers in the higher layer (e.g., ra-ResponseWindow).

In an example embodiment shown in FIG. 32, at time T1 the wireless device may trigger a BSR (e.g., regular BSR), for example, in response to data belonging to an LCH becoming available and no UL-SCH resources being available for a transmission of UL data and/or BSR MAC CE. In an example, in response to the triggering BSR, the MAC layer of the wireless device may trigger an SR (at time T2 in FIG. 32).

The higher layer of the wireless device may, based on determining that an SR being triggered and not cancelled (e.g., SR being pending), determine whether one or more conditions for the transmission of an SR being fulfilled. In an example, the one or more conditions for the transmission of the SR may comprise at least one of: having one or more valid PUCCH resources configured for the pending SR; having an SR transmission occasion on valid PUCCH resource corresponding to the SR configuration; the SR prohibit timer not being running at the time of the SR transmission occasion; the PUCCH resource for the SR transmission occasion not being overlapped with a measurement gap; the SR_COUNTER being smaller than an SR counter threshold. In an example, the SR counter threshold may be the maximum number of SR transmission (e.g., sr_TransMax). In an example, upon determining that the one or more conditions for the transmission of the triggered SR being met, the MAC layer of the wireless device may notify, via the first indication, the physical layer to signal the SR over one valid PUCCH resource corresponding to the SR (at time T3 in FIG. 32). The first indication may indicate/notify the lower layer of the wireless device of the transmission of the SR. In an example, in response to transmitting the first indication of the SR transmission to the physical layer, the higher layer of the wireless device may start the SR prohibit timer and increment SR_COUNTER by 1. While the SR prohibit timer is running, the wireless device may monitor PDCCH for receiving one or more DCIs indicating UL grant(s) for the transmission of the UL data.

In an example, based on transmitting the first indication to the lower layer, the higher layer may start a (predetermined) time window (at time T3 in FIG. 31). In an example, while the time window is running, the higher layer of the wireless device may not transmit another first indication to the lower layer.

The length of the time window may be determined based on at least the SR configuration parameters. In an example, the length of the time window may be determined based on at least the periodicity of the PUCCH carrying/conveying the SR. In another example, he length of the time window may be determined based on at least the value range of the SR prohibit timer. In another example, the length of the time window may be determined based on at least a repetition factor (e.g., $N_{PUCCH}^{repeat}$) of the PUCCH conveying/carrying the SR.

In an example, upon (or based on) receiving the first indication of the SR transmission, the physical layer of the wireless device may determine an SR transmission occasion on one valid PUCCH resource. The physical layer may determine the SR transmission occasion, for example, based on the periodicity of the SR transmission in slots (e.g., provided by periodicityAndOffset) for the PUCCH transmission conveying/carrying the SR (e.g., at time T4 in FIG. 31). The physical layer may determine the SR transmission occasion, for example, based on the offset of the SR transmission in slots (e.g., provided by periodicityAndOffset) for the PUCCH transmission conveying/carrying the SR (e.g., at time T4 in FIG. 31). In an example, configuration parameters (e.g., parameter nrofSymbols) from a higher layer (e.g., RRC) may indicate the number of symbols being used of the PUCCH transmission.

In an example shown in FIG. 32, despite receiving the first indication of the transmission of the SR from the higher layer of the wireless device at time T3, the lower layer of the wireless device may drop the SR at time T4 (e.g., by not transmitting the PUCCH conveying the SR).

In an example, dropping the SR may comprise, for example, dropping transmission of the SR. Dropping the SR may comprise, for example, not transmitting the SR.

For example, when the number of symbols required for the transmission of the PUCCH conveying the SR (provided by nrofSymbols) is larger than the available symbols in the slot s, the lower layer of the wireless device may drop the SR.

In another example, if the wireless device transmits the SR in a resource using PUCCH format 0 and HARQ-ACK information bits in a resource using PUCCH format 1 in the slot s, the wireless may transmit a PUCCH with the HARQ-ACK information bits in the resource using PUCCH format 1 (e.g., the lower layer may drop the SR).

In another example, if the wireless device transmits the SR in a first resource using PUCCH format 1 and at most two HARQ-ACK information bits in a second resource using PUCCH format 1 in the slot s, the wireless device may transmit a PUCCH with HARQ-ACK information bits in the first resource using PUCCH format 1. The wireless device may not transmit the SR.

In an example, the wireless device may transmit K PUCCHs for respective K SRs in the slot s (e.g., as determined by a set of schedulingRequestResourceId and a schedulingRequestResourceId associated with schedulingRequestID-BFR-SCell) with SR transmission occasions that would overlap with a transmission of a PUCCH with HARQ-ACK information from the wireless device in the slot s or with a transmission of a PUCCH with CSI report(s) from the wireless device in the slot s. While a total number of K+1 PUCCHs may be required to be transmitted in the slot s, only K PUCCHs may be transmitted where one of the transmitting PUCCHs being corresponding to the HARQ- ACK or CSI. In an example, the wireless device may drop one SR. In an example, the dropped SR may be the SR.

In another example, the wireless device may transmit multiple overlapping PUCCHs in the slot s or overlapping PUCCH(s) and PUSCH(s) in the slot s. In an example, one of the PUCCHs may include HARQ-ACK information in response to an SPS PDSCH reception. In an example, any PUSCH is not in response to a DCI format detection. For each PUCCH resource in the set Q that satisfies the aforementioned timeline conditions (e.g., timelines condition 1, 2, 3, 4, and 5), when applicable, the wireless device may multiplex HARQ-ACK information and/or CSI reports in a PUSCH if the PUCCH resource overlaps in time with a PUSCH transmission. In an example, the physical layer of the wireless device may drop the SR.

In an example, while the timer window is running, the higher layer may receive the second indication from the lower layer. The second indication may indicate that the lower layer has dropped the SR. In an example, the second indication may notify the higher layer that the lower layer dropped the SR.

In an example, based on receiving the second indication, the higher layer of the wireless device may determine that the SR being pending at time T6 in FIG. 32.

In an example, based on determining that the SR being pending, the wireless device may repeat one or more actions comprising: determining the at least one valid PUCCH resource for the transmission of the SR; checking whether the SR prohibit timer is running; whether the SR_COUNTER is equal or greater than the maximum number of SR transmission; incrementing the SR_COUNTER, transmitting the SR and starting the SR prohibit timer; monitoring a PDCCH for uplink grant.

According to an example embodiment, a media access control (MAC) layer of a wireless device may transmit to a physical layer of the wireless device a first indication indicating transmission of a scheduling request (SR). Based on the transmitting the first indication of transmission of the SR to the physical layer, the MAC layer of the wireless device may start an SR prohibit timer and increment an SR counter (e.g., SR transmission counter). In response to the transmitting the first indication of transmission of the SR to the physical layer the MAC layer of the wireless device may receive, from the physical layer, a second indication of the SR being dropped. Based on the second indication of the SR being dropped by the physical layer, the MAC layer of the wireless device may stop the SR prohibit timer and decrement the SR counter.

In an example, the wireless device may receive one or more SR configuration parameters indicating the SR prohibit timer, a maximum SR transmission counter, and one or more PUCCH resources.

In an example, the first indication of the transmission of the SR instructs the physical layer of the wireless device to transmit the SR on one valid PUCCH resource corresponding to an SR configuration.

In an example, the physical layer of wireless device may, based on receiving the first indication from the MAC layer of the wireless device, transmit the SR indicated by the first indication.

In an example, the physical layer of the wireless device may drop the SR indicated by the first indication. The physical layer of the wireless device may, based on the SR being dropped, transmit to the MAC layer of the wireless device the second indication.

In an example, the physical layer of the wireless device may transmit to the MAC layer of the wireless device the second indication of the SR being dropped.

In an example, the second indication may notify the MAC layer of the wireless device that the physical layer of the wireless device failed to transmit the SR.

In an example, the MAC layer of the wireless device may, based on determining that the physical layer of the wireless device transmitted the SR, continue operation of the SR prohibit timer and refrain from decrementing the SR counter.

In an example, the MAC layer of the wireless device may, based on not receiving from the physical layer, the second indication may determine that the physical layer of the wireless device is transmitted the SR.

In an example, the MAC layer of the wireless device may transmit the first indication of the transmission of the SR based on determining that: a valid PUCCH resource for the triggered SR is available, an SR transmission occasion is available on the valid PUCCH resource, the SR prohibit timer is not running at the time of the SR transmission occasion, the valid PUCCH resource for the SR transmission occasion is not overlapped with a measurement gap, and the SR counter is smaller than the maximum number of SR transmission corresponding to the SR configuration.

In an example, the wireless device may trigger the SR in response to a triggered Buffer Status Report (BSR).

In an example, the BSR may be triggered due to arrival of new data.

In an example, the wireless device may, based on determining that the SR is cancelled, stop the SR prohibit timer prior to expiry.

In an example, the wireless device may cancel the SR based on a BSR triggering the SR being cancelled.

In an example, the wireless device may cancel the BSR in response to the transmission of a first MAC protocol data unit (PDU) using one or more uplink shared channel resources that accommodate one or more pending data or the transmission of a second MAC PDU including a Long or Short BSR MAC control element (CE).

In an example, the wireless device may not transmit an SR while the prohibit timer is running.

In an example, the wireless device may monitor PDCCH for receiving one or more uplink grants while the SR prohibit timer is running.

In an example, the base station may be a non-terrestrial network (NTN) base station.

In an example, the value range of the SR prohibit timer may be extended by an offset.

In an example, the offset may be at least based on a propagation delay between the wireless device and a non-terrestrial (NTN) node.

In an example, the NTN node may be an NTN base station.

In an example, the NTN node may not be an NTN base station.

In an example, the physical layer of the wireless device may not transmit, to the MAC layer of the wireless device, the second indication of the SR being dropped when the wireless device communicates with a terrestrial base station.

In an example, the wireless device may be in a non-terrestrial network (NTN).

According to an example embodiment, a media access control (MAC) layer of a wireless device may transmit to a physical layer of the wireless device a first indication indicating transmission of a scheduling request (SR). Based on the transmitting the first indication of transmission of the SR and after expiry of a predetermined time window for successful SR transmission, the MAC layer of the wireless device may start an SR prohibit timer and increment an SR counter.

In an example, the wireless device may receive one or more SR configuration parameters indicating the SR prohibit timer, a maximum SR transmission counter, and one or more PUCCH resources.

In an example, the first indication of the transmission of the SR may instruct the physical layer of the wireless device to transmit the SR on one valid PUCCH resource corresponding to an SR configuration.

In an example, the physical layer of the wireless device may, based on receiving the first indication from the MAC layer, transmit the SR indicated by the first indication.

In an example, the MAC layer of the wireless device may, based on the transmitting the first indication to the physical layer of the wireless device, start the predetermined time window.

In an example, the physical layer of the wireless device may drop the SR indicated by the first indication. The physical layer of the wireless device may, based on the SR being dropped, transmit to the MAC layer of the wireless device the second indication. The MAC layer of the wireless device may, based on the receiving the second indication from the physical layer, stop the predetermined time window.

In an example, the second indication may notify the MAC layer of the wireless device that the physical layer failed to transmit the SR.

In an example, the physical layer of the wireless device may transmit the SR indicated by the first indication. The physical layer of the wireless device may, based on the SR being transmitted, transmit to the MAC layer of the wireless device a third indication. The MAC layer of the wireless device may stop the predetermined time window based on the receiving the third indication.

In an example, the third indication notify the MAC layer of the wireless device that the physical layer transmitted the SR.

In an example, the MAC layer of the wireless device may, based on receiving from the physical layer, determine that the physical layer transmits the SR the third indication.

In an example, the MAC layer of the wireless device may transmit the first indication of the transmission of the SR based on determining that: a valid PUCCH resource for the triggered SR is available; an SR transmission occasion is available on the valid PUCCH resource; the SR prohibit timer is not running at the time of the SR transmission occasion; the valid PUCCH resource for the SR transmission occasion is not overlapped with a measurement gap; and the SR counter is smaller than the maximum number of SR transmissions corresponding to the SR configuration.

In an example, the wireless device may determine that the predetermined time window is running.

In an example, the wireless device may not transmit an SR when the predetermined time window is running.

In an example, the wireless device may not transmit an SR while the prohibit timer is running.

In an example, the wireless device may trigger the SR in response to a triggered Buffer Status Report (BSR).

In an example, the BSR may be triggered due to arrival of new data.

In an example, the wireless device may stop the SR prohibit timer prior to expiry based on determining that the SR is cancelled.

In an example, the wireless device may cancel the SR based on a BSR triggering the SR being cancelled.

In an example, the wireless device may cancel the BSR in response to the transmission of a first MAC protocol data unit (PDU) using one or more uplink shared channel resources that accommodate one or more pending data or the transmission of a second MAC PDU including a Long or Short BSR MAC control element (CE).

In an example, the wireless device may not transmit an SR while the prohibit timer is running.

In an example, the wireless device may monitor PDCCH for receiving one or more uplink grants while the SR prohibit timer is running.

In an example, the base station may be a non-terrestrial network (NTN) base station.

In an example, the value range of the SR prohibit timer may be extended by an offset.

In an example, the offset may be at least based on a propagation delay between the wireless device and a non-terrestrial (NTN) node.

In an example, the NTN node may be an NTN base station.

In an example, the NTN node may not be an NTN base station.

In an example, the physical layer of the wireless device may not transmit, to the MAC layer of the wireless device, the second indication of the SR being dropped when the wireless device communicates with a terrestrial base station.

In an example, the wireless device may be in a non-terrestrial network (NTN).

What is claimed is:

1. A method comprising:
sending, by a wireless device, from a media access control (MAC) layer of the wireless device to a physical layer of the wireless device, a first indication indicating transmission of a scheduling request (SR);
receiving, by the MAC layer from the physical layer, a second indication of the SR being dropped by the physical layer, wherein the SR being dropped is determined by the physical layer, based on the number of symbols used for a physical uplink control channel (PUCCH) transmission conveying the SR being larger than available symbols in a slot; and
based on the receiving the second indication of the SR being dropped by the physical layer:
stopping monitoring a physical downlink control channel (PDCCH);
stopping an SR prohibit timer; and
decrementing an SR counter.

2. The method of claim 1, further comprising:
receiving one or more SR configuration parameters indicating at least one of:
the SR prohibit timer;
a maximum SR transmission counter; or
one or more physical uplink control channel (PUCCH) resources; and
based on the sending the first indication, starting the SR prohibit timer and starting monitoring the PDCCH.

3. The method of claim 2, wherein
the first indication of the transmission of the SR instructs the physical layer to transmit the SR on one valid PUCCH resource corresponding to an SR configuration in a slot.

4. The method of claim 2, wherein the SR prohibit timer is started and the SR counter is incremented in response to the sending the first indication.

5. The method of claim 4, wherein the determining is based on the slot being used for transmission of at least one hybrid automatic repeat request (HARQ) acknowledgement in at least one resource using PUCCH format 1.

6. The method of claim 4, wherein the determining is based on the slot being used for transmission of multiple overlapping PUCCHs and physical uplink shared channels (PUSCHs), wherein:

at least one of the PUCCHs is used for transmission of at least one HARQ acknowledgement or at least one channel state information (CSI) report; and the at least one HARQ acknowledgement and/or the at least one CSI report is multiplexed with a PUSCH.

7. The method of claim 4, further comprising prohibiting the physical layer from sending, to the MAC layer, the second indication of a second SR being dropped when the wireless device communicates with a terrestrial base station.

8. The method of claim 1, further comprising prohibiting the MAC layer from sending the first indication to the physical layer while the SR prohibit timer is running.

9. The method of claim 1, wherein the wireless device communicates with a base station via a non-terrestrial network (NTN).

10. The method of claim 1, wherein:

a value range of the SR prohibit timer is extended by an offset; and the offset is based on a propagation delay between the wireless device and a non-terrestrial network (NTN) node.

11. A wireless device comprising:

one or more processors; and memory storing instructions that, when executed by the one or more processors, cause the wireless device to:

send, from a media access control (MAC) layer of the wireless device to a physical layer of the wireless device, a first indication indicating transmission of a scheduling request (SR);

receive, by the MAC layer from the physical layer, a second indication of the SR being dropped by the physical layer, wherein the SR being dropped is determined by the physical layer, based on the number of symbols used for a physical uplink control channel (PUCCH) transmission conveying the SR being larger than available symbols in a slot; and based on the receiving the second indication of the SR being dropped by the physical layer:

stop monitoring a physical downlink control channel (PDCCH);

stop an SR prohibit timer; and decrement an SR counter.

12. The wireless device of claim 11, wherein the instructions, when executed by the one or more processors, further cause the wireless device to:

receive one or more SR configuration parameters indicating at least one of:

the SR prohibit timer;

a maximum SR transmission counter; or one or more physical uplink control channel (PUCCH) resources; and based on the sending the first indication, start the SR prohibit timer and start monitoring the PDCCH.

13. The wireless device of claim 12, wherein the first indication of the transmission of the SR instructs the physical layer to transmit the SR on one valid PUCCH resource corresponding to an SR configuration in a slot.

14. The wireless device of claim 12 wherein the SR prohibit timer is started and the SR counter is incremented in response to the sending the first indication.

15. The wireless device of claim 14, wherein the determining is based on the slot being used for transmission of at least one hybrid automatic repeat request (HARQ) acknowledgement in at least one resource using PUCCH format 1.

16. The wireless device of claim 14, wherein the determining is based on the slot being used for transmission of multiple overlapping PUCCHs and physical uplink shared channels (PUSCHs), wherein:

at least one of the PUCCHs is used for transmission of at least one HARQ acknowledgement or at least one channel state information (CSI) report; and the at least one HARQ acknowledgement and/or the at least one CSI report is multiplexed with a PUSCH.

17. The wireless device of claim 14, wherein the instructions, when executed by the one or more processors, further cause the wireless device to prohibit the physical layer from sending, to the MAC layer, the second indication of a second SR being dropped when the wireless device communicates with a terrestrial base station.

18. The wireless device of claim 11, wherein the instructions, when executed by the one or more processors, further cause the wireless device to prohibit the MAC layer from sending the first indication to the physical layer while the SR prohibit timer is running.

19. The wireless device of claim 11, wherein the wireless device communicates with a base station via a non-terrestrial network (NTN).

20. A non-transitory computer-readable medium comprising instructions that, when executed by one or more processors of a wireless device, cause the wireless device to:

send, from a media access control (MAC) layer of the wireless device to a physical layer of the wireless device, a first indication indicating transmission of a scheduling request (SR);

receive, by the MAC layer from the physical layer, a second indication of the SR being dropped by the physical layer, wherein the SR being dropped is determined by the physical layer, based on the number of symbols used for a physical uplink control channel (PUCCH) transmission conveying the SR being larger than available symbols in a slot; and based on the receiving the second indication of the SR being dropped by the physical layer:

stop monitoring a physical downlink control channel (PDCCH);

stop an SR prohibit timer; and decrement an SR counter.

\* \* \* \* \*